US008090384B2

(12) United States Patent
Alles et al.

(10) Patent No.: US 8,090,384 B2
(45) Date of Patent: Jan. 3, 2012

(54) SYSTEM AND METHOD FOR GENERATING A LOCATION ESTIMATE USING A METHOD OF INTERSECTIONS

(75) Inventors: Martin Alles, Vienna, VA (US); John Carlson, Dulles, VA (US); George Maher, Herndon, VA (US); Selcuk Mazlum, Leesburg, VA (US)

(73) Assignee: Andrew, LLC, Hickory, NC (US)

( * ) Notice: Subject to any disclaimer, the term of this patent is extended or adjusted under 35 U.S.C. 154(b) by 1008 days.

(21) Appl. No.: 12/023,841

(22) Filed: Jan. 31, 2008

(65) Prior Publication Data

US 2008/0214205 A1 Sep. 4, 2008

Related U.S. Application Data

(60) Provisional application No. 60/899,379, filed on Feb. 5, 2007.

(51) Int. Cl.
*H04W 24/00* (2009.01)
(52) U.S. Cl. ........... 455/456.1; 455/404.2; 455/456.2; 455/456.3; 455/456.5; 455/456.6; 370/310; 370/310.2; 370/328
(58) Field of Classification Search ........... 455/404.2, 455/456.1, 456.2, 456.3, 456.4, 456.5, 456.6, 455/457; 370/310, 310.2, 328
See application file for complete search history.

(56) References Cited

U.S. PATENT DOCUMENTS

| | | |
|---|---|---|
| 3,150,372 A | 9/1964 | Groth, Jr. |
| 3,659,085 A | 4/1972 | Potter et al. |
| 4,728,959 A | 3/1988 | Maloney |
| 4,814,751 A | 3/1989 | Hawkins |
| 4,845,504 A | 7/1989 | Roberts et al. |
| 4,891,650 A | 1/1990 | Sheffer |
| 5,056,106 A | 10/1991 | Wang |
| 5,218,367 A * | 6/1993 | Sheffer et al. ............ 342/457 |
| 5,218,618 A | 6/1993 | Sagey |
| 5,317,323 A | 5/1994 | Kennedy et al. |
| 5,327,144 A | 7/1994 | Stilp et al. |
| 5,365,544 A | 11/1994 | Schilling |

(Continued)

FOREIGN PATENT DOCUMENTS

EP 1471688 A 10/2004

(Continued)

OTHER PUBLICATIONS

Y. Zhao, "Standardization of Mobile Phone Positioning for 3G Systems," IEEE Communications Magazine, Jul. 2002, pp. 108-116.

(Continued)

*Primary Examiner* — Steve D Agosta
(74) *Attorney, Agent, or Firm* — Duane Morris, LLP

(57) ABSTRACT

The location of a wireless mobile device may be estimated using, at least in part, one or more pre-existing Network Measurement Reports ("NMRs") which include calibration data for a number of locations within a geographic region. The calibration data for these locations is gathered and analyzed so that particular grid points within the geographic region can be determined and associated with a particular set or sets of calibration data from, for example, one or more NMRs. Regions may be defined as a function of any number of parameters and respective predetermined ranges thereof in the NMRs. An intersection of these defined regions may be determined and the location of a mobile device may be estimated as a function of the intersection.

41 Claims, 66 Drawing Sheets

U.S. PATENT DOCUMENTS

| | | | |
|---|---|---|---|
| 5,372,144 | A | 12/1994 | Mortier et al. |
| 5,404,376 | A | 4/1995 | Dent |
| 5,423,067 | A | 6/1995 | Manabe |
| 5,465,289 | A | 11/1995 | Kennedy |
| 5,506,863 | A | 4/1996 | Meidan et al. |
| 5,506,864 | A | 4/1996 | Schilling |
| 5,508,708 | A | 4/1996 | Ghosh et al. |
| 5,512,908 | A | 4/1996 | Herrick |
| 5,515,419 | A | 5/1996 | Sheffer |
| 5,519,760 | A | 5/1996 | Borkowski et al. |
| 5,559,864 | A | 9/1996 | Kennedy |
| 5,592,180 | A | 1/1997 | Yokev et al. |
| 5,608,410 | A | 3/1997 | Stilp et al. |
| 5,614,914 | A | 3/1997 | Bolgiano et al. |
| 5,675,344 | A | 10/1997 | Tong et al. |
| 5,736,964 | A | 4/1998 | Ghosh et al. |
| 5,815,538 | A | 9/1998 | Grell et al. |
| 5,825,887 | A | 10/1998 | Lennen |
| 5,870,029 | A | 2/1999 | Otto et al. |
| 5,920,278 | A | 7/1999 | Tyler et al. |
| 5,952,969 | A | 9/1999 | Hagerman et al. |
| 5,959,580 | A | 9/1999 | Maloney et al. |
| 5,960,341 | A * | 9/1999 | LeBlanc et al. ............ 455/426.1 |
| 5,973,643 | A | 10/1999 | Hawkes et al. |
| 5,987,329 | A | 11/1999 | Yost |
| 6,014,102 | A | 1/2000 | Mitzlaff et al. |
| 6,047,192 | A | 4/2000 | Maloney |
| 6,091,362 | A | 7/2000 | Stilp |
| 6,097,336 | A | 8/2000 | Stilp |
| 6,097,959 | A | 8/2000 | Yost |
| 6,101,178 | A | 8/2000 | Beal |
| 6,108,555 | A | 8/2000 | Maloney et al. |
| 6,115,599 | A | 9/2000 | Stilp |
| 6,119,013 | A | 9/2000 | Maloney et al. |
| 6,127,975 | A | 10/2000 | Maloney |
| 6,144,711 | A | 11/2000 | Raleigh et al. |
| 6,172,644 | B1 | 1/2001 | Stilp |
| 6,184,829 | B1 | 2/2001 | Stilp |
| 6,188,351 | B1 | 2/2001 | Bloebaum |
| 6,191,738 | B1 | 2/2001 | Pfeil et al. |
| 6,201,499 | B1 | 3/2001 | Hawkes et al. |
| 6,201,803 | B1 | 3/2001 | Munday et al. |
| 6,204,812 | B1 * | 3/2001 | Fattouche ............... 342/457 |
| 6,212,319 | B1 | 4/2001 | Cayrefourcq |
| 6,233,459 | B1 | 5/2001 | Sullivan et al. |
| 6,246,884 | B1 | 6/2001 | Karmi et al. |
| 6,263,208 | B1 * | 7/2001 | Chang et al. ............... 455/456.3 |
| 6,266,013 | B1 | 7/2001 | Stilp et al. |
| 6,266,534 | B1 * | 7/2001 | Raith et al. ............... 455/456.3 |
| 6,281,834 | B1 | 8/2001 | Stilp |
| 6,285,321 | B1 | 9/2001 | Stilp et al. |
| 6,288,675 | B1 | 9/2001 | Maloney |
| 6,288,676 | B1 | 9/2001 | Maloney |
| 6,295,455 | B1 | 9/2001 | Fischer et al. |
| 6,311,043 | B1 | 10/2001 | Haardt et al. |
| 6,317,081 | B1 | 11/2001 | Stilp |
| 6,317,604 | B1 | 11/2001 | Kovach, Jr. et al. |
| 6,334,059 | B1 | 12/2001 | Stilp et al. |
| 6,351,235 | B1 | 2/2002 | Stilp |
| 6,366,241 | B2 | 4/2002 | Pack |
| 6,388,618 | B1 | 5/2002 | Stilp et al. |
| 6,400,320 | B1 | 6/2002 | Stilp et al. |
| 6,407,703 | B1 | 6/2002 | Minter et al. |
| 6,442,392 | B2 * | 8/2002 | Ruutu et al. ............... 455/456.1 |
| 6,463,290 | B1 | 10/2002 | Stilp et al. |
| 6,470,195 | B1 | 10/2002 | Meyer |
| 6,477,161 | B1 | 11/2002 | Hudson |
| 6,483,460 | B2 | 11/2002 | Stilp et al. |
| 6,492,944 | B1 | 12/2002 | Stilp |
| 6,501,955 | B1 | 12/2002 | Durrant et al. |
| 6,519,465 | B2 | 2/2003 | Stilp et al. |
| 6,539,229 | B1 * | 3/2003 | Ali ............... 455/456.1 |
| 6,546,256 | B1 | 4/2003 | Maloney |
| 6,553,322 | B1 | 4/2003 | Ignagni |
| 6,563,460 | B2 | 5/2003 | Stilp et al. |
| 6,571,082 | B1 | 5/2003 | Rahman |
| 6,603,428 | B2 | 8/2003 | Stilp |
| 6,603,761 | B1 | 8/2003 | Wang |
| 6,640,106 | B2 | 10/2003 | Gutowski et al. |
| 6,646,604 | B2 | 11/2003 | Anderson |
| 6,661,379 | B2 | 12/2003 | Stilp et al. |
| 6,765,531 | B2 | 7/2004 | Anderson |
| 6,771,625 | B1 | 8/2004 | Beal |
| 6,771,969 | B1 | 8/2004 | Chinoy |
| 6,782,264 | B2 | 8/2004 | Anderson |
| 6,834,234 | B2 | 12/2004 | Scherzinger et al. |
| 6,839,539 | B2 | 1/2005 | Durrant et al. |
| 6,845,240 | B2 | 1/2005 | Carlson et al. |
| 6,859,172 | B2 | 2/2005 | Powers et al. |
| 6,871,077 | B2 | 3/2005 | Kennedy |
| 6,873,290 | B2 | 3/2005 | Anderson et al. |
| 6,876,859 | B2 | 4/2005 | Anderson et al. |
| 6,882,315 | B2 * | 4/2005 | Richley et al. ............... 342/465 |
| 6,901,264 | B2 * | 5/2005 | Myr ............... 455/456.5 |
| 6,920,329 | B2 | 7/2005 | Kennedy, Jr. et al. |
| 6,922,170 | B2 | 7/2005 | Alexander, Jr. |
| 6,952,158 | B2 | 10/2005 | Kennedy, Jr. |
| 6,987,979 | B2 | 1/2006 | Carlsson |
| 6,996,392 | B2 | 2/2006 | Anderson |
| 7,023,383 | B2 | 4/2006 | Stilp et al. |
| 7,057,557 | B2 * | 6/2006 | Lee ............... 342/465 |
| 7,167,713 | B2 | 1/2007 | Anderson |
| 7,257,411 | B2 * | 8/2007 | Gwon et al. ............... 455/456.1 |
| 7,260,408 | B2 * | 8/2007 | Friday et al. ............... 455/456.1 |
| 7,271,765 | B2 | 9/2007 | Stilp et al. |
| 7,340,259 | B2 | 3/2008 | Maloney |
| 7,427,952 | B2 | 9/2008 | Bull et al. |
| 7,440,762 | B2 | 10/2008 | Maloney et al. |
| 7,529,236 | B2 * | 5/2009 | Kota et al. ............... 370/386 |
| 7,593,738 | B2 | 9/2009 | Anderson |
| 2002/0172223 | A1 | 11/2002 | Stilp |
| 2003/0064734 | A1 | 4/2003 | Stilp et al. |
| 2003/0139188 | A1 | 7/2003 | Chen et al. |
| 2003/0190919 | A1 | 10/2003 | Niemenmaa |
| 2003/0203738 | A1 | 10/2003 | Brown et al. |
| 2004/0043775 | A1 | 3/2004 | Kennedy, Jr. et al. |
| 2004/0132466 | A1 | 7/2004 | Kennedy, Jr. et al. |
| 2004/0203921 | A1 | 10/2004 | Bromhead et al. |
| 2004/0218664 | A1 | 11/2004 | Kennedy, Jr. et al. |
| 2004/0252752 | A1 | 12/2004 | Kennedy, Jr. et al. |
| 2005/0040968 | A1 | 2/2005 | Damarla et al. |
| 2005/0058182 | A1 | 3/2005 | Kennedy, Jr. et al. |
| 2005/0078033 | A1 | 4/2005 | Tamaki et al. |
| 2005/0136945 | A1 | 6/2005 | Kennedy, Jr. et al. |
| 2005/0164712 | A1 | 7/2005 | Kennedy, Jr. et al. |
| 2005/0176421 | A1 | 8/2005 | Ju et al. |
| 2005/0192026 | A1 | 9/2005 | Carlson et al. |
| 2005/0243936 | A1 | 11/2005 | Agrawala et al. |
| 2005/0266855 | A1 | 12/2005 | Zeng et al. |
| 2006/0003695 | A1 | 1/2006 | Kennedy, Jr. et al. |
| 2006/0003775 | A1 | 1/2006 | Bull et al. |
| 2006/0030333 | A1 | 2/2006 | Ward et al. |
| 2006/0116130 | A1 | 6/2006 | Kennedy, Jr. et al. |
| 2006/0125695 | A1 | 6/2006 | Kennedy, Jr. et al. |
| 2006/0141998 | A1 | 6/2006 | Kennedy, Jr. et al. |
| 2006/0154607 | A1 | 7/2006 | Kennedy, Jr. et al. |
| 2006/0240836 | A1 | 10/2006 | Kennedy, Jr. et al. |
| 2006/0240843 | A1 | 10/2006 | Spain et al. |
| 2007/0087689 | A1 | 4/2007 | Kennedy, Jr. et al. |
| 2007/0111746 | A1 | 5/2007 | Anderson et al. |
| 2007/0155401 | A1 | 7/2007 | Ward et al. |
| 2007/0155489 | A1 | 7/2007 | Beckley et al. |
| 2007/0202885 | A1 | 8/2007 | Kennedy, Jr. et al. |
| 2008/0132244 | A1 | 6/2008 | Anderson et al. |
| 2008/0132247 | A1 | 6/2008 | Anderson et al. |
| 2008/0137524 | A1 | 6/2008 | Anderson et al. |
| 2008/0158059 | A1 | 7/2008 | Bull et al. |
| 2008/0160952 | A1 | 7/2008 | Bull et al. |
| 2008/0160953 | A1 | 7/2008 | Mia et al. |
| 2008/0161015 | A1 | 7/2008 | Maloney et al. |
| 2008/0248811 | A1 | 10/2008 | Maloney et al. |
| 2008/0261611 | A1 | 10/2008 | Mia et al. |
| 2008/0261612 | A1 | 10/2008 | Mia et al. |
| 2008/0261613 | A1 | 10/2008 | Anderson et al. |
| 2008/0261614 | A1 | 10/2008 | Mia et al. |
| 2009/0005061 | A1 | 1/2009 | Ward et al. |

FOREIGN PATENT DOCUMENTS

| JP | 06-347529 | 12/1994 |
|---|---|---|
| WO | 0034799 A1 | 6/2000 |
| WO | 02/082832 A | 10/2002 |
| WO | 2006088472 A1 | 8/2006 |

OTHER PUBLICATIONS

C. Drane, M. MacNaughtan, and C. Scott, "Positioning GSM Telephones," IEEE Communications Magazine, Apr. 1998, pp. 46-54, 59.

J. Caffery, Jr., and G. Stuber, "Overview of Radiolocation in CDMA Cellular Systems," IEEE Communications Magazine, Apr. 1998, pp. 38-45.

T. Rappaport, J.H. Reed and B.D. Woerner, "Position Location Using Wireless Communications on Highways of the Future," IEEE Communications Magazine, Oct. 1996, pp. 33-41.

I. Ziskind and M. Wax, "Maximum Likelihood Localization of Multiple Sources by Alternating Projection," IEEE Transactions on Acoustics, Speech, and Signal Porcessing, vol. 36, No. 10, pp. 1553-1560, Oct. 1988.

G.W.K. Colman, "A Comparison of the Accuracy of TDOA and TOA Location Algorithms with Equivalent Receiver Geometry," Defence R&D Canada Technical Memorandum (DREO TM 2001-063), Oct. 2001, pp. 1-53.

L. Mailaender, "On the Geolocation Bounds for Round-Trip Time-of-Arrival and All Non-Line-of-Sight Channels", EURASIP Journal on Advances in Signal Processing, vol. 2008, pp. 1-10.

N. Agarwal, L. Chaudran-Wadi, and V. Apte, "Capacity Analysis of the GSM Short Message Service", Indian Institute of Technology Bombay, www.cse.iitb.ac.in/~varsha/allpapers/wireless/ncc03cam.pdf, 2004, pp. 1-5.

J.D. Bard, and F.M. Ham, "Time Difference of Arrival Dilution of Precision and Applications," IEEE Transactions on Signal Processing, vol. 47, No. 2, pp. 521-523, Feb. 1999.

K.C. Ho, and W. Xu, "An Accurate Algebraic Solution for Moving Source Location Using TDOA and FDOA Measurements", IEEE Transactions on Signal Processing, vol. 52, No. 9, Sep. 2004, pp. 2453-2463.

C.H. Knapp and G.C. Carter, "The Generalized Correlation Method for Estimation of Time Delay," IEEE Transactions on Acoustics, Speech, and Signal Processing, vol. ASSP-24, No. 4, Aug. 1976, pp. 320-327.

M. Rahnema, "Overview of the GSM System and Protocol Architecture," IEEE Communications Magazine, Apr. 1993, pp. 92-100.

S. Stein, "Algorithms for Ambiguity Function Processing," IEEE Transactions on Acoustics, Speech, and Signal Processing, vol. ASSP-29, No. 3, Jun. 1981, pp. 588-599.

M. Vanderveen, C.B. Papadias, and A. Paulraj, "Joint Angle and Delay Estimation (JADE) for Multipath Signals Arriving at an Antenna Array", IEEE Communications Letters, vol. 1, No. 1, Jan. 1997, pp. 12-14.

M. Wax and I. Ziskind, "On Unique Localization of Multiple Sources by Passive Sensor Arrays," IEEE Transactions on Acoustics, Speech, and Signal Processing, vol. 37, No. 7, Jul. 1989, pp. 996-1000.

B. Yang, "Projection Approximation Subspace Tracking," IEEE Transactions on Signal Processing, vol. 43, No. 1, Jan. 1995, pp. 95-107.

Amir Leshem, Mati Wax, "Array Calibration in the Presence of Multipath," IEEE Transactions on Signal Processing, vol. 48, No. 1, pp. 53-59, Jan. 2000.

Xin Wang, Zongxin Wang and Bob O'Dea, "A TOA-Based Location Algorithm Reducing the Errors Due to Non-Line-of-Sight (NLOS) Propagation," IEEE Trans. Vehicular Technology, vol. 52, No. 1, Jan. 2003, pp. 112-116.

M. Vanderveen, C. Papadias, A. Paulraj, "Joint Angle and Delay Estimation (JADE) for Multipath Signals Arriving at an Antenna Array," IEEE Communications Letters, vol. 1, No. 1, Jan. 1997, pp. 12-14.

R. Schmidt, "Multiple Emitter Location and Signal Parameter Estimation," IEEE Transactions on Antennas and Propagation, vol. AP-34, No. 3, Mar. 1986, pp. 276-280.

Y. Chen, M. Zoltowski, "Joint Angle and Delay Estimation for DS-CDMA with Application to Reduced Dimension Space-Time Rake Receivers," Mar. 1999, pp. 2933-2936.

A.J. Paulraj, C.B. Papadias, "Space-Time Processing for Wireless Communications", IEEE Signal Processing Magazine, vol. 11, Nov. 1997, pp. 49-83.

M. Haardt, C. Brunner, J. Nossek, "Joint Estimation of 2-D Arrival Angles, Propagation Delays, and Doppler Frequencies in Wireless Communications," Proc. IEEE Digital Signal Processing Workshop, vol. 1, pp. 1-4, Bryce Canyon National Park, Utah, Aug. 1998.

Mati Wax, "Position Location from Sensors with Position Uncertainty," IEEE Transactions Aerospace and Electronic Systems, vol. AES-19, No. 5, Sep. 1983, pp. 658-662.

D.J. Torrieri, "Statistical Theory of Passive Location Systems", IEEE Transactions Aerospace and Electronic Systems, vol. AES-20, No. 2, Mar. 1984, pp. 183-198.

Y.T. Chan and K.C. Ho, "A Simple and Efficient Estimator for Hyperbolic Location", IEEE Transactions Signal Processing, vol. 42, No. 8, Aug. 1994, pp. 1905-1915.

W.H. Foy, "Position-Location Solutions by Taylor-Series Estimation", IEEE Transactions Aerospace and Electronic Systems, vol. AES-12, No. 2, Mar. 1976, pp. 187-194.

R.G. Stansfield, "Statistical Theory of DF Fixing", Journal IEE 94, Part III A, Oct. 1947, pp. 762-770.

M.P. Wylie and J. Holtzman, "The Non-Line of Sight Problem in Mobile Location Estimation", Process IEEE 5th International Conference on Universal Personal Communications, vol. 2, Oct. 1996, pp. 827-831.

L.Cong and W. Zhuang, "Non-Line-of-Sight Error Mitigation in TDOA Mobile Location", Process IEEE Global Telecommunications Conference, vol. 1, Sep. 2001, pp. 680-684.

P.C. Chen, "A Non-Line-of-Sight Error Mitigation Algorithm in Location Estimation", Process IEEE Conference on Wireless Communications Networking, vol. 1, 1999, pp. 316-320.

N.J. Thomas, D.G.M. Cruickshank and D.I. Laurenson, "Performance of a TDOA-AOA Hybrid Mobile Location System", 3G Mobile Communication Technologies, Conference Publication No. 477, Mar. 2001, pp. 216-220.

J. Caffery, Jr., and G. Stuber, "Subscriber Location in CDMA Cellular Networks," IEEE Transactions on Vehicular Technology, vol. 47, No. 2, May 1998, pp. 406-416.

J. Caffery. Jr., "A New Approach to the Geometry of TOA Location," IEEE, VTC 2000, pp. 1943-1949.

M.Silventoinen and T. Rantalainen, "Mobile Station Emergency Locating in GSM", Process IEEE International Conference, Personal Wireless Communications, vol. 1, 1996, pp. 232-238.

\* cited by examiner

6110 PROVIDE CALIBRATION DATA AND SET OF NMRs

6120 DETERMINE REPRESENTATIVE VALUES

6130 DETERMINE REPRESENTATIVE NMRs

6140 ESTIMATE LOCATION OF MOBILE DEVICE

FIG. 61

SYSTEM AND METHOD FOR GENERATING A LOCATION ESTIMATE USING A METHOD OF INTERSECTIONS

CROSS REFERENCE TO RELATED APPLICATIONS

The present application claims priority benefit to and hereby incorporates by reference in its entirety U.S. Provisional Patent Application Ser. No. 60/899,379 filed on 5 Feb. 2007.

BACKGROUND

The present subject matter is directed generally towards a system and method for estimating the location of a wireless mobile device that is in communication with a wireless communications network. More specifically, the present subject matter relates to the problem of estimating the location of a wireless mobile device using information from one or more Network Measurement Reports ("NMRs") which may be generated by a wireless communications network or the mobile device.

As is well known in the art, the use of wireless communication devices such as telephones, pagers, personal digital assistants, laptop computers, anti-theft devices, etc., hereinafter referred to collectively as "mobile devices", has become prevalent in today's society. Along with the proliferation of these mobile devices is the safety concern associated with the need to locate the mobile device, for example in an emergency situation. For example, the Federal Communication Commission ("FCC") has issued a geolocation mandate for providers of wireless telephone communication services that puts in place a schedule and an accuracy standard under which the providers of wireless communications must implement geolocation technology for wireless telephones when used to make a 911 emergency telephone call (FCC 94-102 E911). In addition to E911 emergency related issues, there has been increased interest in technology which can determine the geographic position, or "geolocate" a mobile device. For example, wireless telecommunications providers are developing location-enabled services for their subscribers including roadside assistance, turn-by-turn driving directions, concierge services, location-specific billing rates and location-specific advertising.

Currently in the art, there are a number of different ways to geolocate a mobile device. For example, providers of wireless communication services have installed mobile device location capabilities into their networks. In operation, these network overlay location systems take measurements on radio frequency ("RF") transmissions from mobile devices at base station locations surrounding the mobile device and estimate the location of the mobile device with respect to the base stations. Because the geographic location of the base stations is known, the determination of the location of the mobile device with respect to the base station permits the geographic location of the mobile device to be determined. The RF measurements of the transmitted signal at the base stations can include the time of arrival, the angle of arrival, the signal power, or the unique/repeatable radio propagation path (radio fingerprinting) derivable features. In addition, the geolocation systems can also use collateral information, e.g., information other than that derived for the RF measurement to assist in the geolocation of the mobile device, i.e., location of roads, dead-reckoning, topography, map matching, etc.

In a network-based geolocation system, the mobile device to be located is typically identified and radio channel assignments determined by (a) monitoring the control information transmitted on radio channel for telephone calls being placed by the mobile device or on a wireline interface to detect calls of interest, i.e., 911, (b) a location request provided by a non-mobile device source, i.e., an enhanced services provider. Once a mobile device to be located has been identified and radio channel assignments determined, the location determining system is first tasked to determine the geolocation of the mobile device and then directed to report the determined position to the requesting entity or enhanced services provider.

The monitoring of the RF transmissions from the mobile device or wireline interfaces to identify calls of interest is known as "tipping", and generally involves recognizing a call of interest being made from a mobile device and collecting the call setup information. Once the mobile device is identified and the call setup information is collected, the location determining system can be tasked to geolocate the mobile device.

While the above-described systems are useful in certain situations, there is a need to streamline the process in order to efficiently and effectively handle the vast amount of data being sent between the wireless communications network and the large number of mobile devices for which locations are to be determined. In this regard, the present subject matter overcomes the limitations of the prior art by estimating the location of a wireless mobile device using, at least in part, one or more pre-existing Network Measurement Reports ("NMRs") which include calibration data for a number of locations within a geographic region. The calibration data for these locations must be gathered and analyzed so that particular points (e.g., "grid points") within the geographic region can be determined and associated with a particular set or sets of calibration data from, for example, one or more NMRs. Then, the received signal level measurements reported by the mobile device to be geolocated may be compared with the data associated with the various grid points to estimate the location of the mobile device. The performance of a grid-based pattern matching system such as that disclosed herein is typically dependent on stored received signal level measurements that accurately reflect the levels that are likely to be reported by the mobile device to be located. These grid points do not necessarily have to be part of a uniform grid and usually will not be uniformly distributed throughout the geographic region. These non-uniform grid points ("NUGs"), once determined, can be assigned geographic coordinates so that the NUGs may be used in determining the location of a mobile device exhibiting certain attributes as discussed in more detail below.

Accordingly, an embodiment of the present subject matter provides a method for assigning geographical coordinates to a grid point located in a geographic region for the location of a mobile device where the method provides calibration data for each of one or more calibration points in the geographic region and where for each of the calibration points the associated calibration data is evaluated and based on that evaluation a determination is made as to whether at least one grid point should be defined, and if so, geographical coordinates are assigned to the grid point.

An additional embodiment of the present subject matter further includes in the above method a determination of geographical coordinates for each of a plurality of nodes of a uniform grid spanning the geographic region and for each of the grid points determining a closest node from the plurality of nodes and assigning characteristic data associated with the grid point to the closest node.

A further embodiment includes a method of assigning geographical coordinates to a grid point located in a geographic region for the location of a mobile device where calibration data for each of one or more calibration points in the geographic region are provided, and where for the calibration data associated with each of the calibration points the calibration data is evaluated, a determination is made based on the evaluation as to whether at least one grid point should be defined, and geographical coordinates are assigned to the grid point.

In another embodiment of the present subject matter, a system for assigning geographical coordinates to a grid point located in a geographic region is presented where the system includes a database and a processor for receiving calibration data for each of one or more calibration points in the geographic region and for each of the calibration points the processor is programmed to evaluate the associated calibration data, determine if at least one grid point should be defined based on the evaluation, assign geographical coordinates to the at least one grid point, and populate the database with the geographical coordinates.

A further embodiment of the present subject matter includes in the above system circuitry for determining geographical coordinates for each of a plurality of nodes of a uniform grid spanning the geographic region, and circuitry for determining, for each of the at least one grid point, a closest node from the plurality of nodes and assigning characteristic data associated with the grid point to the closest node.

Yet another embodiment of the present subject matter provides a method of locating a mobile device. The method comprises the steps of providing a plurality of grid points in a geographic region, providing a plurality of network measurement reports for a mobile device in the geographic region, and comparing ones of the plurality of grid points to at least one parameter of ones of the plurality of network measurement reports. The method further includes generating a first location estimate of the mobile device for each of the ones of said plurality of network measurement reports, and determining a second location estimate of the mobile device as a function of at least one of the generated first location estimates. An additional embodiment includes the step of identifying and omitting outlier first location estimates by determining a Mahalanobis distance from each first location estimate to the second location estimate, determining a distance threshold from a median of the Mahalanobis distances multiplied by a predetermined factor, and determining a third location estimate by averaging two or more of said first location estimates. Another embodiment may also interpolate between ones of the plurality of grid points when more than one grid point corresponds to the at least one parameter of the plurality of network measurement reports. An additional embodiment may provide a default location for the second location estimate if a second location estimate cannot be determined as a function of at least one of the generated first location estimates.

An additional embodiment of the present subject matter provides a method of improving a location estimate of a mobile device. The method comprises the steps of providing a plurality of grid points in a geographic region, providing a set of network measurement reports for a mobile device in the geographic region, the set of network measurement reports including one or more subsets of network measurement reports, and comparing ones of the plurality of grid points to at least one parameter of a subset of the network measurement reports. The method further includes generating a first location estimate of the mobile device for each subset of network measurement reports, determining a second location estimate of the mobile device as a function of at least one of the generated first location estimates, and indicating an attribute of the second location estimate as a function of a parameter of a subset of the network measurement reports.

Another embodiment of the present subject matter provides a method of locating a mobile device in a geographic region. The method comprises the steps of providing a plurality of grid points in a geographic region, each of the grid points including at least one characterizing parameter and each of the grid points located on a grid defined over the geographic region and providing a plurality of network measurement reports for a mobile device in the geographic region. The method also comprises determining an estimated location for the mobile device from one network measurement report as a function of the at least one parameter.

An additional embodiment of the present subject matter provides a method of locating a mobile device in a geographic region. The method comprises the steps of providing a plurality of grid points in a geographic region, each of the grid points including at least one characterizing parameter and each of the grid points located on a grid defined over the geographic region and providing a plurality of network measurement reports for a mobile device in the geographic region. The method also comprises determining an estimated location for the mobile device from a set of said plurality of network measurement reports as a function of the parameter.

Yet another embodiment of the present subject matter provides another method of estimating the location of a mobile device in a geographic region. The method comprises the steps of providing calibration data for each of one or more calibration points in a geographic region where the calibration data includes at least one characterizing parameter. A candidate network measurement report or set of network measurement reports may be received from a mobile device at an unknown location, where the network measurement report also includes at least one characterizing parameter. The method further comprises defining a first region as a function of a first characterizing parameter and a predetermined range of said first parameter. A second region may be defined as a function of another characterizing parameter and a predetermined range of another parameter. These steps may be repeated for each characterizing parameter in the calibration data and an intersection of each defined region determined. The location of a mobile device may then be estimated in the geographic region as a function of the intersection.

In a further embodiment of the present subject matter, a method of estimating the location of a mobile device in a geographic region is provided. The method may comprise the steps of providing one or more sets of calibration data for a plurality of calibration points in a geographic region where the calibration data includes at least one characterizing parameter and for each of select ones of the calibration points the calibration data includes plural data vectors. The method may also include receiving a candidate network measurement report or set of network measurement reports from a mobile device at an unknown location, where the network measurement report also includes at least one characterizing parameter. The method also includes defining a first region as a function of a first characterizing parameter and a predetermined range of the first parameter for a select one set of calibration data, and for the set of calibration data, defining a second region as a function of another characterizing parameter and a predetermined range of the another parameter. These steps may be repeated for each characterizing parameter in the set of calibration data and a clustering of the plural data vectors may be determined. The location of a mobile device may be estimated in the geographic region as a function of the clustering.

Another embodiment of the present subject matter provides a method of estimating the location of a mobile device in a geographic region comprising providing calibration data for each of one or more calibration points in a geographic region where the calibration data includes at least one characterizing parameter and receiving a set of network measurement reports from a mobile device at an unknown location where at least one of the network measurement reports in the set also includes at least one characterizing parameter. The method may also comprise determining a representative value for each available characterizing parameter in the set as a function of a variation of the available characterizing parameter in each network measurement report in the set and determining one or more representative network measurement reports as a function of the representative value. The method may then estimate the location of a mobile device in the geographic region as a function of the one or more representative network measurement reports.

One embodiment of the present subject matter provides a system for estimating the location of a mobile device in a geographic region comprising a database and a processor for receiving calibration data for each of one or more calibration points in a geographic region, the calibration data having at least one characterizing parameter and receiving a candidate network measurement report or set of network measurement reports from a mobile device at an unknown location, where the network measurement report also includes at least one characterizing parameter. The processor may be programmed to determine a first region as a function of a first characterizing parameter and a predetermined range of the first parameter and repeat the determination for each characterizing parameters in the calibration data. The processor may be further programmed to determine an intersection for each defined region, and estimate the location of a mobile device in the geographic region as a function of the intersection.

Another embodiment of the present subject matter provides a system for estimating the location of a mobile device in a geographic region comprising a database and a processor for receiving calibration data for each of one or more calibration points in a geographic region where the calibration data may include at least one characterizing parameter. The processor may also receive a set of network measurement reports from a mobile device at an unknown location, at least one of the network measurement reports in the set may also include at least one characterizing parameter. The processor may be programmed to determine a representative value for each available characterizing parameter in the set as a function of a variation of the available characterizing parameter in each network measurement report in the set, determine one or more representative network measurement reports as a function of the representative value, and estimate the location of a mobile device in the geographic region as a function of the one or more representative network measurement reports.

These embodiments and many other objects and advantages thereof will be readily apparent to one skilled in the art to which the invention pertains from a perusal of the claims, the appended drawings, and the following detailed description of the embodiments.

BRIEF DESCRIPTION OF THE DRAWINGS

FIGS. 56-64 are flow charts for methods of estimating the location of a mobile device in a geographic region according to embodiments of the present subject matter.

DETAILED DESCRIPTION

Figure 1:
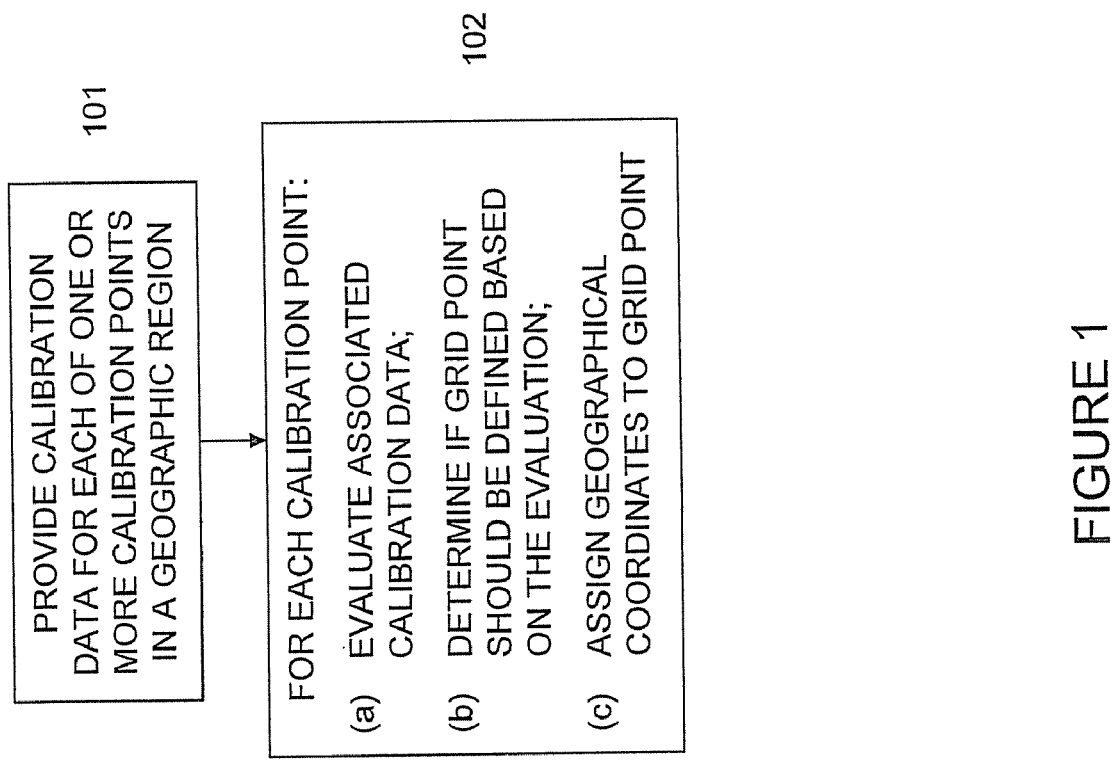
FIG. 1 is a flow chart for a method for assigning geographical coordinates according to an embodiment of the present subject matter.

With reference to the Figures where generally like elements have been given like numerical designations to facilitate an understanding of the present subject matter, the various embodiments of a system and method for generating a location estimate using a method of intersections are herein described.

The following description of the present subject matter is provided as an enabling teaching of the present subject matter and its best, currently-known embodiment. Those skilled in the art will recognize that many changes can be made to the embodiments described herein while still obtaining the beneficial results of the present subject matter. It will also be apparent that some of the desired benefits of the present subject matter can be obtained by selecting some of the features of the present subject matter without utilizing other features. Accordingly, those who work in the art will recognize that many modifications and adaptations of the present subject matter are possible and may even be desirable in certain circumstances and are part of the present subject matter. Thus, the following description is provided as illustrative of the principles of the present subject matter and not in limitation thereof. While the following exemplary discussion of embodiments of the present subject matter may be directed primarily towards calibration data, it is to be understood that the discussion is not intended to limit the scope of the present subject matter in any way and that the principles presented are equally applicable to other types of data, e.g., signal strength, GPS, NMR, Cell-ID, TDOA, RTT, TA, AOA, etc., capable of being delivered by components in a communications network such as a base station, location measurement unit, other mobile devices, etc. In addition, the use of various combinations of all of these sources, as in a hybrid location scheme, is within the scope of the subject matter disclosed herein.

The present subject matter is directed generally to the problem of estimating the location of a wireless mobile device using calibration data contained in one or more Network Measurement Reports ("NMRs"). The calibration data for various points must be gathered and analyzed so that particular points (e.g., "grid points") within the geographic region can be determined and associated with a particular set or sets of calibration data from, for example, one or more NMRs. In order to do so, geographic coordinates may be assigned to grid points located in a geographic region. The grid points may be non-uniformly spaced throughout the geographic region and hence may be referred to as non-uniform grid points ("NUGs"). The location of a wireless mobile device may be estimated by comparing data reported by the mobile device to be geolocated with the data (and more particularly the characteristics derived from this data) associated with the various grid points to thereby estimate the location of the mobile.

The system and/or method of the present subject matter may apply to the situation where calibration data is available over discrete points in a 2-dimensional region "R" (3-D region is also contemplated such as within large multi-level structures). The calibration data may be contained within a Network Measurement Report ("NMR") as is known in the art or the calibration data may be obtained using other known methods. The calibration data may be obtained at each of several calibration points, which may be discrete points within region R each having geographical coordinates (e.g., latitude and longitude) associated therewith. The calibration data may include, but is not limited to, the following: (a) signal strengths observed for signals transmitted by a set of transmitters of known location within or in proximity to the region R; (b) signal strength of a transmitter located at the calibration point as measured by a set of receivers of known location within or in proximity to the region R; (c) round trip time for a signal between the calibration point and an external known point; (d) time difference of arrival at the calibration point with respect pairs of external points located within or in proximity to region R as measured by either a receiver at the calibration point or the external points; (e) the serving cell or sector for a mobile wireless device operating at that calibration point; (f) the network state at the time of collection—a finite number of such states may be required to distinguish between network conditions that vary diurnally, weekly or in some other manner; and (g) combinations of the above.

As a non-limiting example, the case in (a) may apply to the Integrated Digital Enhanced Network ("IDEN") specification, (c) may apply to the Global System for Mobile communications ("GSM") specification as in the Timing Advance ("TA") parameter or the Round Trip Time ("RTT") parameter in the Universal Mobile Telecommunications System ("UMTS") specification, (d) may apply to the UMTS specification, while the external receivers may be the base stations. In general, the calibration data may be any of those measurements made by a mobile wireless device located at the calibration point or any measurement made on the transmissions or characteristics of the mobile wireless device at a set of external transmitter/receivers in the region R or in proximity thereto.

The calibration data may consist of many such sets (i.e., vectors) obtained at one or more calibration points. At each calibration point, the data gathering may have resulted in either a single data vector or multiple data vectors, so that there are potentially multiple sets of data and/or data vectors associated with each calibration point.

A NUG generator or a method to produce NUGs may begin the NUG generation operation using, for example, one of more of the following: (a) a fixed uniform grid ("UG") defined over the region R with the calibration point data being assigned to the fixed grid points by some rule (e.g., allocated by closest fixed grid point, a centroid of a set of fixed grid points, etc.); (b) random grid points to define the start of each NUG; (c) combinations of (a) and (b) depending on the characteristics of the calibration data; or (d) some other useful method.

In any of these cases, the NUG generator may evaluate the data vectors at a particular (candidate) calibration point, or at a fixed grid point to which the data vector(s) is/are assigned. This calibration point or grid point may serve as the root of a first NUG. The root of the NUG may be the calibration data vector that initiates the creation of that NUG. The vectors may be examined using, for example, increasingly stringent tests of statistical sufficiency. In particular, a determination may be made as to whether the data vectors exhibit clustering. If the data exhibits tight clustering, the data for the next candidate calibration point may be aggregated to the former calibration point and the clustering property may be re-evaluated. For example, if the second calibration point also has a cluster but this cluster is sufficiently different than the cluster of the first calibration point, a determination may be made that the data for the two considered calibration points should be allocated to the roots of separate NUGs. If the aggregate cluster (i.e., a cluster including data from both the first and second calibration points) is statistically very similar to either of the first or second clusters (taken independently), then the data for the two calibration points may be allocated to the same NUG. All adjacent calibration data points may be similarly evaluated with respect to the first considered calibration point. Thus one or more of the adjacent calibration points may either wind up having all their data accumulated into a single NUG or, at the other extreme, each such calibration point may become the root of a separate NUG.

The primary test made to determine the allocation may be one of a variety of clustering tests, such as, for example, the K-means algorithm. Statistical similarity may be determined by, for example, the probability density function ("pdf") of the data parameters (e.g., neighboring cell signal levels, timing information, etc.), the mean and variance of the data parameters, the serving cell/sector, or other functions of the calibration data.

Those measurements or parameter values that do not cluster may be referred to as outliers. The performance of a grid-based pattern matching system such as that disclosed herein is typically dependent on stored received signal level measurements that accurately reflect the levels that are likely to be reported by the mobile device to be located. If the drive test data, for example, used to create the RF signal level grid contains outlier measurements, the statistically consistent value of the signal level will be distorted. Therefore, the present subject matter also describes a system and method used to identify and eliminate outlier signal level measurements and timing advance values (or in general, any parameter within the NMR) during NUG or grid creation so as to improve the estimate of the mean parameter value.

As a non-limiting example, in a very simple consideration of clustering one could consider the mean value of a parameter. In this scenario, neighbor cell control channel signal level measurement outliers could be eliminated as follows: At each grid point, the average received signal level of a particular control channel signal may be computed from all of the measurements of that signal assigned to the grid point. The deviation of each individual measurement from the mean may be computed. Measurements that deviate by more than a configurable predetermined threshold from the mean may be omitted. The average may then be recomputed without the omitted outliers. In a scenario where there are very few measurements, typically less than five or so, the original mean value will be greatly influenced by any outlier measurements and thus may falsely identify too many of the measurements as outliers, or fail to detect outliers at all. For this reason, another parameter is used to only perform the outlier check if there are at least a minimum number of measurements.

In a more general case, a cluster may be a region in N-dimensional NMR vector space where there is a sufficient number of such vectors with a mutual variation such that the mutual variation could be ascribed purely to noise in the measurement. Thus, for example, if within a few feet of the original measurement, if a particular parameter is blocked (say by a large structure such as a building) that parameter would fall out of the original cluster. If sufficient such blocked locations have data falling near the original cluster, one may obtain a secondary cluster where the difference between the first and second clusters is the large variation in this particular parameter.

In addition, if any of the examined sets of data associated with a calibration point exhibit more than one cluster, it may be necessary to define one or more co-located NUGs. Thus, if there are, for example, three well defined clusters associated with a particular calibration point, these clusters could form the roots of three co-located NUGs. The data in these NUGs may grow depending on whether similar clusters can also be found in adjacent (or close) calibration points in which case the similar clusters may be aggregated to the original NUGs or, if the adjacent clusters are not similar, the adjacent clusters (or cluster) may form separate root NUGs (or NUG).

Further, if the quantity of data associated with a particular calibration point is insufficient to sensibly test for statistical similarity or clustering, data from adjacent calibration grid points may be accumulated first and the statistical or clustering test performed thereafter. Thus, based on the results of the clustering test using the accumulated data the determination of how one should separate out the data into NUGs may be made.

The technique may be repeated until all calibration grid points in the region R are exhausted. At the end of this process one has divided the region into a collection of NUGs, where multiple co-located NUGs may exist. The NUGs may fully cover the region R and each NUG may have statistically similar data accumulated into itself. The geometrical shape (i.e., the shape defined by the union of locations of calibration points assigned to the NUG) and the amount of data accumulated into such NUGs is seen to be variable since these are determined by the statistical similarity of the data allocated to a NUG.

Additionally, we may also consider the method of generating NUGs based not on statistical consistency of calibration data, but on other conditions such as (a) a minimum number of unique neighbors observed in data accumulated from allocated calibration grid points; (b) a minimum number of data vectors (NMRs); (c) a maximum and/or minimum NUG radius; (d) a specific set of neighboring cells; (e) a specific set of neighboring cells with power ordering; or (f) any combination of the above. Additionally, the method of using statistical consistency or similarity or data clustering combined with any of these other conditions may be employed.

For each so obtained NUG, a variety of parameters and functions may be generated and stored to describe that NUG. These are termed the NUG characteristics. The NUG characteristics are a representation in that attempt to capture the nature and variability of the data associated with that NUG in a compact and representative form. These characteristics may include, but are not limited to, the following: (a) an ordered list of neighboring cells; (b) functions defined on the absolute neighboring cell power levels (e.g., mean, median, $k^{th}$ moment, cluster-mean, etc.); (c) functions defined on the relative neighboring cell power differences (e.g., mean, median, $k^{th}$ moment, cluster-mean, etc.); (d) serving cell/sector; (e) timing advance parameter (or equivalent); (f) individual pdf (probability density function or probability distribution function) of each neighboring cell power level; (g) joint pdf of neighboring cell power levels; (h) mean and variance of neighboring cell power levels; (i) mobile device orientation (e.g., indoors, outdoors, direction mobile device is facing (e.g., North, South, etc.), tilted upwards, azimuth, elevation, etc.); (j) a compact and/or efficient representation that enables retrieval of the calibration data NMR vectors assigned to this NUG; (k) the network state as indicated in the calibration data; (l) a confidence measure indicative of the reliability of the calibration data feeding this NUG; and (m) any combinations of the above.

If a pdf is determined for a NUG, that pdf may be generated using either the Parzen technique or the method of Gaussian mixtures or some variant thereof. In addition when a need to specify the variance or covariance exists, that parameter may be set to a value dependent on the observed variance for a particular neighboring cell power level or the observed covariance matrix for a set of neighboring cell power levels.

The location ascribed to the NUG may be, for example, any internal point within the NUG. If the NUG contains only a single calibration point, the location of the NUG may be set as the location of the calibration point. If the NUG encompasses several calibration points, the location of any one of the calibration points or the centroid of such calibration points or some other similar measure may be used to define the NUG location. Also, in the case of multiple co-located NUGs, all such NUGs may have their assigned location set to the same value.

With reference now to FIG. 1, a flow chart is depicted for a method for assigning geographical coordinates according to an embodiment of the present subject matter. At block 101, calibration data may be provided for each of one or more calibration points in a geographic region. At block 102, for each of the calibration points calibration data associated with the calibration point is evaluated and a determination is made as to whether a grid point, such as a NUG, should be defined. If it is determined that a grid point is to be defined, geographical coordinates are assigned to the grid point so that the grid point may be useful in estimating the location of a mobile device.

Figure 2:
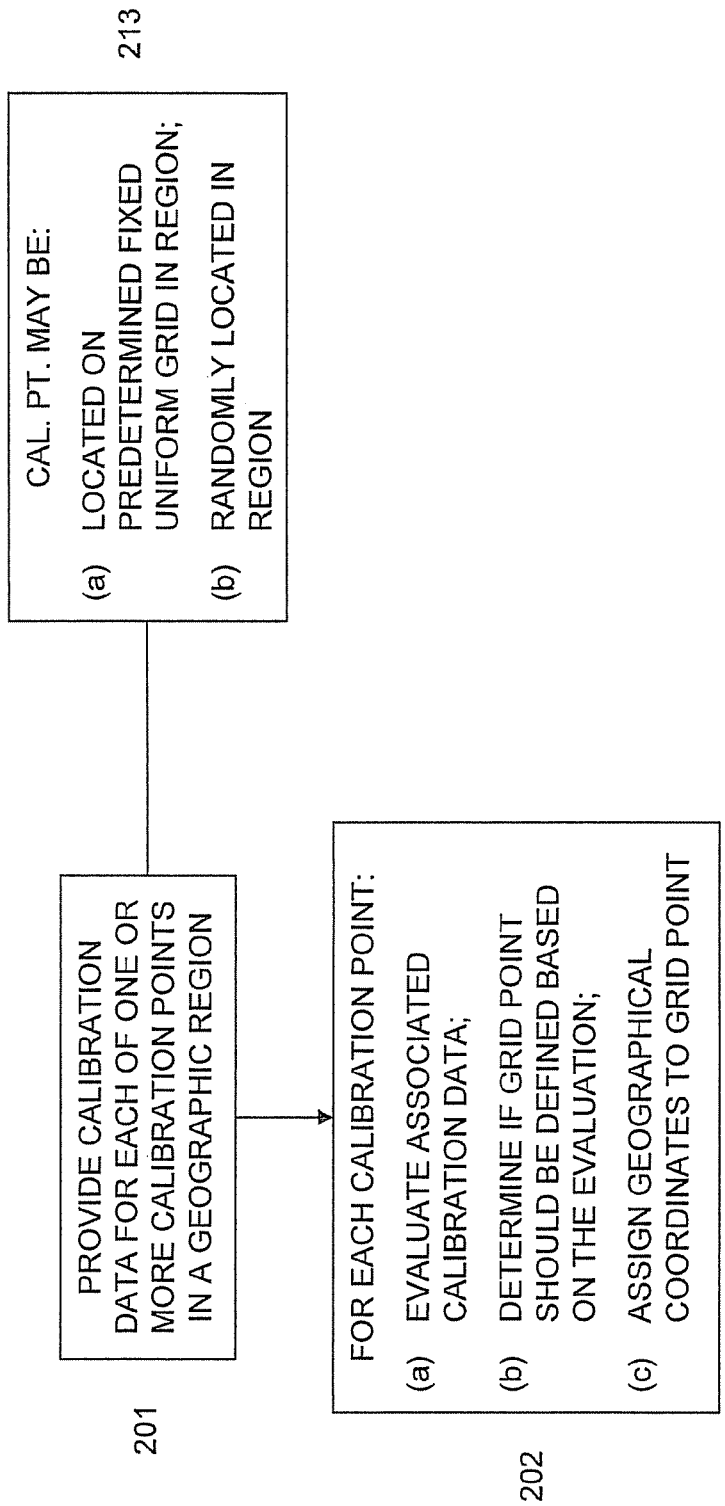
FIG. 2 is a flow chart for a method for assigning geographical coordinates including a calibration point according to an embodiment of the present subject matter.

FIG. 2 is a flow chart for a method for assigning geographical coordinates including a calibration point according to an embodiment of the present subject matter. Blocks 201 and 202 are similar to blocks 101 and 102, respectively. At block 213, the calibration point may be located on a predetermined fixed uniform grid defined over the geographic region or the calibration point may be randomly located within the geographic region.

Figure 3:
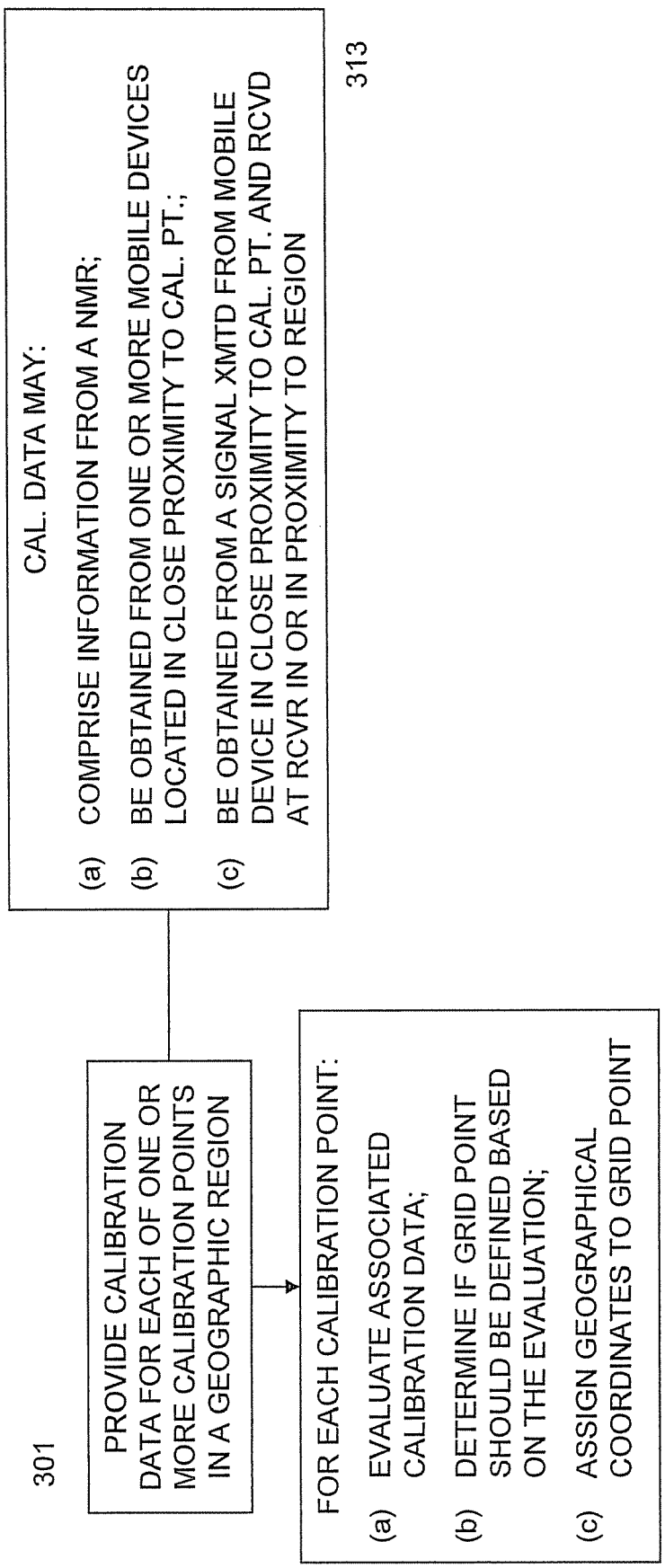
FIG. 3 is a flow chart for a method for assigning geographical coordinates including calibration data according to an embodiment of the present subject matter.

FIG. 3 is a flow chart for a method for assigning geographical coordinates including calibration data according to an embodiment of the present subject matter. Blocks 301 and 302 are similar to blocks 101 and 102, respectively. At block 313, the calibration data associated with one or more calibration points may be comprised of information from a NMR, or the calibration data for a particular calibration point may be obtained from one or more mobile devices located at or in close proximity to the calibration point, or the calibration data for a particular calibration point may be obtained from a signal transmitted from a mobile device (or devices) located at or in close proximity to the calibration point where the signal is received by a receiver in or in proximity to the geographic region.

Figure 4:
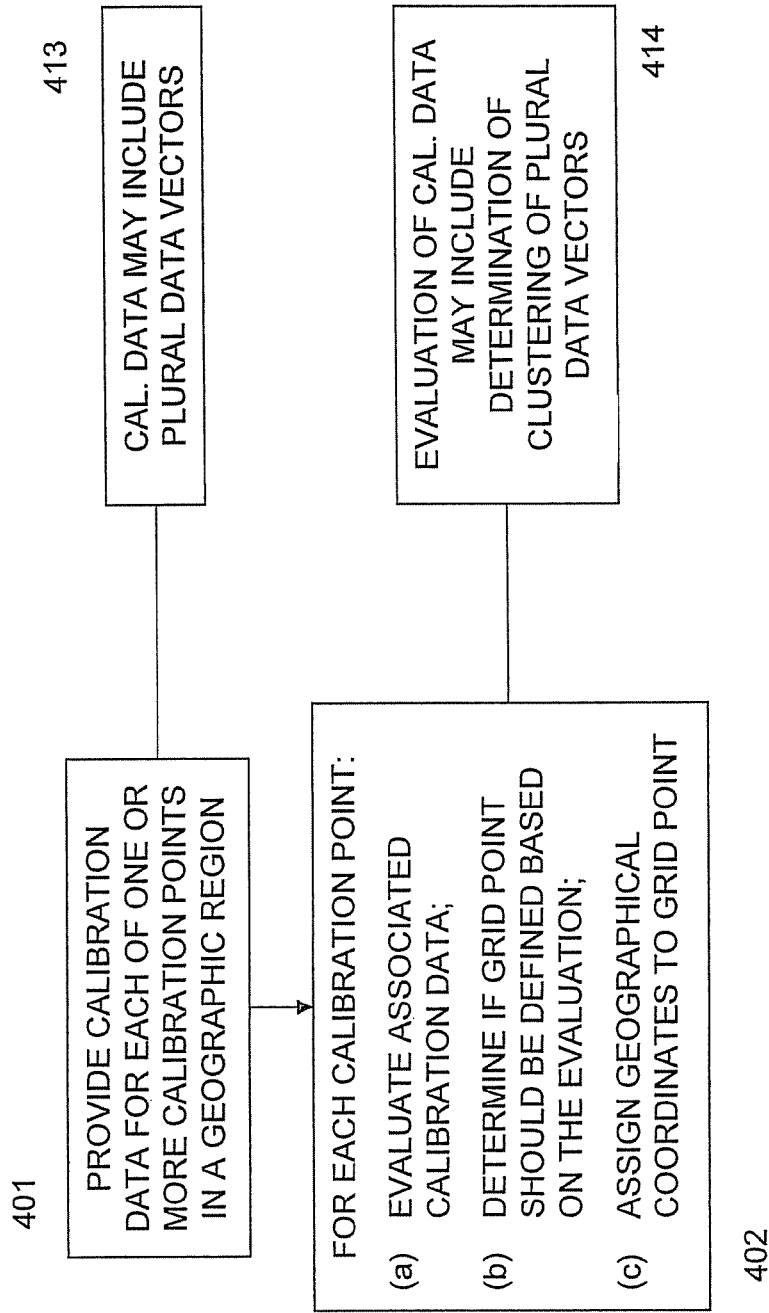
FIG. 4 is a flow chart for a method for assigning geographical coordinates including clustering of data according to an embodiment of the present subject matter.

FIG. 4 is a flow chart for a method for assigning geographical coordinates including clustering of data according to an embodiment of the present subject matter. Blocks 401 and 402 are similar to blocks 101 and 102, respectively. At block 413, for one or more of the calibration points the calibration data may include multiple data vectors and, at block 414, the evaluation of the data vectors may include a determination of clustering of the multiple data vectors as described above.

Figure 5:
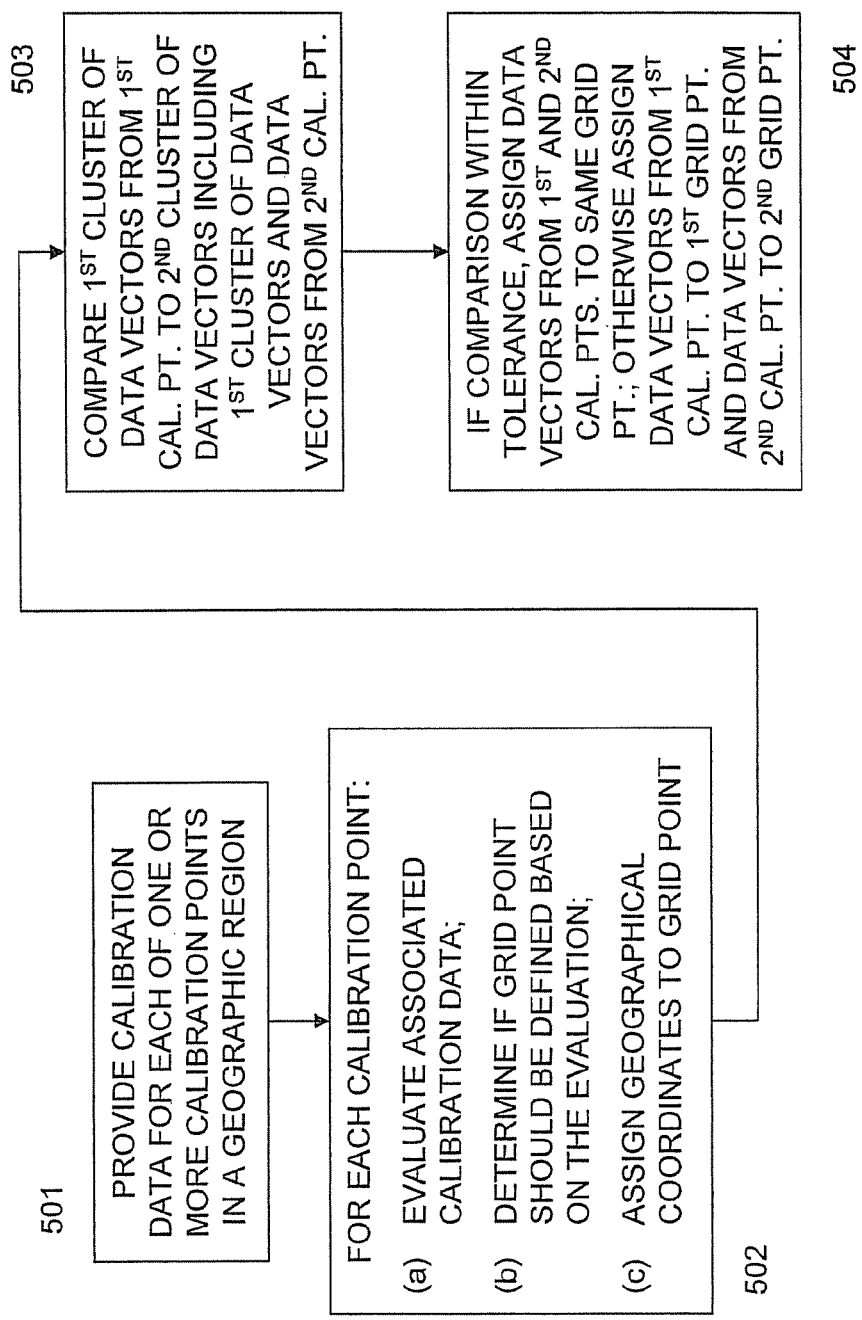
FIG. 5 is a flow chart for a method for assigning geographical coordinates including clustering of data vectors according to an embodiment of the present subject matter.

Considering now the flow chart depicted in FIG. 5, the flow chart indicates a method for assigning geographical coordinates including clustering of data vectors according to an embodiment of the present subject matter. Blocks 501 and 502 are similar to blocks 101 and 102, respectively. At block 503, the determination of whether at least one grid point should be defined based on the evaluation of the calibration data associated with a calibration point includes a comparison of a first cluster of data vectors from a first calibration point to a second cluster of data vectors where the second cluster of data vectors includes the first cluster of data vectors as well as data vectors from a second calibration point. At block 504, if the comparison in block 503 results in the difference between the first and second cluster of data vectors being within a predetermined tolerance value, then the data vectors from the first and second calibration points are assigned to the same grid point. However, if the comparison is not within tolerance, then the data vectors from the first calibration point are assigned to a first grid point and the data vectors from the second calibration point are assigned to a second grid point.

Figure 6:
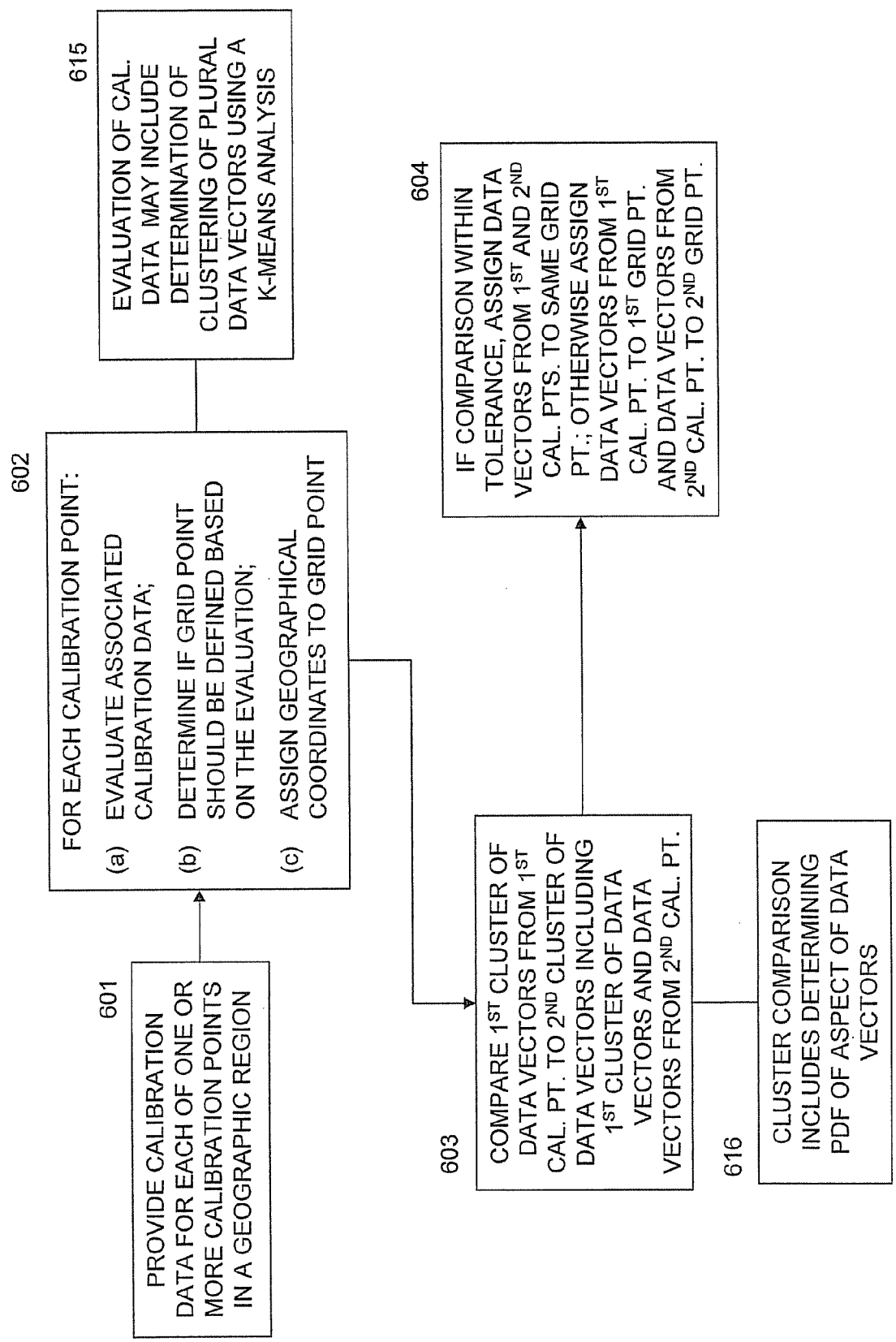
FIG. 6 is a flow chart for a method for assigning geographical coordinates including clustering according to an embodiment of the present subject matter.

The flow chart shown in FIG. 6 illustrates another method for assigning geographical coordinates including clustering according to an embodiment of the present subject matter. Here, blocks 601, 602, 603, and 604 are similar to blocks 501, 502, 503, and 504, respectively. At block 615 the evaluation of calibration data for one or more calibration points may include determining the clustering of plural data vectors using a K-means analysis. At block 616 the comparing of clusters of data vectors may include determining a probability density function of an aspect of the data vectors.

Figure 7:
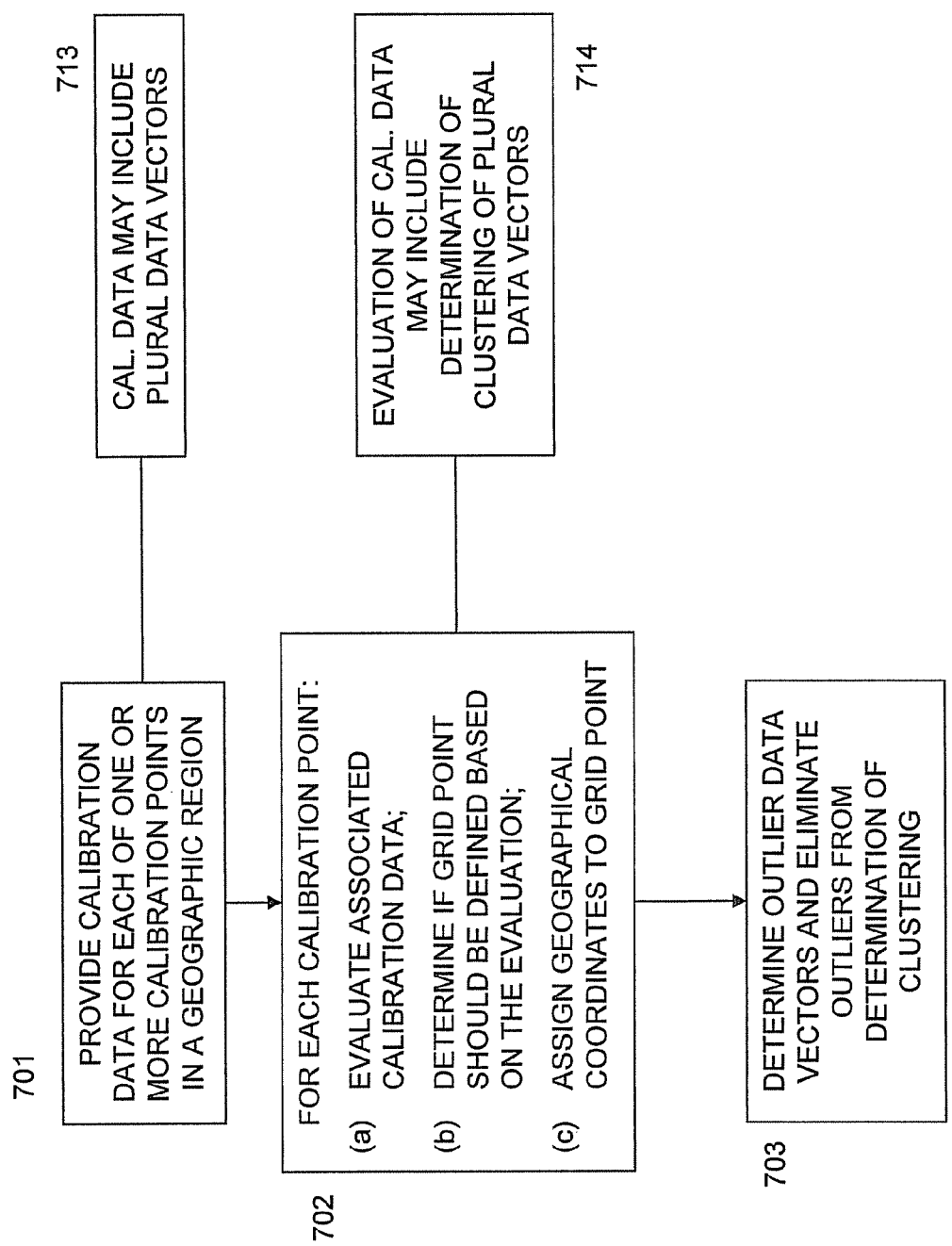
FIG. 7 is a flow chart for a method for assigning geographical coordinates including determining outliers according to an embodiment of the present subject matter.

FIG. 7 is a flow chart for a method for assigning geographical coordinates including determining outliers according to an embodiment of the present subject matter. Blocks 701, 702, 713, and 714 are similar to blocks 401, 402, 413, and 414, respectively. At block 703, a determination of outlier data vectors may be made and the outlier data vectors may be eliminated from the determination of data vector clustering.

Figure 8:
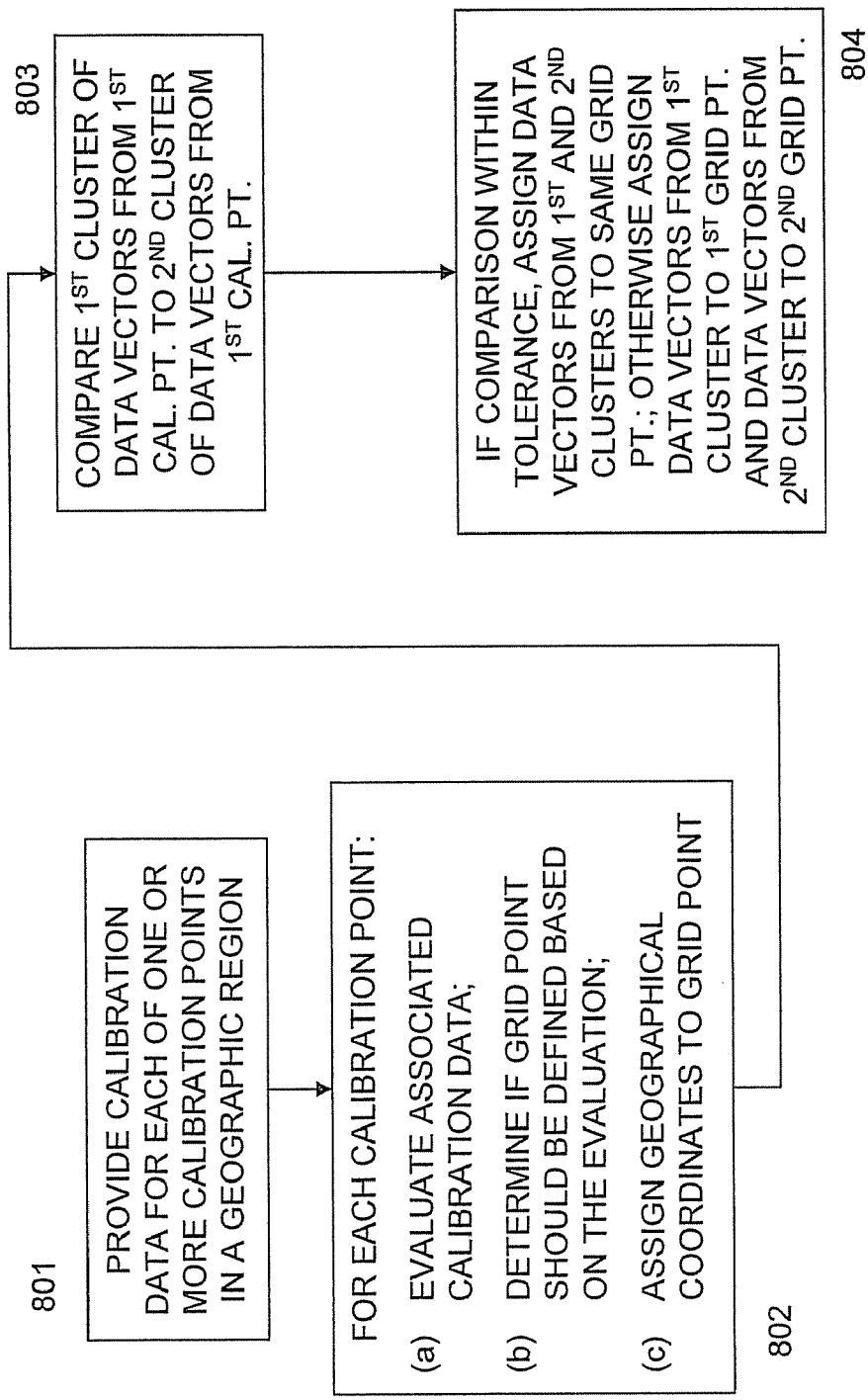
FIG. 8 is a flow chart for a method for assigning geographical coordinates including clustering of data vectors at the same calibration point according to an embodiment of the present subject matter.

Regarding FIG. 8, a flow chart is represented for a method for assigning geographical coordinates including clustering of data vectors at the same calibration point according to an embodiment of the present subject matter. Blocks 801 and 802 are similar to blocks 101 and 102, respectively. At block 803, the determination if at least one grid point should be defined based on the evaluation of calibration data may include a comparison of a first cluster of data vectors associated with a first calibration point to a second cluster of data vectors associated with the first calibration point. If the result of the comparison is within a predetermined tolerance, then the data vectors from the first and second clusters may be assigned to the same grid point; otherwise, the data vectors from the first cluster may be assigned to a first grid point while the data vectors from the second cluster may be assigned to a second grid point.

Figure 9:
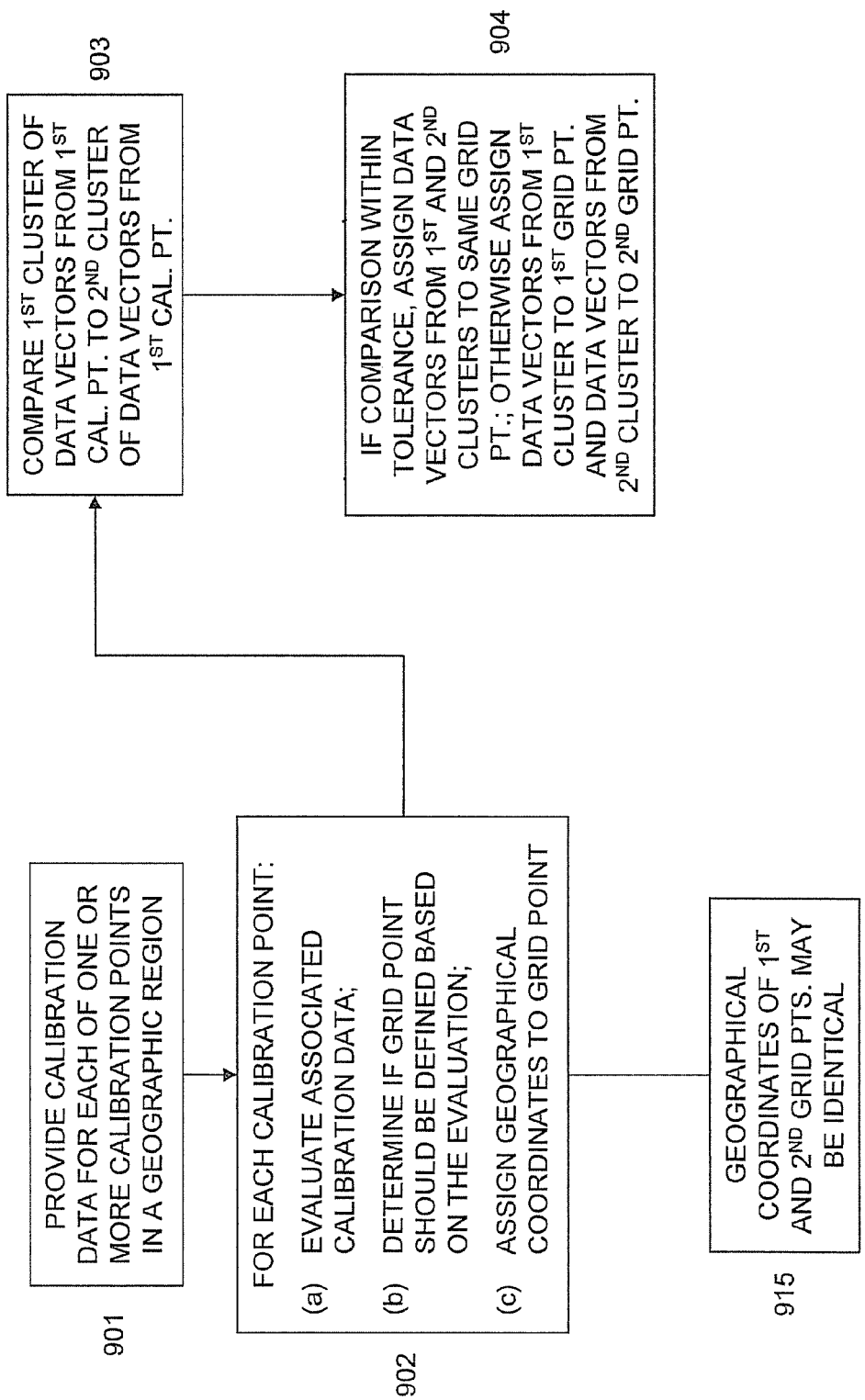
FIG. 9 is a flow chart for a method for assigning geographical coordinates including clustering of data vectors at the same calibration point according to an embodiment of the present subject matter.

FIG. 9 is a flow chart illustrating another method for assigning geographical coordinates including clustering of data vectors at the same calibration point according to an embodiment of the present subject matter. Here, blocks 901, 902, 903, and 904 are similar to blocks 801, 802, 803, and 804, respectively. At block 915 the geographical coordinates assigned to the first and second grid points may be identical.

Figure 10:
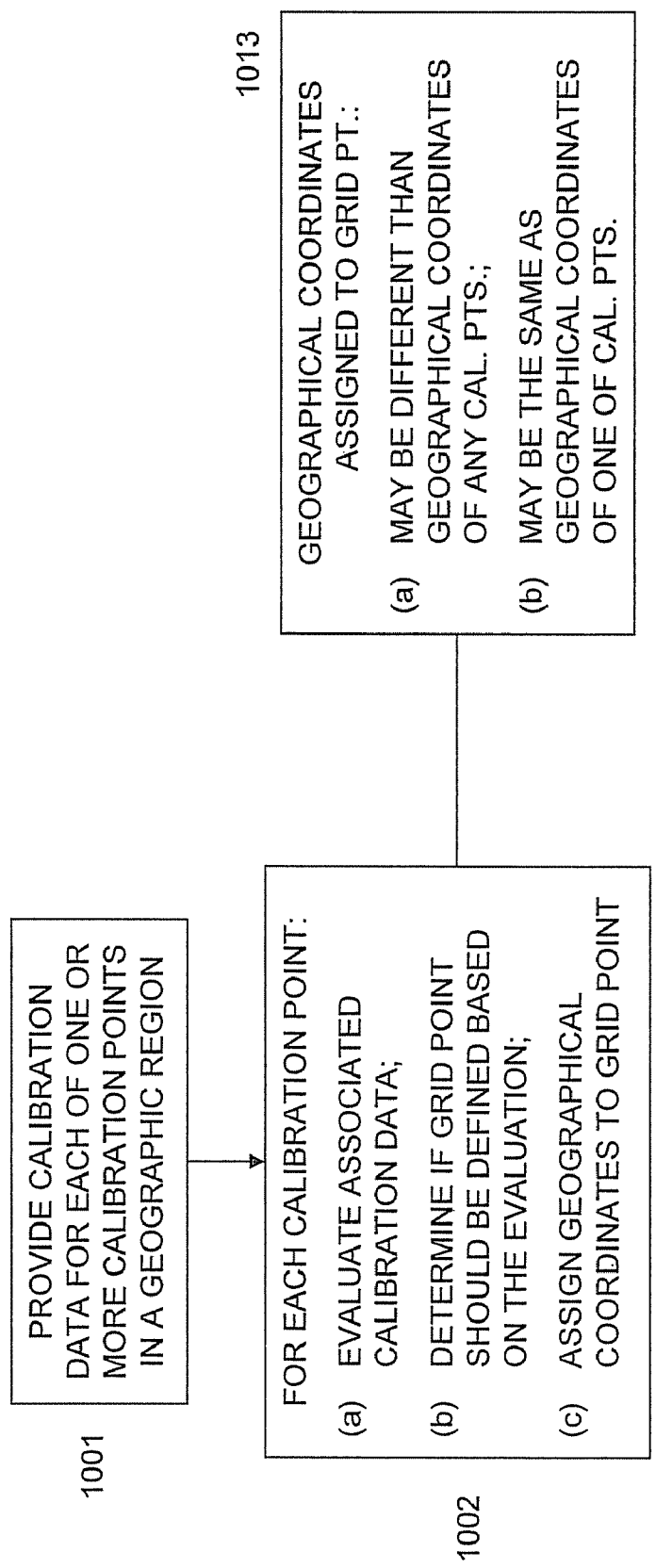
FIG. 10 is a flow chart for a method for assigning geographical coordinates to a grid point according to an embodiment of the present subject matter.

Directing attention now towards FIG. 10, a flow chart is presented for a method for assigning geographical coordinates to a grid point according to an embodiment of the present subject matter. Blocks 1001 and 1002 are similar to blocks 101 and 102, respectively. At block 1013, the geographical coordinates assigned to a first grid point may be different than the geographical coordinates assigned to a second grid point or the geographical coordinates assigned to a first grid point may be the same as the geographical coordinates assigned to a second grid point.

Figure 11:
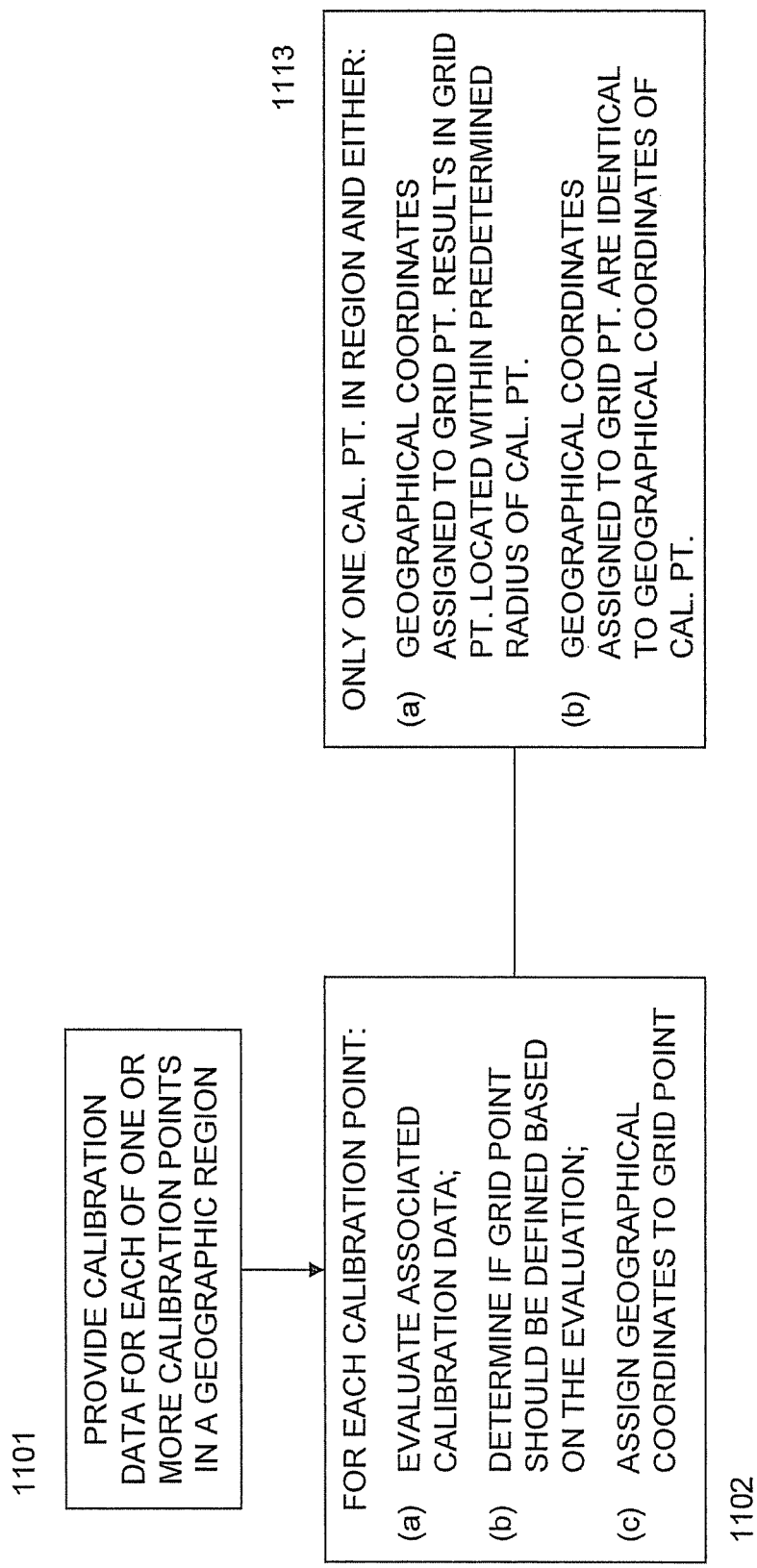
FIG. 11 is a flow chart for a method for assigning geographical coordinates including assigning geographical coordinates to a grid point where only one calibration point is in a geographic region according to an embodiment of the present subject matter.

FIG. 11 is a flow chart for a method for assigning geographical coordinates including assigning geographical coordinates to a grid point where only one calibration point is in a geographic region according to an embodiment of the present subject matter. Blocks 1101 and 1102 are similar to blocks 101 and 102, respectively. At block 1113, if there is only one calibration point within the geographic region, then the geographical coordinates assigned to a grid point may result in the grid point being located within a predetermined radius of the one calibration point. Or, the geographical coordinates assigned to a grid point may be identical to the geographical coordinates of the calibration point.

Figure 12:
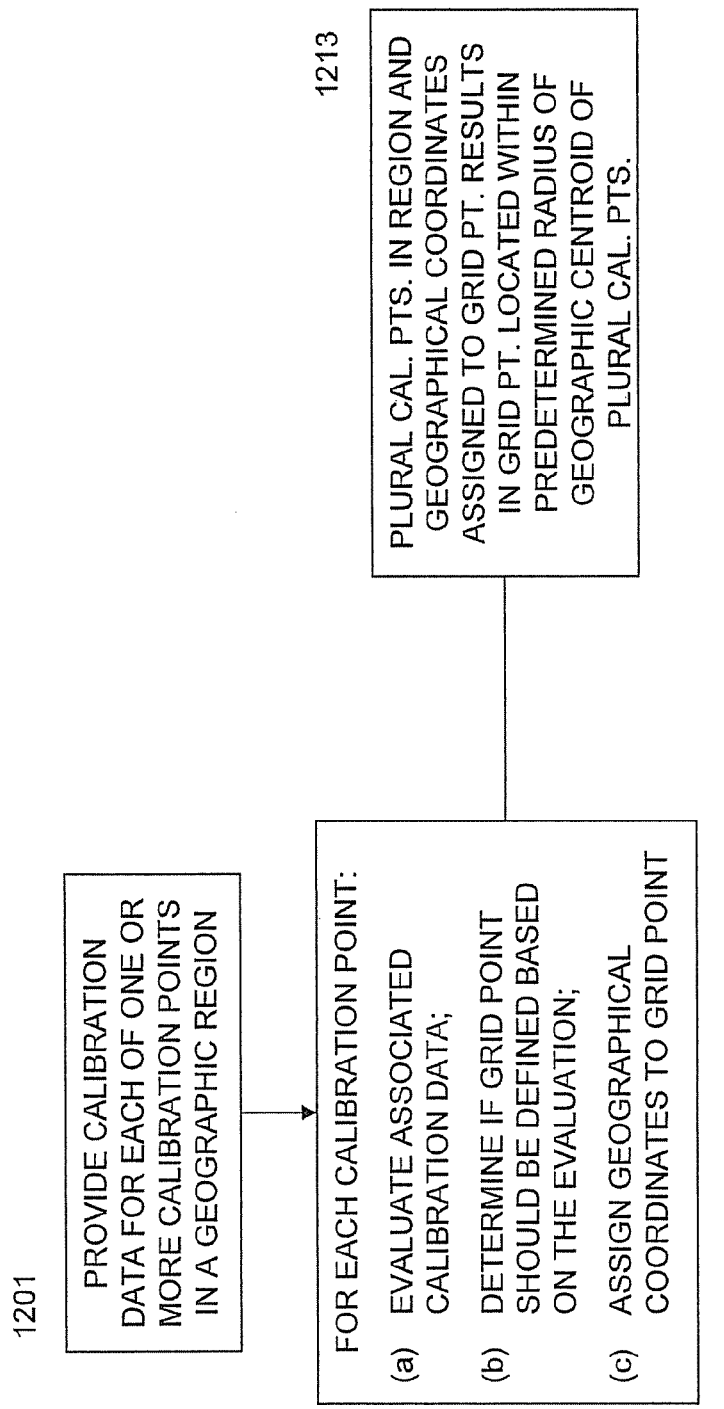
FIG. 12 is a flow chart for a method for assigning geographical coordinates including assigning geographical coordinates to a grid point where there are plural calibration points in a geographic region according to an embodiment of the present subject matter.

Moving now to FIG. 12, a flow chart is shown for a method for assigning geographical coordinates including assigning geographical coordinates to a grid point where there are plural calibration points in a geographic region according to an embodiment of the present subject matter. Blocks 1201 and 1202 are similar to blocks 101 and 102, respectively. At block 1213, where there are multiple calibration points in the geographic region, the geographical coordinates assigned to a grid point may result in the grid point being located within a predetermined radius of a centroid of a polygon formed by connecting the multiple calibration points.

Figure 13:
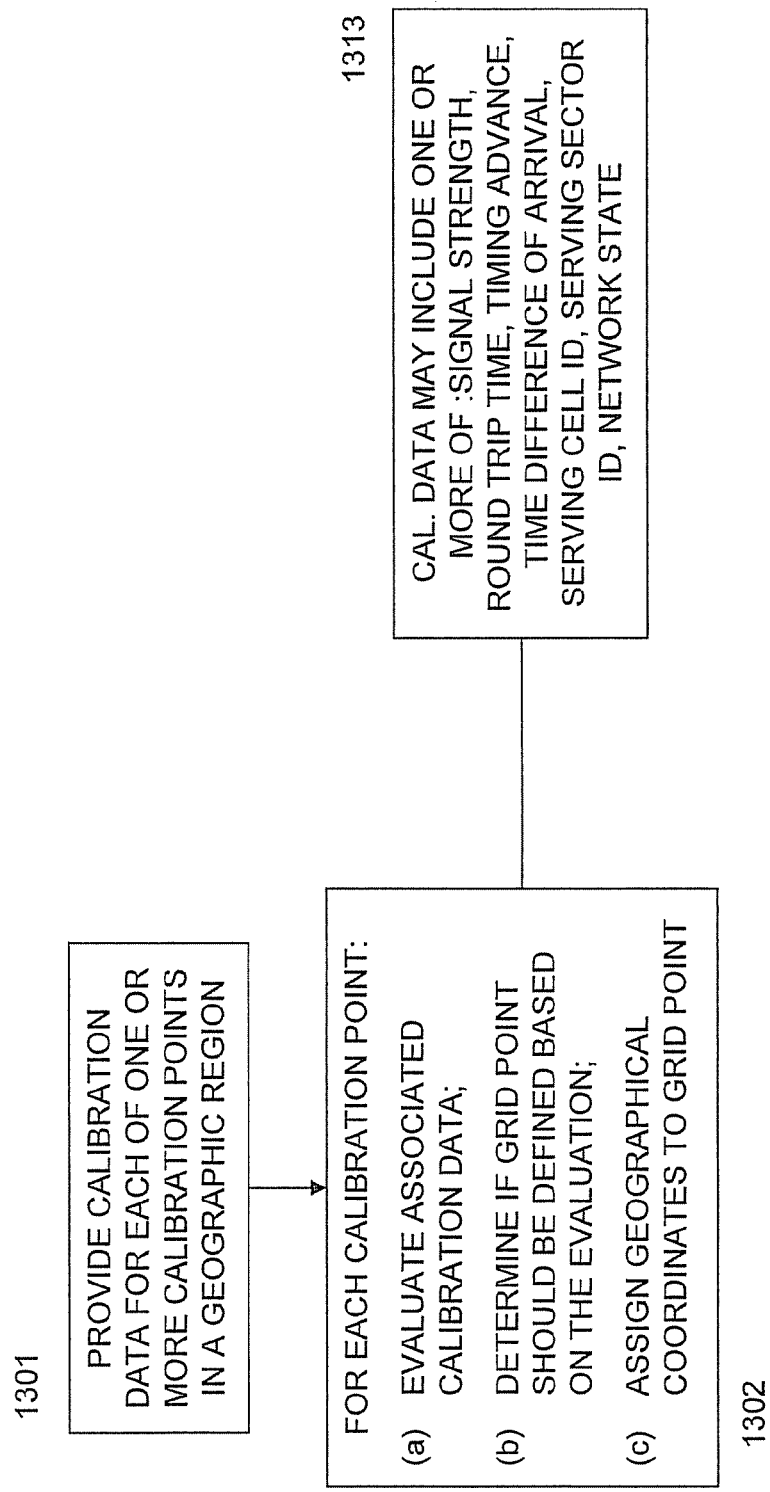
FIG. 13 is a flow chart for a method for assigning geographical coordinates including calibration data information according to an embodiment of the present subject matter.

FIG. 13 is a flow chart for a method for assigning geographical coordinates including calibration data information according to an embodiment of the present subject matter. Blocks 1301 and 1302 are similar to blocks 101 and 102, respectively. At block 1313, the calibration data may include one or more of the following: signal strength for a signal transmitted by a transmitter having a known location as received by a receiver at a calibration point; signal strength of a signal transmitted by a transmitter located at a calibration point as received by a receiver at a known location; round trip time for a signal traveling between a calibration point and a known location; timing advance of a signal received by a mobile device at a calibration point; time difference of arrival of plural signals at a calibration point with respect to a pair of known locations as measured by a receiver at a calibration point or at the known locations; the identification of a serving cell or serving sector of a mobile device located at a calibration point; a state of a wireless network serving a mobile device, and combinations thereof.

Figure 14:
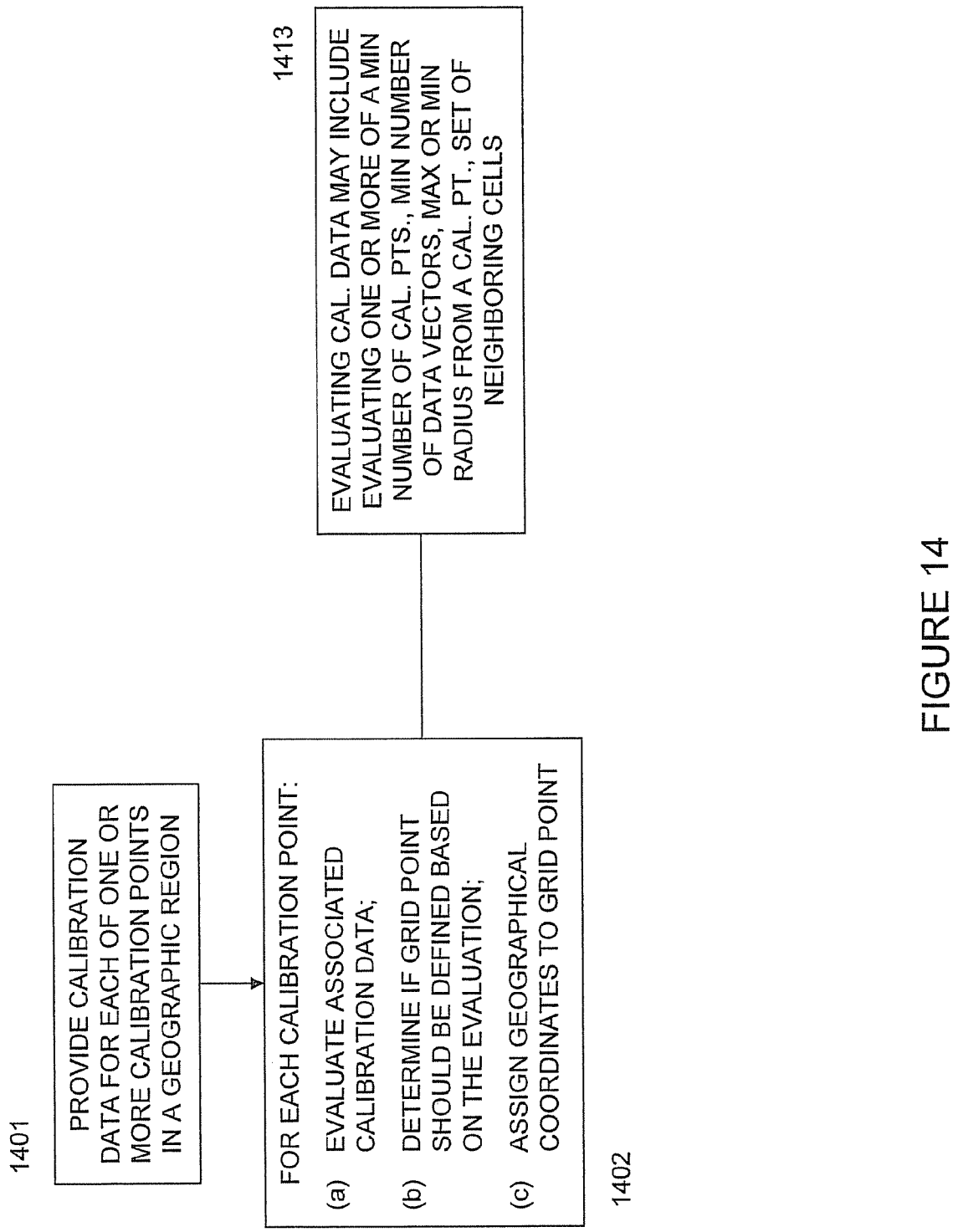
FIG. 14 is a flow chart for a method for assigning geographical coordinates including evaluating calibration data according to an embodiment of the present subject matter.

FIG. 14 is a flow chart for a method for assigning geographical coordinates including evaluating calibration data according to an embodiment of the present subject matter. Blocks 1401 and 1402 are similar to blocks 101 and 102, respectively. At block 1413, the evaluating of the calibration data associated with a calibration point may include an evaluation such as: a minimum number of unique neighboring calibration points as determined by calibration data of the neighboring calibration points; a minimum number of data vectors or network measurement reports; a predetermined maximum or minimum radius from a calibration point; a predetermined set of cells neighboring a cell serving a mobile device; and combinations thereof.

Figure 15:
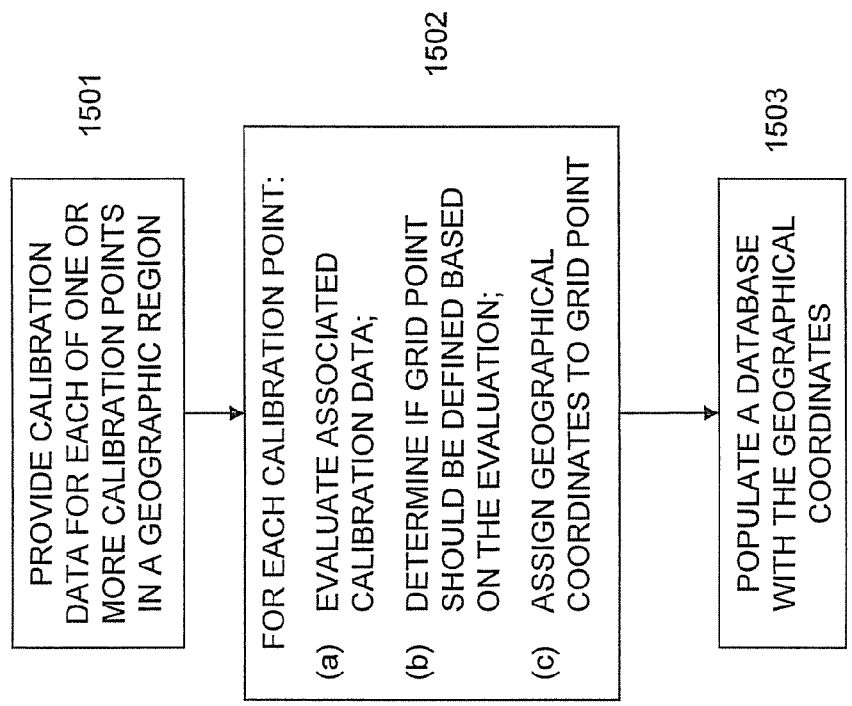
FIG. 15 is a flow chart for a method for assigning geographical coordinates including populating a database with the geographical coordinates according to an embodiment of the present subject matter.

FIG. 15 is a flow chart for a method for assigning geographical coordinates including populating a database with the geographical coordinates according to an embodiment of the present subject matter. Blocks 1501 and 1502 are similar to blocks 101 and 102, respectively. At block 1503, a database may be populated with the geographical coordinates assigned to the grid points.

Figure 16:
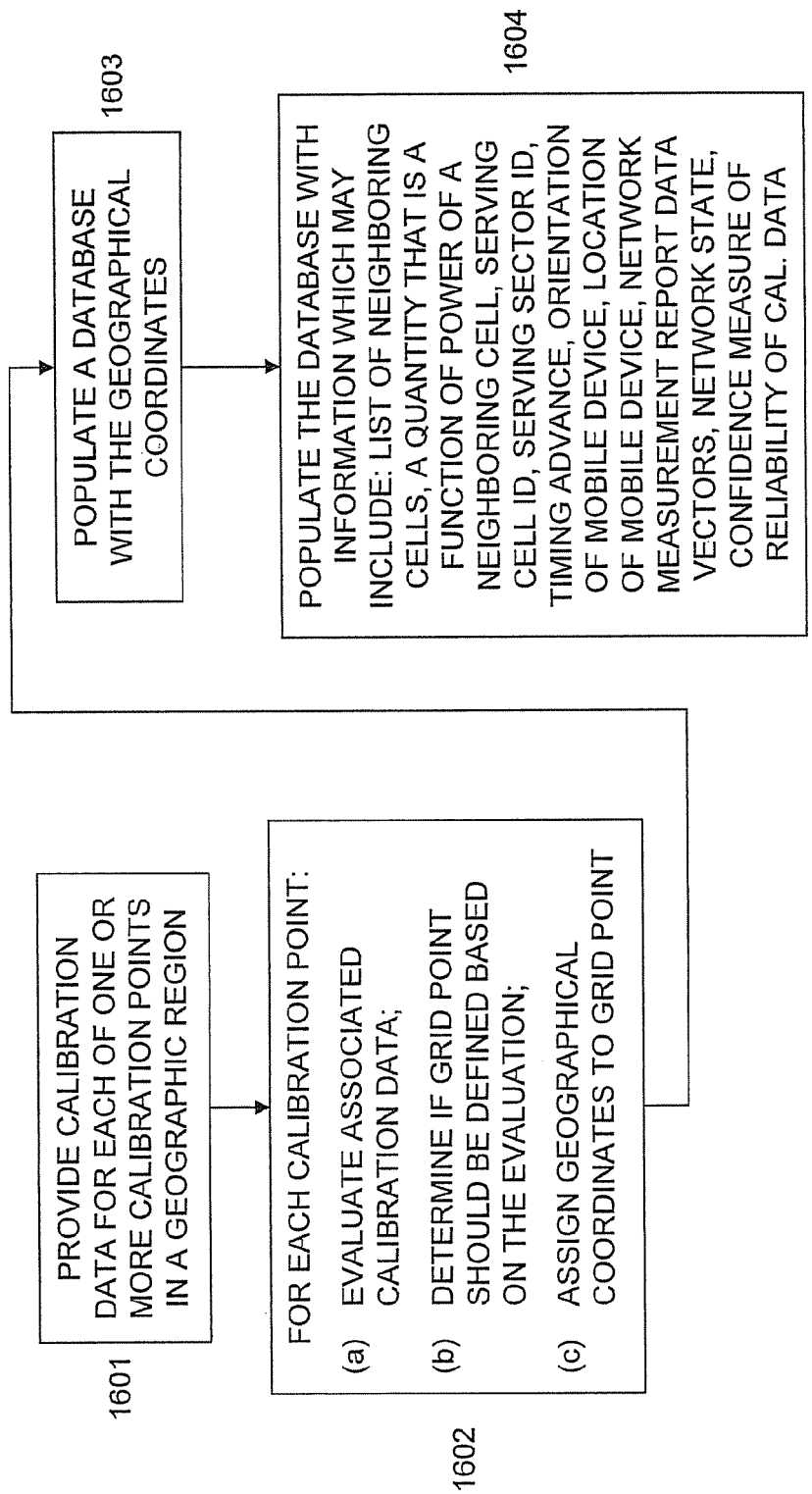
FIG. 16 is a flow chart for a method for assigning geographical coordinates including database information according to an embodiment of the present subject matter.

FIG. 16 is a flow chart for a method for assigning geographical coordinates including database information according to an embodiment of the present subject matter. Blocks 1601, 1602, and 1603 are similar to blocks 1501, 1502, and 1503, respectively. At block 1604, the database may be populated with information such as: a list of cells neighboring a cell serving a mobile device; a quantity that is a function of a power level of one or more cells neighboring a cell serving a mobile device; an identity of a cell or a sector serving a mobile device; a timing advance parameter; a geographical orientation of a mobile device; a location of a mobile device; network measurement report data vectors; a state of a network serving a mobile device; a confidence measure indicative of a reliability of the calibration data; and combinations thereof.

Figure 17:
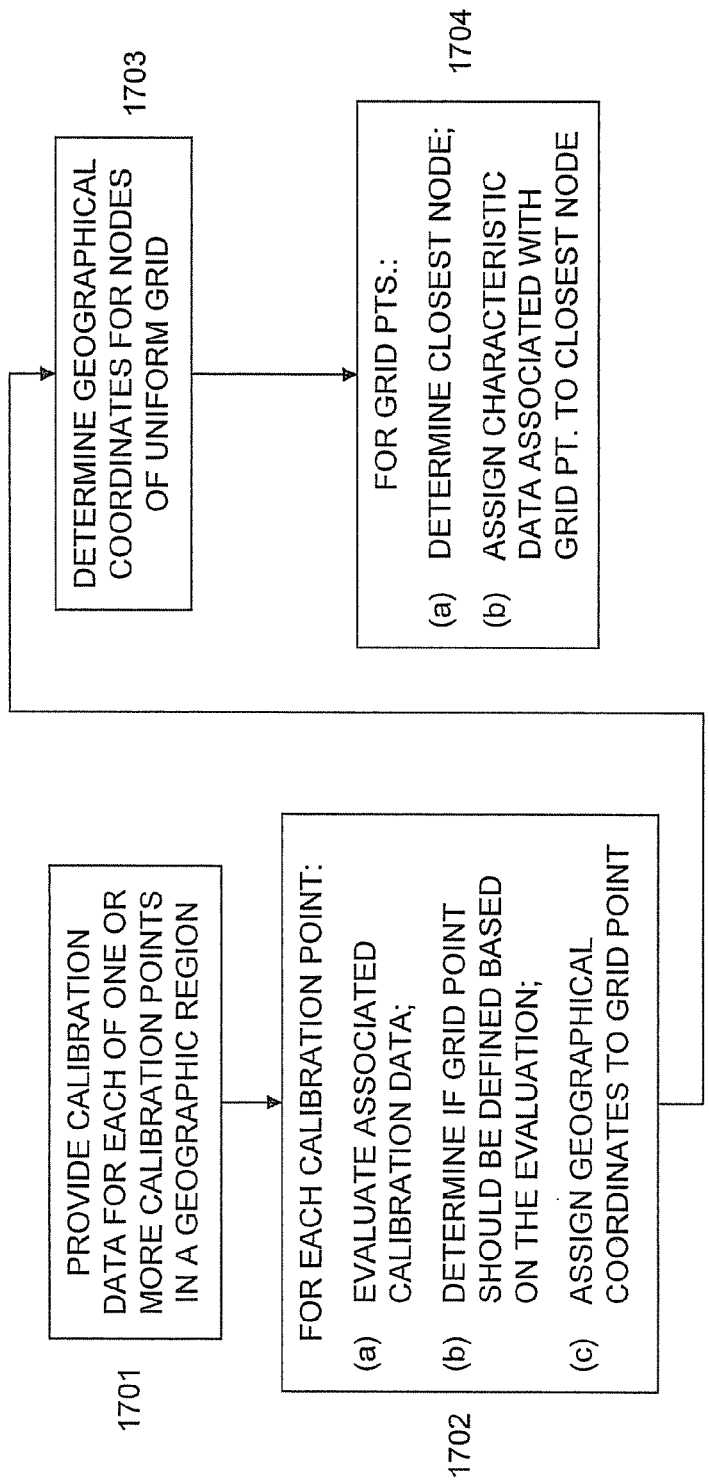
FIG. 17 is a flow chart for a method for assigning geographical coordinates including determining geographical coordinates for nodes of a uniform grid according to an embodiment of the present subject matter.

Directing attention now to FIG. 17, a flow chart is presented for a method for assigning geographical coordinates including determining geographical coordinates for nodes of a uniform grid according to an embodiment of the present subject matter. Blocks 1701 and 1702 are similar to blocks 101 and 102, respectively. At block 1703, geographical coordinates may be determined for the nodes of a uniform grid spanning the geographic region. At block 1704, for each of the grid points, a determination of the closest node of the uniform grid is made and the characteristic data associated with the grid point may be assigned to the closest node.

Figure 18:
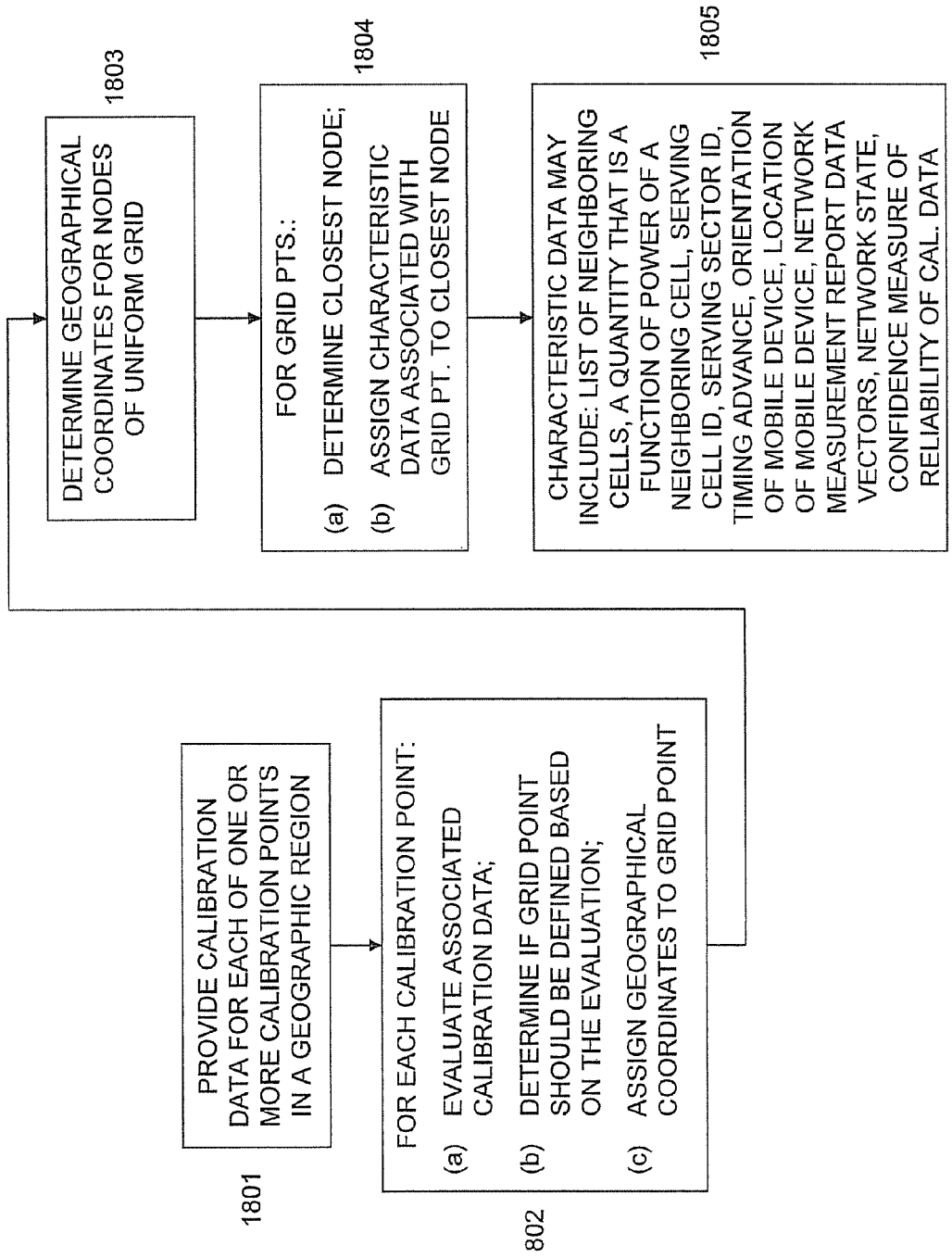
FIG. 18 is a flow chart for a method for assigning geographical coordinates including characteristic data to nodes of uniform grid according to an embodiment of the present subject matter.

Further, FIG. 18 is a flow chart for a method for assigning geographical coordinates including characteristic data to nodes of uniform grid according to an embodiment of the present subject matter. Here, blocks 1801, 1802, 1803, and 1804 are similar to blocks 1701, 1702, 1703, and 1704, respectively. At block 1805, the characteristic data may include a list of cells neighboring a cell serving a mobile device; a quantity that is a function of a power level of one or more cells neighboring a cell serving a mobile device; an identity of a cell or a sector serving a mobile device; a timing advance parameter; a geographical orientation of a mobile device; a location of a mobile device; network measurement report data vectors; a state of a network serving a mobile device; a confidence measure indicative of a reliability of the calibration data; and combinations thereof.

Figure 19:
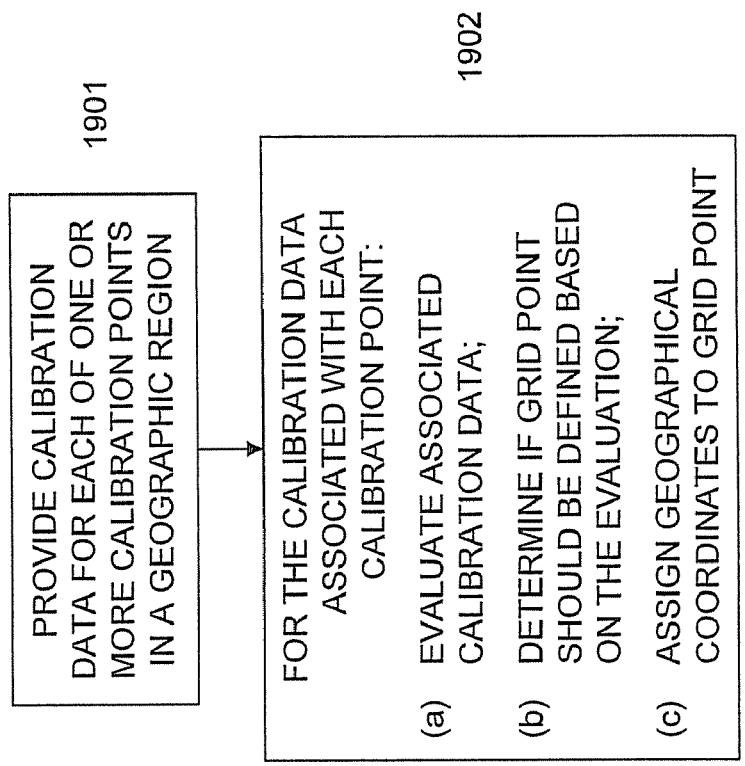
FIG. 19 is a flow chart for a method for assigning geographical coordinates for calibration data for each of one or more calibration points in a geographic region according to an embodiment of the present subject matter.

With reference to FIG. 19, a flow chart is illustrated for a method for assigning geographical coordinates for calibration data for each of one or more calibration points in a geographic region according to an embodiment of the present subject matter. At block 1901, calibration data may be provided for each of one or more calibration points in a geographic region. At block 1902, for the calibration data for each of the calibration points in the geographic region, the calibration data is evaluated and a determination is made as to whether a grid point should be defined based on the evaluation. If it is determined that a grid point is to be defined, geographical coordinates are assigned to the grid point so that the grid point may be useful in estimating the location of a mobile device.

Figure 20:
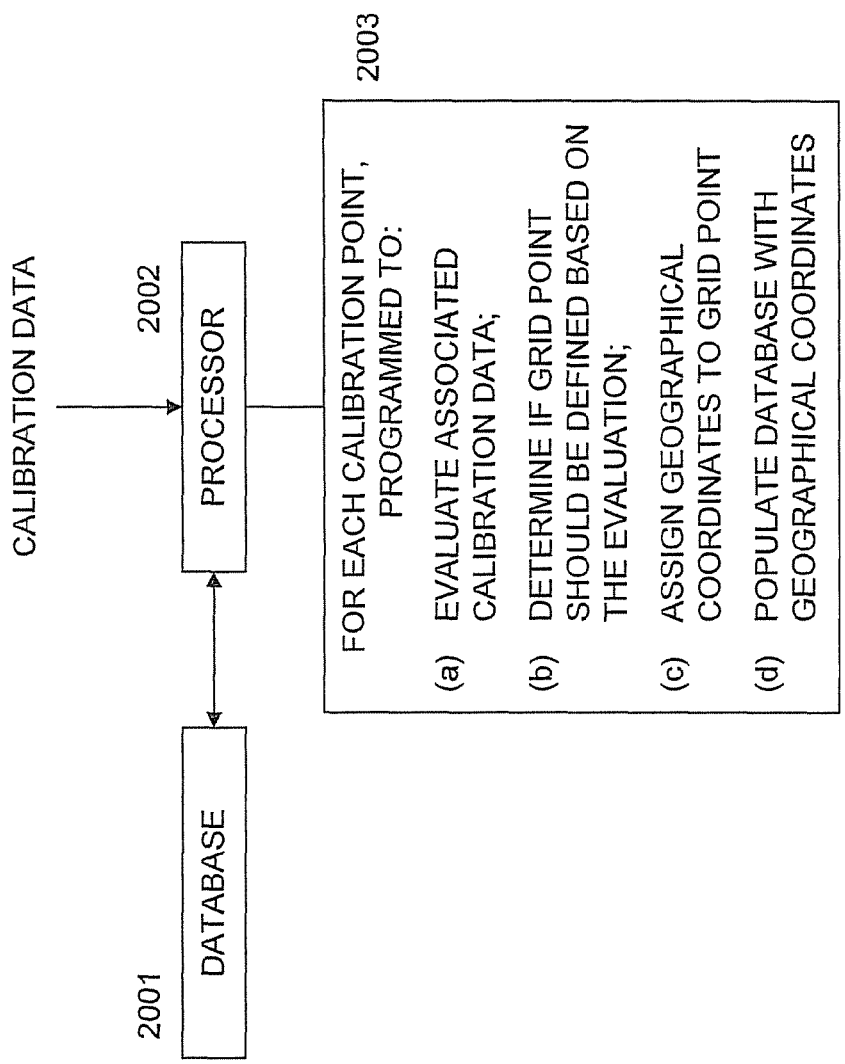
FIG. 20 is a block diagram for a system for assigning geographical coordinates according to an embodiment of the present subject matter.

With attention now directed to FIG. 20, a block diagram is presented that represents a system for assigning geographical coordinates according to an embodiment of the present subject matter. A database 2001 is operatively connected to a processor 2002. The processor 2002 is capable of receiving calibration data for each of one or more calibration points in a geographic region. The processor 2002 may be programmed, as shown in block 2003, to evaluate the calibration data associated with the calibration points, determine if at least one grid point should be defined based on the evaluation, assign geographical coordinates to the one or more grid points, and populate the database 2001 with the geographical coordinates.

Figure 21:
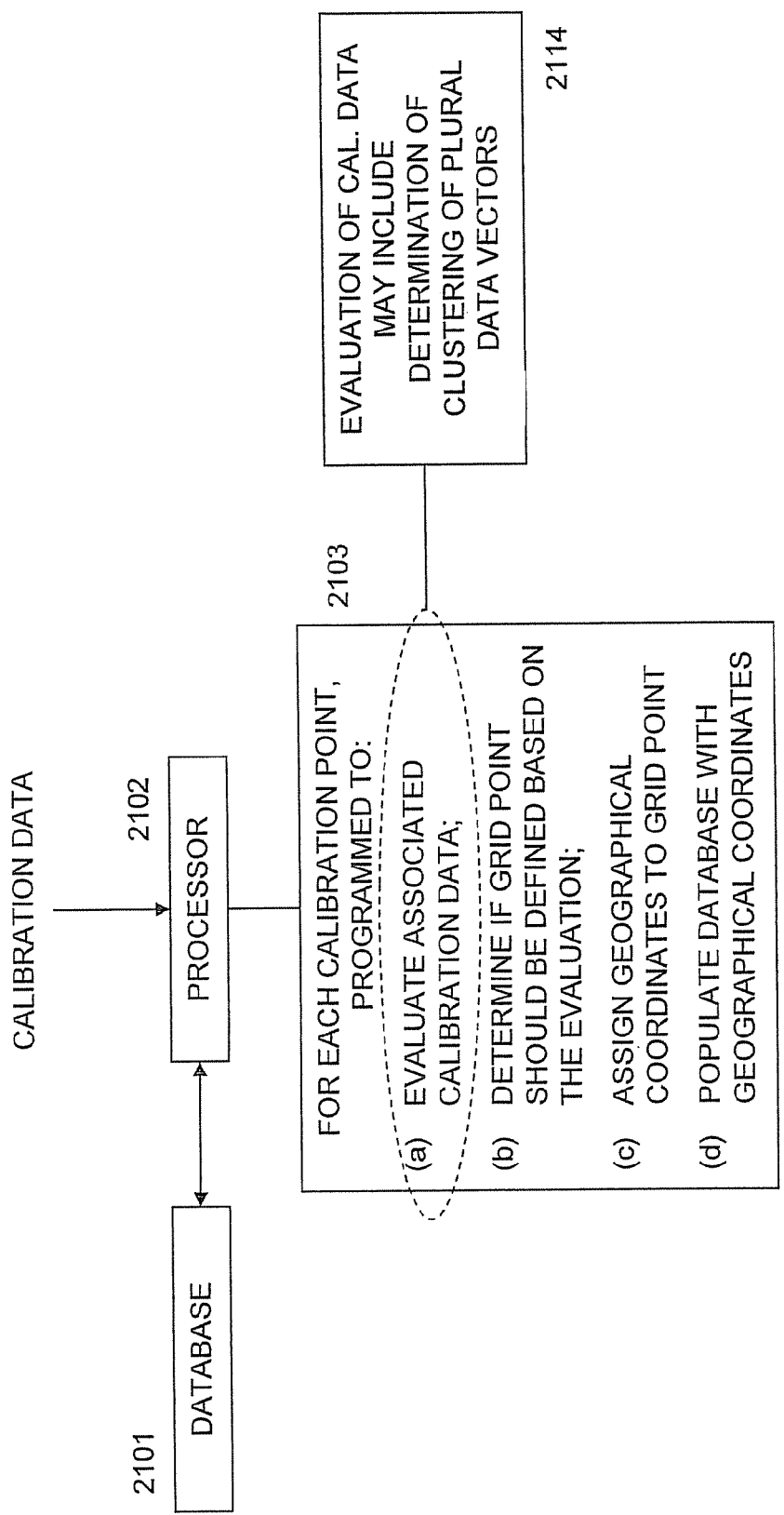
FIG. 21 is a block diagram for a system for assigning geographical coordinates including a determination of clustering of plural data vectors according to an embodiment of the present subject matter.

FIG. 21 is a block diagram for a system for assigning geographical coordinates including a determination of clustering of plural data vectors according to an embodiment of the present subject matter. The database 2101, the processor 2102, and block 2103 are similar to the database 2001, the processor 2002, and block 2003, as described above, respectfully. At block 2114, for each of select ones of the calibration points, the calibration data may include multiple data vectors and the evaluating of the calibration data may include a determination of clustering of the multiple data vectors.

Figure 22:
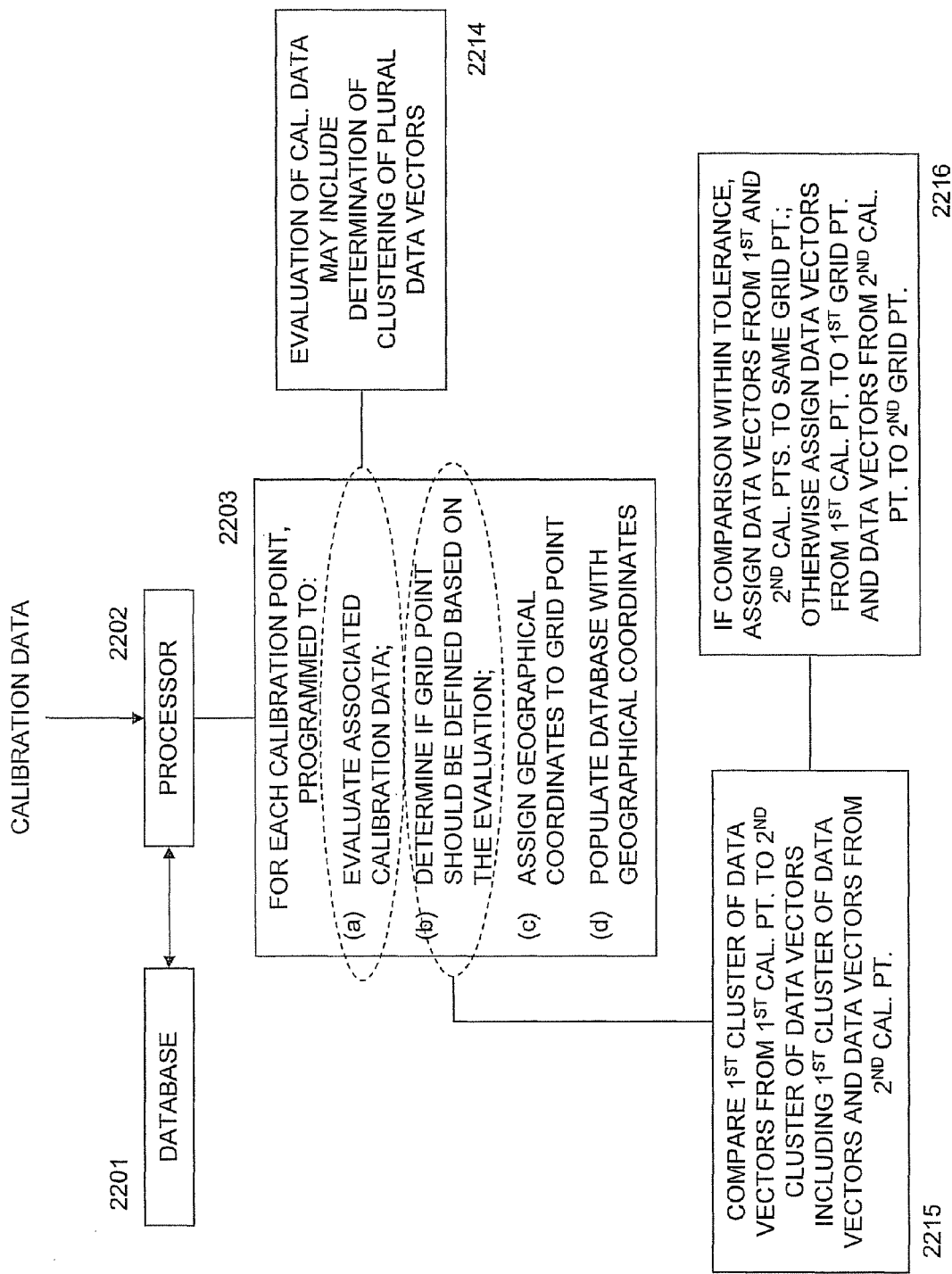
FIG. 22 is a block diagram for a system for assigning geographical coordinates including comparing clusters of data vectors from different calibration points according to an embodiment of the present subject matter.

FIG. 22 is a block diagram for a system for assigning geographical coordinates including comparing clusters of data vectors from different calibration points according to an embodiment of the present subject matter. The database 2201, the processor 2202, block 2203, and block 2214 are similar to the database 2101, the processor 2102, block 2103, and block 2114, as described above, respectfully. At block 2215, the determination if at least one grid point should be defined based on the evaluation may include comparing a first cluster of data vectors from a first one of the select calibration points to a second cluster of data vectors, where the second cluster of data vectors may include the first cluster of data vectors and data vectors from a second one of the select calibration points. At block 2216, if the result of the comparison is within a predetermined tolerance, then the data vectors from the first and second calibration points may be assigned to the same grid point; otherwise, the data vectors from the first calibration point may be assigned to a first grid point and the data vectors from the second calibration point may be assigned to a second grid point.

Figure 23:
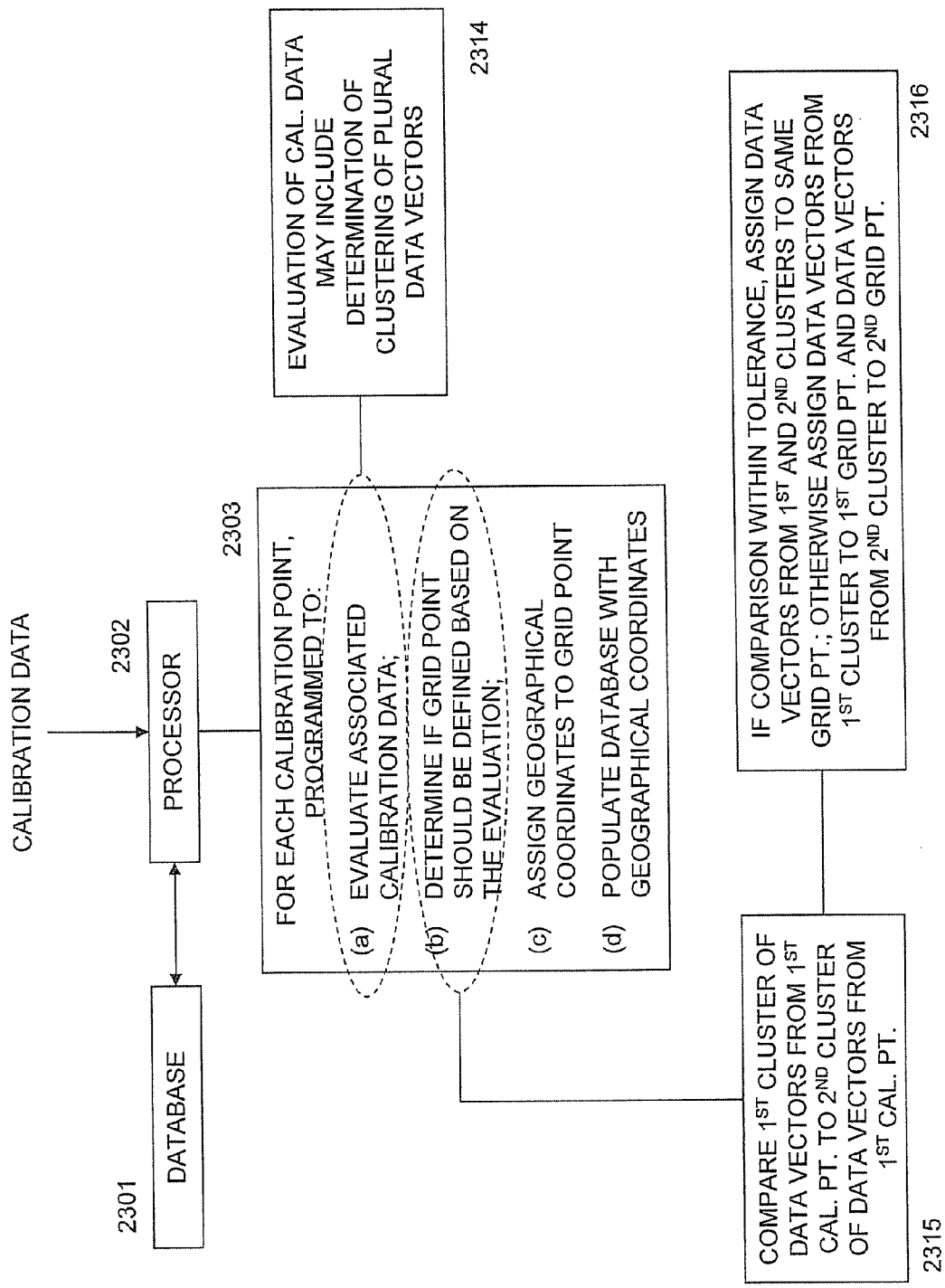
FIG. 23 is a block diagram for a system for assigning geographical coordinates including comparing clusters of data vectors from the same calibration point according to an embodiment of the present subject matter.

FIG. 23 is a block diagram for a system for assigning geographical coordinates including comparing clusters of data vectors from the same calibration point according to an embodiment of the present subject matter. The database 2301, the processor 2302, block 2303, and block 2314 are similar to the database 2101, the processor 2102, block 2103, and block 2114, as described above, respectfully. At block 2315, the determination if at least one grid point should be defined based on the evaluation may include comparing a first cluster of data vectors from a first one of the select calibration points to a second cluster of data vectors from the first one of the select calibration points. At block 2316, if the result of the comparison is within a predetermined tolerance, then the data vectors from the first and second calibration points may be assigned to the same grid point; otherwise, the data vectors from the first cluster may be assigned to a first grid point and the data vectors from the second cluster may be assigned to a second grid point.

Figure 24:
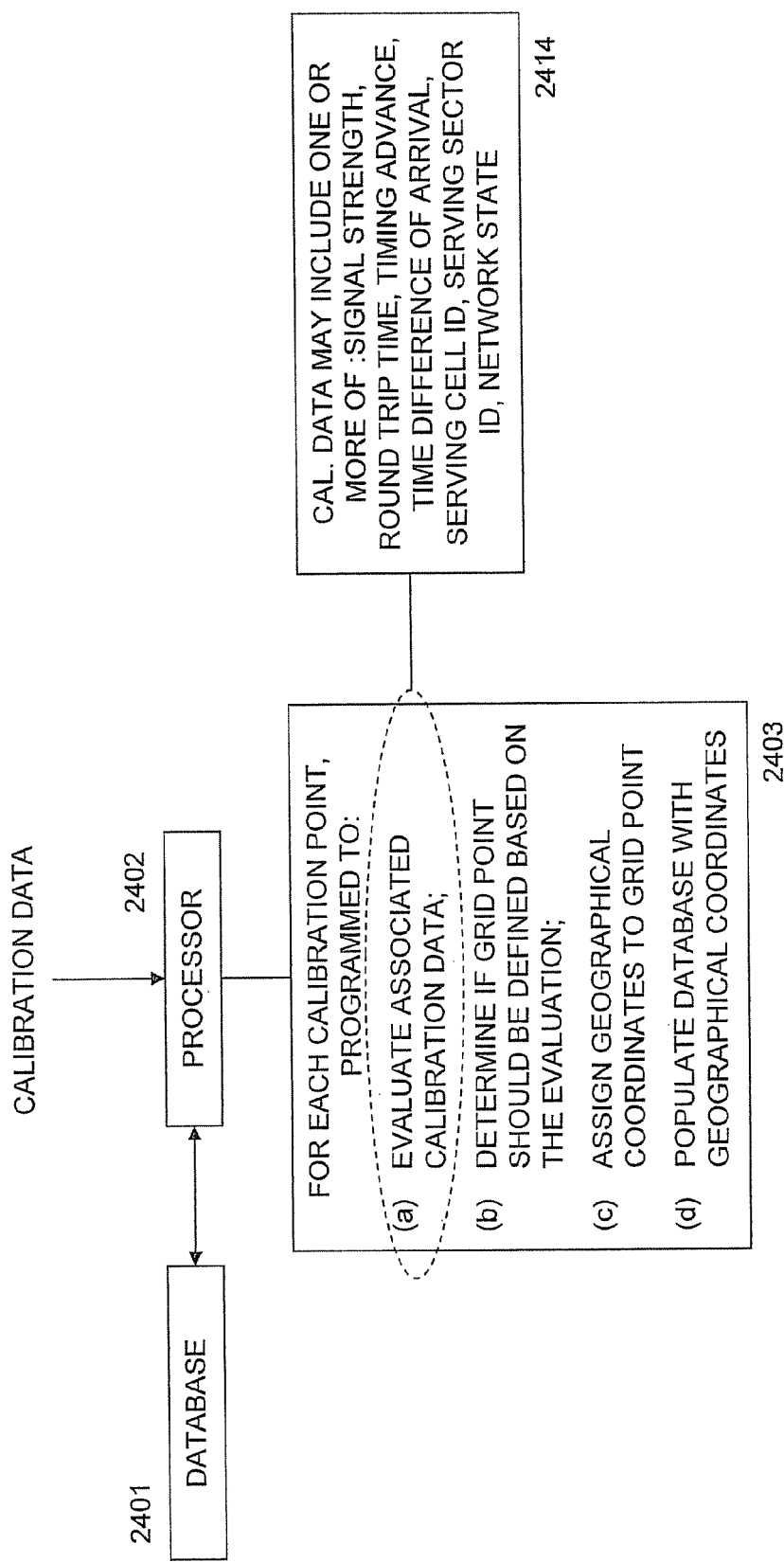
FIG. 24 is a block diagram for a system for assigning geographical coordinates including calibration data according to an embodiment of the present subject matter.

Looking now at FIG. 24, a block diagram is presented representing a system for assigning geographical coordinates including calibration data according to an embodiment of the present subject matter. The database 2401, the processor 2402, and block 2403 are similar to the database 2001, the processor 2002, and block 2003, as described above, respectfully. At block 2414, the calibration data may include: signal strength for a signal transmitted by a transmitter having a known location as received by a receiver at a calibration point; signal strength of a signal transmitted by a transmitter located at a calibration point as received by a receiver at a known location; round trip time for a signal traveling between a calibration point and a known location; timing advance of a signal received by a mobile device at a calibration point; time difference of arrival of multiple signals at a calibration point with respect to a pair of known locations as measured by a receiver at a calibration point or at the known locations; the identification of a serving cell or serving sector of a mobile device located at a calibration point; a state of a wireless network serving a mobile device, and combinations thereof.

Figure 25:
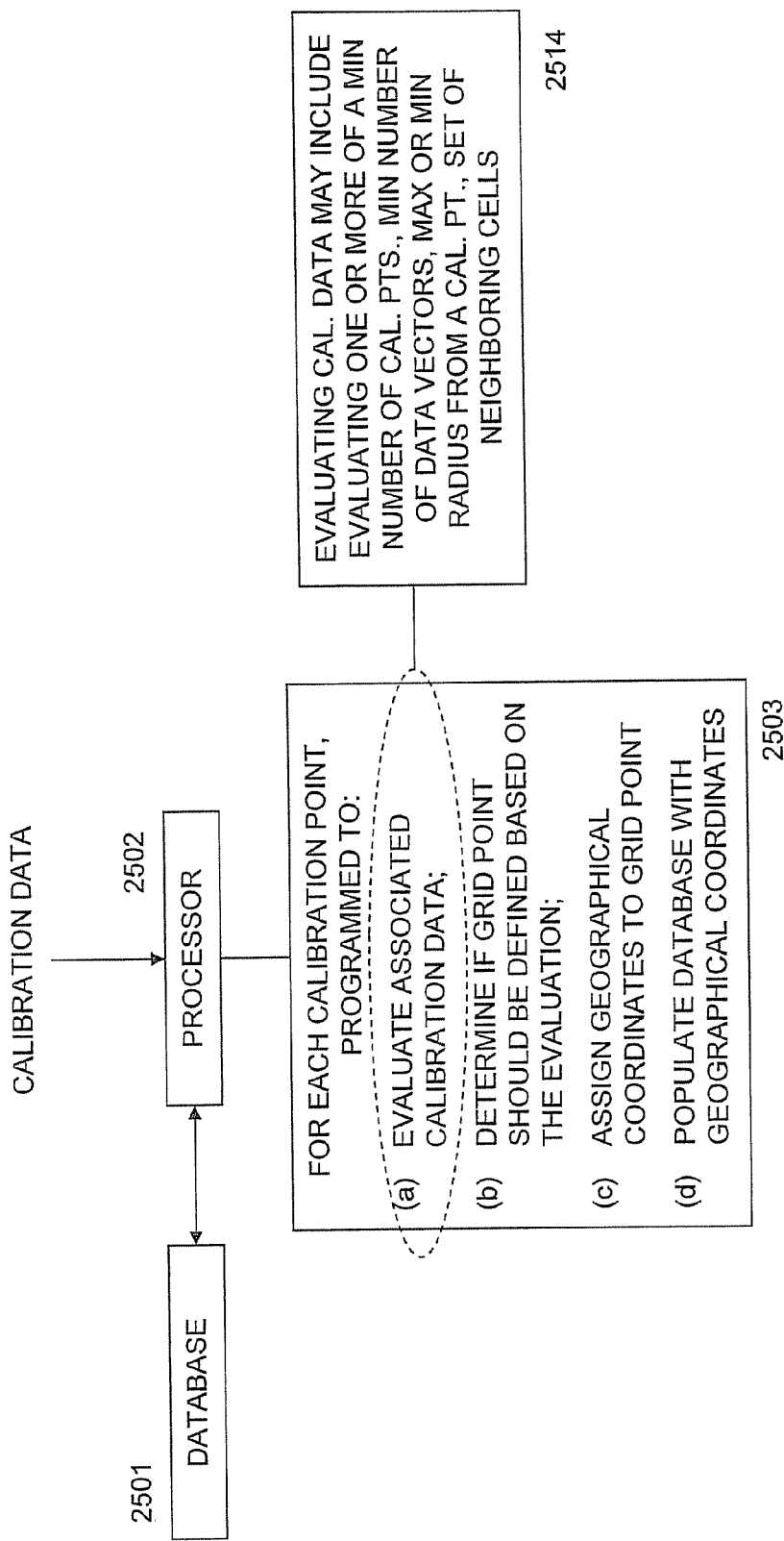
FIG. 25 is a block diagram for a system for assigning geographical coordinates including evaluating calibration data according to an embodiment of the present subject matter.

FIG. 25 is a block diagram for a system for assigning geographical coordinates including evaluating calibration data according to an embodiment of the present subject matter. The database 2501, the processor 2502, and block 2503 are similar to the database 2001, the processor 2002, and block 2003, as described above, respectfully. At block 2514, the evaluation of the associated calibration data may include an evaluation such as: a minimum number of unique neighboring calibration points as determined by calibration data of the neighboring calibration points; a minimum number of data vectors or network measurement reports; a predetermined maximum or minimum radius from a calibration point; a predetermined set of cells neighboring a cell serving a mobile device; and combinations thereof.

Figure 26:
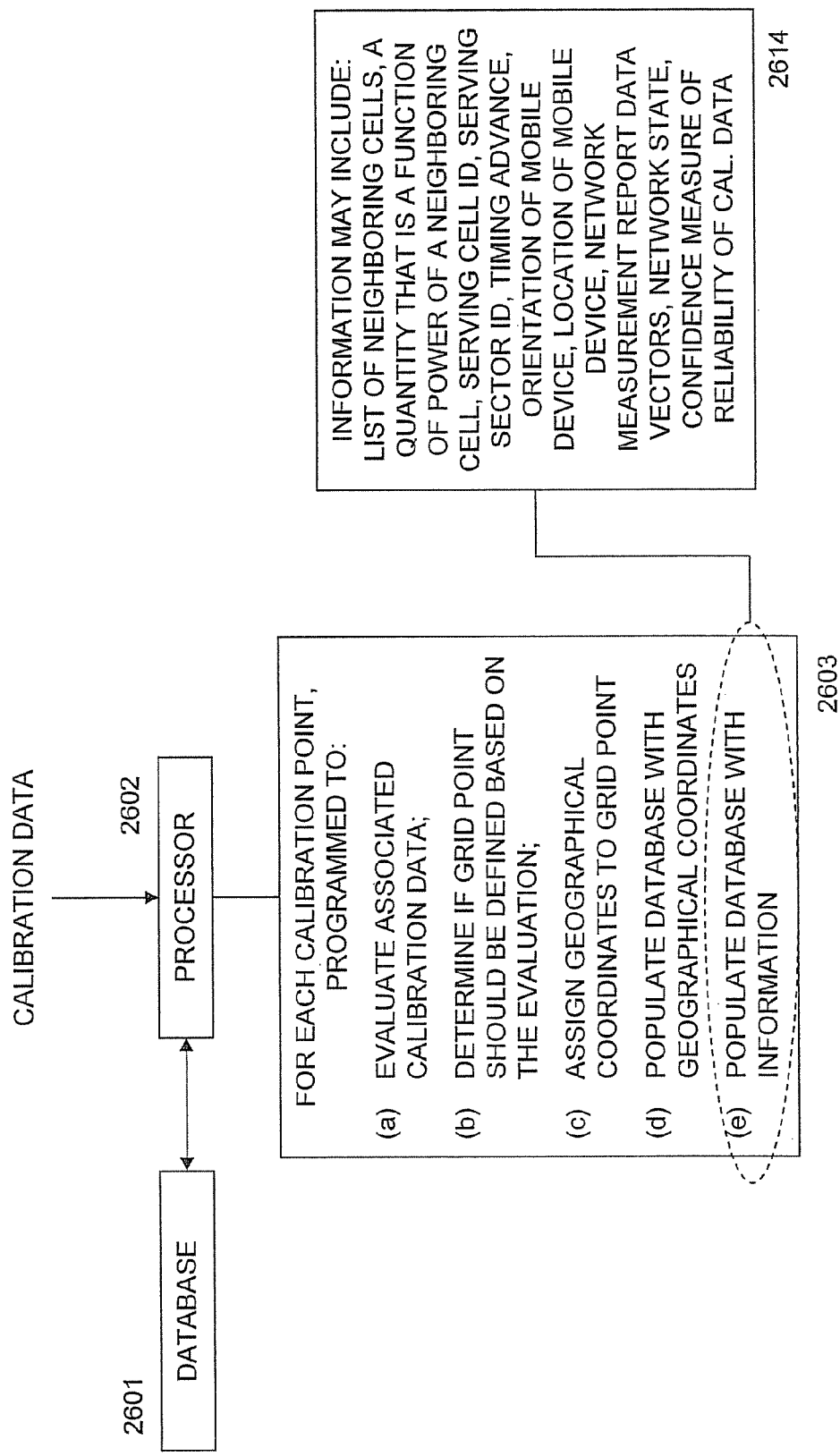
FIG. 26 is a block diagram for a system for assigning geographical coordinates including information for populating a database according to an embodiment of the present subject matter.

FIG. 26 is a block diagram for a system for assigning geographical coordinates including information for populating a database according to an embodiment of the present subject matter. The database 2601 and the processor 2602 are similar to the database 2001 and the processor 2002, as described above, respectfully. At block 2603, the processor 2602 may be programmed to evaluate the calibration data associated with the calibration points, determine if at least one grid point should be defined based on the evaluation, assign geographical coordinates to the one or more grid points, populate the database 2601 with the geographical coordinates, and populate the database 2601 with information which may include: a list of cells neighboring a cell serving a mobile device; a quantity that is a function of a power level of one or more cells neighboring a cell serving a mobile device; an identity of a cell or a sector serving a mobile device; a timing advance parameter; a geographical orientation of a mobile device; a location of a mobile device; network measurement report data vectors; a state of a network serving a mobile device; a confidence measure indicative of a reliability of the calibration data; and combinations thereof.

Figure 27:
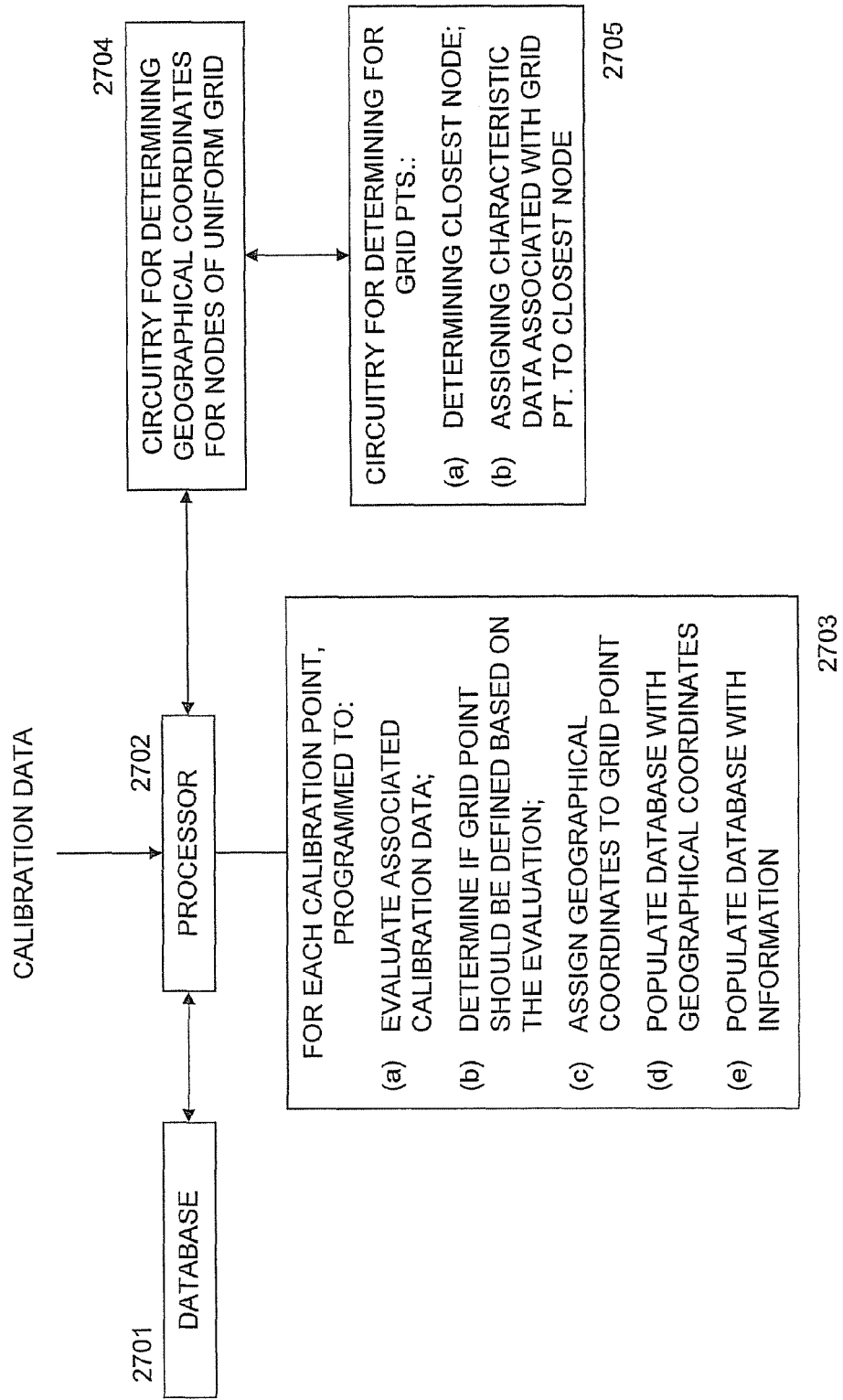
FIG. 27 is a block diagram for a system for assigning geographical coordinates including circuitry for determining geographical coordinates for nodes of a uniform grid according to an embodiment of the present subject matter.

FIG. 27 is a block diagram for a system for assigning geographical coordinates including circuitry for determining geographical coordinates for nodes of a uniform grid according to an embodiment of the present subject matter. The database 2701, the processor 2702, and block 2703 are similar to the database 2601, the processor 2602, and block 2603, as described above, respectfully. The system may further comprise circuitry 2704 for determining geographical coordinates for each of a plurality of nodes of a uniform grid spanning the geographic region, and circuitry 2705 for determining, for each of the one or more grid points, a closest node from the plurality of nodes of the uniform grid and assigning characteristic data associated with each of the grid point to its closest node.

Figure 28:
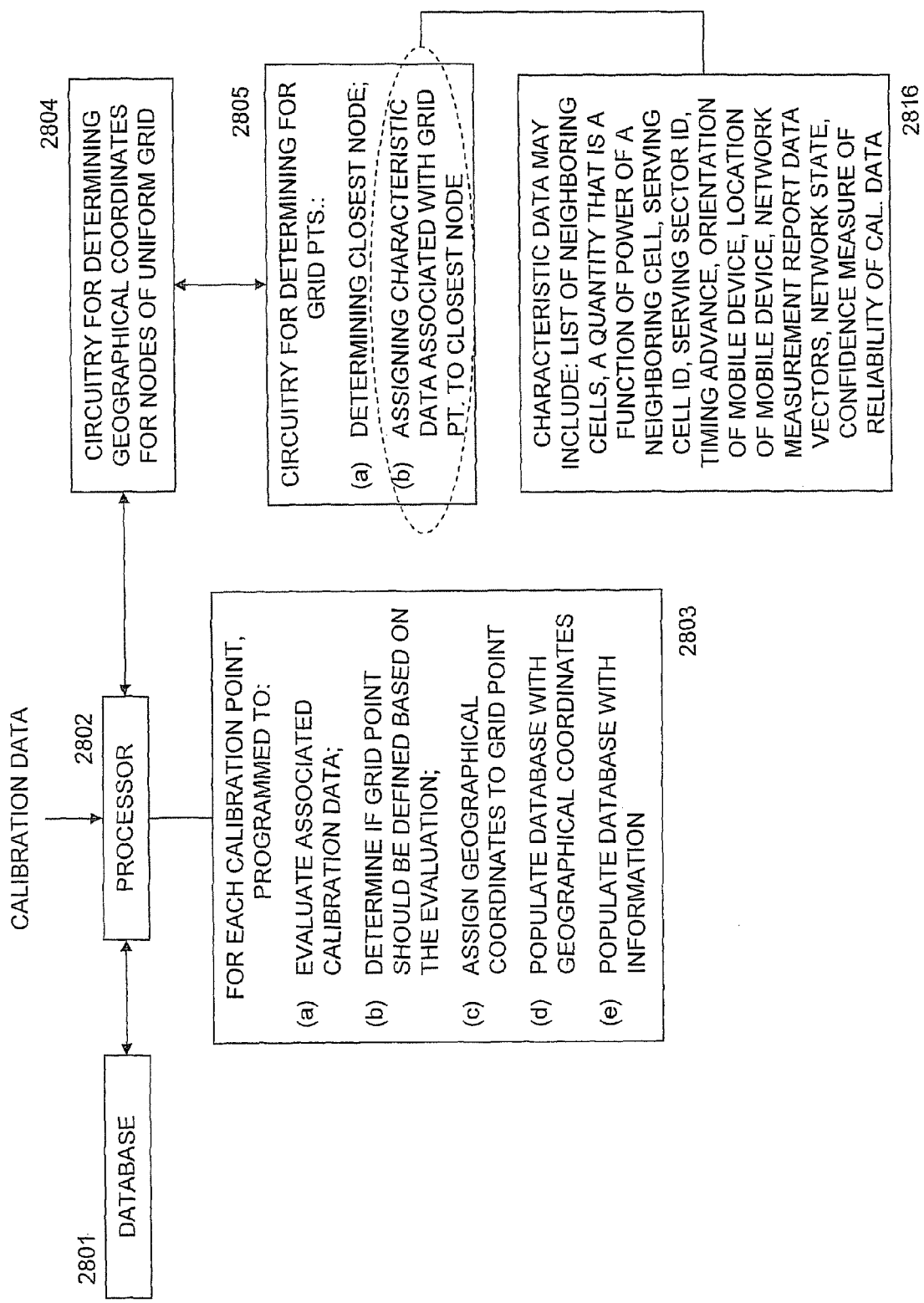
FIG. 28 is a block diagram for a system for assigning geographical coordinates including characteristic data according to an embodiment of the present subject matter.

FIG. 28 is a block diagram for a system for assigning geographical coordinates including characteristic data according to an embodiment of the present subject matter. The database 2801, the processor 2802, block 2803, circuitry 2804, and circuitry 2805 are similar to the database 2701, the processor 2702, block 2703, circuitry 2704, and circuitry 2705, as described above, respectfully. At block 2816, the characteristic data may include: a list of cells neighboring a cell serving a mobile device; a quantity that is a function of a power level of one or more cells neighboring a cell serving a mobile device; an identity of a cell or a sector serving a mobile device; a timing advance parameter; a geographical orientation of a mobile device; a location of a mobile device; network measurement report data vectors; a state of a network serving a mobile device; a confidence measure indicative of a reliability of the calibration data; and combinations thereof.

In a typical signal strength pattern matching mobile location system the time allowed to produce a location may be such that multiple NMRs and sets and subsets thereof may be available. By way of a non-limiting example, in the GSM air standard, mobile measurements are reported at an approximate rate of approximately two per second. Generally, the time allowed to produce a location may be on the order of thirty seconds. It is therefore an aspect of embodiments of the present subject matter to improve location accuracy by combining individual locations from calibration data, e.g., multiple NMRs, to produce a final location estimate.

Grid-based signal strength pattern matching location systems typically determine a quantitative measure of how close each candidate grid point matches with mobile-reported measurement parameters. An estimate of a mobile device's location may then be given by a grid point having the closest match thereto or a location interpolated between several grid point locations. As multiple NMRs are generally available during the time allotted to report the estimated location of a mobile device, embodiments of the present subject matter may utilize each NMR to generate an independent location estimate. These independent or individual location estimates may then be averaged or another mathematical function employed thereon to produce a final estimated mobile location that may be statistically more accurate.

Many location systems may also "fall back" to a default location as a function of the serving cell when the system is unable to determine a grid point match location. In such an instance, a location status variable may be utilized to identify the default location as a fall back location. Such a fall back location is generally less accurate than a location estimate determined by a pattern matching location system; however, an exemplary location combiner may omit any fall back locations and average or combine location estimates determined by an exemplary pattern matching algorithm.

A correlation may exist between location accuracy and mismatch distance metrics, e.g., "cost" values. The correlation may be exploited by flagging individual location estimates as having a high cost or metric (e.g., using a location status variable), and the corresponding location estimates are likely to possess a large location error. Embodiments of the present subject matter may present a refinement to the location combiner by skipping or omitting individual locations exceeding a predetermined "cost" threshold. Thus, the resulting location accuracy may be significantly improved. In further embodiments, the correlation between mismatch distance metrics and location accuracy may be exploited by employing weighted averaging of the individual estimated locations, weighting by an inverse of the metrics, normalizing by a sum of the inverses, or any combination thereof. A further metric that may be utilized for weighting the contribution of individual location estimates to a final location estimate may be the number of reporting neighboring cells. By way of a non-limiting example, assuming five individual location estimates are combined and four of the five individual location estimates possessed six reporting neighboring cells and the fifth location estimate possessed four reporting neighboring cells, the fifth location estimate may then be de-weighted in the final location estimation.

Another embodiment of the present subject matter may identify and omit outlier individual location estimates to improve the final location estimation. For example, a Mahalanobis distance from each individual location estimate to the final location estimate may be determined. A dynamic distance threshold may be determined from the median of these distances multiplied by a configurable factor. An individual location estimate having a distance to the final location estimate exceeding the threshold may be identified as an outlier. The final location estimate may then be re-determined with the outlier locations omitted. In the event that weighted averaging is utilized in such a determination, the weights may be re-determined prior to the final location estimation.

It may also be noted that estimated locations derived utilizing subsets of available NMRs may often differ. For example, considering an NMR including a set of ordered (e.g., in descending magnitude) reporting neighboring cell (NC) power levels, with the NC having an order ABCDE. If the lowest power NC (NC=E) is omitted from the NMR, the locations determined using ABCD NCs may be different from ABCDE. Similarly, the location determined for ABCE NCs may differ from that for ABDE NCs.

An examination or evaluation of the location estimates derived from subsets of the NMRs may provide an indication regarding the quality of the final location estimate. By way of a non-limiting example, if the location estimates derived utilizing any possible method of mapping the NMR or sets thereof to a specific geographic location or grid point, whether using NUGs or uniform grid points, agree under combinations of subsets, the confidence in the location estimate may be high and thus represent a confidence measure on the location estimate. Further, the fraction of total location estimates within a predetermined distance of the final location estimate may also qualify as a confidence measure.

In one embodiment of the present subject matter, for each NMR, one may form a set of all subsets of a selected NMR. Therefore, in a non-limiting example of an ordered set of NCs given by ABC, a full set of subsets is {ABC, AB, AC, BC, A, B, C}. In each case, an estimated location may be derived utilizing any method of location. Each of the locations in this set of locations, L, may possess an associated probability or other measure derived from the particular location method, thus defining a set M. A variety of schemes may be defined and implemented upon the set L and the set of associated measures on L, given by M, such as, but not limited to: (a) computing the final estimated location by clustering the set L without any reference to the measures in M; (b) computing the final estimated location as the centroid of a region containing the tightest cluster in L having an aggregate measure higher than some pre-set value; (c) computing the final estimated location as the location of the NUG (e.g., centroid of the NUG) which occurs most often in L; (d) computing the final estimated location by clustering the subset of L obtained by dropping the least power member in the NMR successively (e.g., the subset {ABC, AB, A}); (e) computing the final estimated location as the subset of L obtained by successively dropping the least power member in the NMR and with weighting by the corresponding measure in M.

Considering that the individual marginal probabilities for each NMR component, characteristic or parameter over a set of candidate NUGs or uniform grid points (UG) have been determined, it may be assumed that for every subset in L, the measure set M provides the joint probability for the subsets of the NMR. Using the subset AB in the previous example, the marginal probability for A, B and C over all NUGs has been determined. To determine the joint probability of A and B, for example, the marginal probabilities for A and B may be multiplied over the NUGs (or other locations). This generates the measure set M, and having the set L and set M defined, any one or combination of the methods in (a)-(e) described in the previous paragraph may be applied thereto for an estimation of an exemplary confidence measure.

The same principles may be applied to multiple NMRs and each of their respective subsets where each subset of each NMR may be assigned its respective measure in a now larger set M. It follows that the methods in (a)-(e) described above are equally applicable. In the case of multiple NMRs, a representative NMR may be determined through a clustering algorithm applied to each parameter of the NMR viewed over the set of NMRs. The methods in (a)-(e) described above may then be applied to this representative NMR for an estimation of an exemplary confidence measure.

It is also an aspect of embodiments of the present subject matter to provide an estimate of the location error in a signal strength pattern matching location system. As discussed above, a confidence measure may be determined that provides an indication of the quality of the location estimate.

In one embodiment of the present subject matter, if the final estimated location is an average of the individual locations, the degree to which the individual locations are clustered around the final estimation may provide an indication of the location error. The error estimate may be determined as the average of the distances from each individual location to the final estimated location as a function of the following relationship:

$$\hat{e} \equiv \frac{\sum_{i=1}^{N} d_i}{N} \qquad (1)$$

where N is the number of estimated locations and $d_i$ is the Euclidean distance from the $i^{th}$ estimated location to the final estimated location.

The error estimate may also be determined as a function of the following relationship:

$$\hat{e} \equiv \frac{\sum_{i=1}^{N} w_i d_i}{\sum_{i=1}^{N} w_i} \qquad (2)$$

where N is the number of estimated locations, $d_i$ is the Euclidean distance from the $i^{th}$ estimated location to the final estimated location, and $w_i$ is a series of weighting factors.

As discussed above, when subsets of available NMRs are considered, however, the estimated locations may also differ. Therefore, an exemplary confidence measure may also be defined upon an estimated location given by any function that increases as the number of subset locations agree with the final estimated location. A non-limiting example of such a function may be the fraction of total locations that agree with the final estimated location or the fraction of total locations that lie within a certain distance of the final estimated location. In a further embodiment, weights may be assigned to the location estimates by utilizing the parameters or functions employed in determining the estimated location to thereby weight the determination of the associated confidence measure. Further exemplary confidence measures may be a function of pdfs, distortion measures, Mahalanobis distances, etc. with respect to any one or sets of NUGs.

Exemplary weighting quantities, e.g., distortion measures, pdfs, etc., may also be derived while estimating any location from single and multiple NMRs or their subsets, and may also be utilized to estimate location error. Empirically, the magnitudes of these weighting quantities may be correlated with the expected error. This relationship may be established graphically or in tabular format as a function of environmental characteristics (e.g., urban, suburban, seasonal, etc.). As a result, given a set of weighting quantities, an associated error may be predicted for a specific location estimate.

In one embodiment of the present subject matter, if the set of derived locations utilizing a set and/or subset of NMRs exhibit clusters, cluster separation may be employed between the highest aggregate weighted clusters to define an expected error. Such a distance may be termed as an inverse confidence measure as the larger the distance becomes, the greater the chance of error in the final location estimate if the corresponding cluster were selected. It follows that if the aggregate weight for a distant cluster is small, this distance should be modified to de-weight the associated distance by the weight of the cluster. An exemplary determination may multiply the cluster distance by a ratio of the weight of a selected cluster to the weight of a distant cluster; however, many such variations of this fundamental idea are clearly conceivable and such an example should not limit the scope of the claims appended herewith.

In another embodiment of the present subject matter, when each of the individual location estimates are generally at the same location (e.g., each located at the same calibration or grid point) the resulting error estimate would be zero or near zero. In such a scenario, the error estimate may be bounded by a minimum error value such as, but not limited to, a configurable constant based upon the overall expected system accuracy (e.g., the 25th percentile of overall system error, etc.).

It should be noted that the statistical averaged or weighted averaged location accuracy improves as the number of individual location estimates averaged or determined increases. For example, a final location estimate that comprises the average of two individual locations may generally be less accurate than a final location estimate comprising an average of twenty individual location estimates. Further, the optimal number of location estimates to combine or consider is dependent upon several factors including, but not limited to, the speed of the mobile device, the rate of acquiring NMRs, etc. This relationship may also be utilized to improve the error estimate as the number of individual location estimates increases.

In embodiments of the present subject matter wherein any one or multiple individual location estimates are "fall back" locations (e.g., default locations that may be based upon serving cell identification location), a default error estimate may be determined based upon an expected statistical accuracy of cell identification location. This determination may be a function of cell site geometry in an associated or corresponding operating market and may also be determined empirically through accuracy testing. Exemplary scenarios in which default locations may be encountered include, but are not limited to, when the NMR does not contain any NC measurements, when the available set of NMRs for the mobile device location generates a set of candidate locations that does not cluster (e.g., when the individual location estimates appear to be randomly distributed over a geographic region), when an NMR has very few reporting NCs and the confidence measure is poor, and combinations thereof.

In embodiments of the present subject matter where NMR data may be missing or invalid, the coordinates of the cell serving a mobile device may be retrieved from a respective site database from the serving cell identifier. In this instance, an exemplary default location may be a location that is a configurable distance away from the serving site. The configurable distance may or may not be positioned at a heading along the serving sector azimuth. For air standards in which certain parameters (e.g., timing advance, round trip timing, etc.) are available, this data may also be converted to an approximate range estimate from the serving site and utilized with other applicable parameters. For example, when such parameters are available, the default location may be enhanced by selecting a location on the serving cell azimuth at a distance from the site given by a TA range estimate.

In embodiments of the present subject matter where an NMR may include Time Difference of Arrival ("TDOA") data, this parameter may be utilized to derive a region within the cell to constrain the default location. For example, the TDOA, assuming the base station time offsets are known, defines a hyperbola in the region of interest. An intersection of this hyperbola with the applicable TA region to this cell may be utilized as a default location estimate. Alternatively, a default location estimate may be employed that does not rely on a serving sector heading if there exists a priori knowledge of sector coverage density. For example, if a sector coverage region can be determined (e.g., through drive testing, etc.), then the centroid of the sector coverage region may be stored in the respective site database by sector for each site and retrieved as a default location.

A further aspect of embodiments of the present subject matter may also improve location accuracy by interpolating between grid point locations when more than one grid point matches the calibration or reported data within a predetermined value. Generally, grid-based signal strength pattern matching location systems determine a quantitative measure of how close each candidate grid point (e.g., NUG or UG) matches mobile device reported measurement parameters. The location estimate of the mobile device may be given by the grid point having a match within a predetermined range. Further, as the actual location of the mobile device is generally not constrained to lie at a grid point location, interpolation between grid points may result in a more accurate location estimate.

During an exemplary interpolation according to one embodiment of the present subject matter, an analysis of whether interpolation should be performed may be determined as well as a selection of the appropriate grid or calibration points for the interpolation. Distance metrics may also be determined on any number of grid points. Exemplary metrics are discussed above and may include, but are not limited to, pdfs, Mahalanobis distance between parameter vectors, ordering number between ordered NCs in the NMR, NUG, UG, and combinations thereof. By way of a non-limiting example, it may be assumed that the distance metric for each of N candidate grid points (N>1) is $i^{th}$ determined and sorted. Representing the distance metric as C, then for each $i^{th}$ candidate, i=1 . . . N, an appropriate metric may be determined by the following relationship:

$$C\_Ratio_i = [C_i - C_{min}]/[C_N - C_{min}] \quad (3)$$

where $C_i$ is a metric associated with an $i^{th}$ candidate grid point, $C_N$ is a metric associated with the worst corresponding candidate grid point, and $C_{min}$ is a metric associated with the best corresponding candidate grid point. It follows that grid points having a $C_{ratio}$ less than a predetermined and configurable threshold value may be a candidate for interpolation.

Generally, interpolation occurs between adjacent or nearby grid points. To minimize or prevent interpolation across widely spaced grid points, the distance from each interpolation candidate grid point to the minimum cost grid point may be less than a configurable distance threshold.

In embodiments when there are few grid point candidates or when there are fewer than a configurable number of candidate grid points, an appropriate metric may be determined by the following relationship:

$$C\_Ratio_i = [C_i - C_{min}]/[C_{min}] \quad (4)$$

where $C_i$ is a metric associated with an $i^{th}$ grid point and $C_{min}$ is a metric associated with the best corresponding grid point. Equation (4) may thus enable an identification of appropriate grid points for interpolation when N is small. Equation (4) may also be performed to prevent interpolation between widely separated grid points.

Once the grid points for interpolation have been identified, one embodiment of the present subject matter may employ weighted averaging to determine a final interpolated location. An exemplary weight assigned to the $i^{th}$ grid point in computing the final interpolated location may be determined by the following relationship:

$$Wi = \frac{\frac{1}{Ci}}{\sum_{i=1}^{N}\left(\frac{1}{Ci}\right)} \quad (5)$$

where $C_i$ is a metric associated with an $i^{th}$ grid point. Weighted averaging may also be utilized rather than uniform weighting to ensure that the best matching grid point (i.e., minimum cost grid point) exerts a larger influence on the final location estimate.

As discussed above, each grid point (NUG or UG) may provide one or a plurality of parameters and/or functions characterizing the grid point. Given a received set of one or more NMRs obtained at an unknown location, an accurate estimation of the unknown location may be determined using a characterization of the grid points over a geographic region. In one embodiment of the present subject matter, a distortion measure may be determined between available NMRs and grid point characteristics to assist in the estimation.

Generally, embodiments of the present subject matter may utilize any number of methods to determine a distortion measure, e.g., a mismatch distance between mobile reported measurements and a candidate grid point's stored measurement data. The associated "cost" value may also be inversely proportional to an increasing function of the probability that the mobile device is located at or in the vicinity of a grid point.

In one embodiment of the present subject matter, a distortion measure may comprise a combination of the values of each parameter in an NMR and each corresponding parameter in the grid point (NUG or UG) characteristics. The distortion measure may generally increase as the mismatch between any of the parameters increases and vice versa. For example, an exemplary cost value may be determined utilizing a Mahalanobis distance provided by the following relationship:

$$\text{COST} = \alpha(TA_{rpt} - TA_{cand})^2 + \sum_i \left[\left(\frac{RxLevDiff(i)^2}{MAXDIFF^2}\right)NCCU\right] \quad (6)$$

where $\alpha$ is 0 or 1 which controls whether TA differences are included in the determination (e.g., 1 for GSM and 0 for iDEN), $TA_{rpt}$ is the TA for the NMR, $TA_{cand}$ is the TA for the candidate grid point in the calibration database and/or a representative value, RxLevDiff(i) represents the difference in RxLev (received signal strength) for the $i^{th}$ neighbor cell or serving cell, I is an index to neighbor or serving cells (e.g., if only NC received signal strengths are used and there are six reporting NCs, then i=1 to 6; if in addition, a serving cell signal strength is included then i=1 to 7), NCCU represents an NC cost unit where an increasing NCCU increases the cost penalty for RxLev difference relative to the cost penalty for TA difference, and MAXDIFF is a configurable parameter that limits the cost incurred for differences in signal strengths. MAXDIFF may be set to 20 dB or another configurable value. RxLev differences exceeding MAXDIFF would not incur an additional cost penalty.

Embodiments of the present subject matter may determine RxLevDiff(i) through any number of methods including, but not limited to, the following relationships:

$$RxLevDiff(i) = (RxLevServ - RxLevNeigh(i))_{NMR} - (RxLevServ - RxLevNeigh(i))_{CND} \quad (7)$$

for i=1:6;

$$RxLevDiff(i) = (RxLevNeigh(i))_{NMR} - (RxLevNeigh(i))_{CND} \quad (8)$$

for i=1:6;

$$RxLevDiff(i) = (RxLevNeigh(1) - RxLevNeigh(i))_{NMR} - (RxLevNeigh(1) - RxLevNeigh(i))_{CND} \quad (9)$$

for i=2:6;

$$RxLevDiff(i) = (AvgRxLevNeigh - RxLevNeigh(i))_{NMR} - (AvgRxLevNeigh - RxLevNeigh(i))_{CND} \quad (10)$$

for i=1:6;

$$RxLevDiff(i) = (AvgRxLev - RxLev(i))_{NMR} - (AvgRxLev - RxLev(i))_{CND} \quad (11)$$

for i=1:7.

With reference to the above relationships, Equation (7) provides a comparison between the signal strengths of the serving cell and the $i^{th}$ NC between NMR and candidate points, Equation (8) provides a comparison between the signal strengths of the $i^{th}$ NC between NMR and candidate points, Equation (9) provides a comparison between the signal strengths of a first common NC and the $i^{th}$ NC between NMR and candidate points, Equation (10) provides a comparison between the average signal strengths of the NCs and the signal strengths of the $i^{th}$ NC between NMR and candidate points, and Equation (11) provides a comparison of the average signal strengths of the serving cells and NCs and the signal strengths of the $i^{th}$ serving cell and NC between NMR and candidate points.

In a further aspect of embodiments of the present subject matter, an estimated location may be generated for a mobile device given a received NMR and a region "R" over which a set "S" of grid points (NUGs or UGs) have been established. As described above, each grid point may include a series of parameters, components and/or functions characterizing the respective grid point. Provided a received set of one or more NMRs obtained at some unknown location, an estimation of that unknown location may be determined as a function of a characterization of the grid points over this region R.

In one embodiment of the present subject matter, an estimated location of a mobile device may be determined using any single NMR (drawn from a set or subset of NMRs) by any number of the following methods or combinations thereof. For example, one embodiment may match an ordered list of NCs, where the ordering may be in terms of any one of a number of parameters characterizing the NMR, such as, for example, NC power level, in a respective NMR to a similarly ordered list of NCs in the grid point(s) (NUG or UG) and (a) generate the estimated location as the centroid of the best cluster of matching grid points, (b) generate the estimated location as the location of the highest joint probability matching grid point, (c) generate the estimated location as the (joint probability) weighted sum of the locations of a set of matching grid points, (d) generate the estimated location as the (joint probability) weighted sum of the clustered locations of a set of matching grid points (i.e., cluster the locations of the matching grid points and then apply a cumulative probability for all contained grid points in a cluster as weight for the respective cluster), (e) generate the estimated location by combining locations derived from NMR subsets, or any combination thereof.

In an additional embodiment, if the ordered list of NCs in the NMR (ordered with respect to the magnitude of any particular parameter characterizing the NMR) does not provide an exact match to the ordered list of NCs that may be available as a characteristic of a grid point, the method may evaluate those grid points (NUGs or UGs) including an ordered list thereof that may contain an ordered list in the NMR. Thus, the ordered list in the NMR may form a subset of the ordered list in the grid point, and the method may (a) generate an estimated location as the centroid of the best cluster of matching grid points, (b) generate the estimated location as the location of the highest joint probability matching grid point, (c) generate the estimated location as the (joint probability) weighted sum of the locations of a set of matching grid points, (d) generate the estimated location as the (joint probability) weighted sum of the clustered locations of a set of matching grid points, (e) generate the estimated location by combining locations derived from NMR subsets, or any combination thereof.

In embodiments of the present subject matter where the ordered list of NCs in the NMR is not contained in the ordered list of NCs for any grid point, then the method may utilize the highest power subset of NCs in the NMR (e.g., ordered from highest to lowest power) that provides either an exact match or is contained in the ordered list of NCs in the grid point. The method may then (a) generate an estimated location as the centroid of the best cluster of matching grid points, (b) generate the estimated location as the location of the highest joint probability matching grid point, (c) generate the estimated location as the (joint probability) weighted sum of the locations of a set of matching grid points, (d) generate the estimated location as the (joint probability) weighted sum of the clustered locations of a set of matching grid points, (e) generate the estimated location by combining locations derived from NMR subsets, or any combination thereof.

In a further embodiment of the present subject matter, the individual pdf of each NC power level or other parameter in the NMR over the set of available grid points (NUGs or UGs) may be evaluated. A joint probability may then be determined as the product of such marginal probabilities and an estimated location generated as (a) the location of the highest joint probability matching grid point, (b) the (joint probability) weighted sum of the locations of a set of matching grid points, (c) the (joint probability) weighted sum of the clustered locations of a set of matching grid points, (d) a combination of locations derived from NMR subsets, or any combination thereof.

In one embodiment, the joint probability of the NMR NC power levels or other parameters may be evaluated over the set of available grid points. The method may then generate an estimated location as (a) the location of the highest joint probability matching grid point, (b) the (joint probability) weighted sum of the locations of a set of matching grid points, (c) the (joint probability) weighted sum of the clustered locations of a set of matching grid points, (d) a combination of locations derived from NMR subsets, or any combination thereof.

In another embodiment, a distortion measure may be determined between the grid point measured parameters (e.g., mean NC power level, TA value, RTT value, etc.) and corresponding parameters in the NMR. Exemplary distortion measures have been provided above and may be, but are not limited to, a Mahalanobis distance, etc. Any weighting in this distance over dissimilar parameters may also be optimized empirically or determined by calculation. Utilizing an exemplary distortion measure, the method may generate an estimated location as (a) the location of the grid point with a least distortion measure, (b) the weighted sum of the locations of the set of grid points (weights may also be applied as a function of the distortion measure), (c) the weighted sum of any one or multiple clustered locations of a set of grid points, (d) a combination of locations derived from NMR subsets (where the measure set M is the distortion measure).

In yet another embodiment, an estimated location may be selected by matching the NC power level or other parameter ordering in the NMR to the NC power or other parameter ordering in the grid points (NUG or UG) and utilize an ordering number evaluation. An exemplary ordering number may be an indicator regarding the number of relative shifts in position occurring between the NMR and the grid point(s) NC ordered power levels or other parameters. By way of a non-limiting example, in an NMR the NC power levels may be ordered as ABCDE whereas the selected grid point may provide an ordering of BACDE. This results in an ordering number of 1 (a single shift). Multiple variations of the ordering number may be considered and determined, however, these variations may be a measure of the distortion in ordering between the NC power levels evident in the grid point as compared to the NC parameters seen in the NMR. An aggregate ordering number for a set of NMRs may then be obtained by combining the ordering numbers for each individual NMR. A final estimated location may be a grid point cluster having the smallest ordering number. In a further embodiment, the ordering number or ordering of an exemplary characteristic may also be regarded as a distortion measure such that the method may generate an estimated location as (a) the location of the grid point with a least distortion measure, (b) the weighted sum of the locations of the set of grid points (weights may also be applied as a function of the distortion measure), (c) the weighted sum of any one or multiple clustered locations of a set of grid points, (d) a combination of locations derived from NMR subsets (where the measure set M is the distortion measure).

With respect to any of the various methods described above, embodiments of the present subject matter may also filter parameters prior to generating an estimated location. For example, an embodiment may match the serving cell/sector of candidate grid points to the serving cell/sector of the NMR and then proceed with any of the methods previously described. A further embodiment may also filter candidate grid points using other available parameters (e.g., TA, RTT, etc.) for the NMR and then proceed with any of the methods previously described. This exemplary filtering may also be set wider than the actual parameter (TA, RTT, etc.) determined value by a configurable threshold.

Candidate grid points may also be filtered by utilizing a mobile orientation parameter (e.g., indoors, outdoors, facing North or South, titled upwards, azimuth and elevation, etc.) applied during construction of the grid points, by utilizing those grid points where the serving cell identifier and serving control channel agrees with the NMR data, by utilizing the magnitude of the serving cell forward link control channel received signal level (and applying a configurable tolerance to this parameter), by eliminating those grid points not having at least N (configurable) NC received signal levels in common with the NMR, or any combination thereof and then proceeding with any of the methods previously described.

In embodiments of the present subject matter where a set of NMRs obtained at some unknown location (or locations in close proximity to each other) may be available, the aforementioned methods may be expanded to exploit the multiplicity of information. For example, an estimated location may be generated for each NMR in a set of NMRs by any or all of the methods applicable to a single NMR as indicated above and a tightest cluster of a single NMR location may be determined. Such a determination may also utilize a metric derived while locating that NMR (e.g., joint probability, Mahalanobis distance, etc.) to weight the clusters.

In another example, a representative NMR may be generated from a set of NMRs and any or all of the methods applicable to a single NMR as indicated above may be applied thereto. The representative NMR may be generated by obtaining a representative value for each of the NCs seen in the respective set of NMRs, and similarly obtaining a representative value for each of the other parameters seen in the NMRs. In another embodiment, these representative values may be obtained as a function of the available set of values, e.g., for NC power level mean or median power may be utilized.

In a further example, transitions in any of the parameters within the set of NMRs may be observed. Transitions may be utilized in reducing the applicable region for an estimated location. As many parameters represent a range of location possibilities, when a parameter changes, it may be inferred that the region of interest is at a boundary of the ranges represented by the parameter prior to and after the change. Therefore, any one of these boundaries determined for any parameter change within the applicable set may reduce the candidate region for the mobile device location. Exemplary parameter changes may be, but are not limited to, changes in signal power levels with respect to a particular NC, rate or pattern of dropping in and out of a particular NC signal, changes in serving cell or sector, changes in TA, RTT or equivalent parameter, and combinations thereof.

Additional embodiments may determine a distortion measure between the grid point characteristics or measured parameters and corresponding parameters of all NMRs taken collectively without reduction to representative values. Any weighting in this measure over dissimilar parameters may be optimized empirically. Utilizing a distortion measure, exemplary methods may generate an estimated location as (a) the location of the grid point having the least distortion measure, (b) the weighted sum of the locations of a set of grid points (any weights applied may also be a function of the distortion measure), (c) the weighted sum of clustered locations of a set of grid points, (d) as a combination of locations derived from NMR subsets (where the measure set M is now the distortion measure).

Further embodiments may match a variety of parameters and functions generated and stored describing a grid point (i.e., the grid point characteristics) with similar parameters and functions determined for the set of NMRs by utilizing a distortion measure to evaluate the similarity therebetween. Exemplary parameters and functions may be, but are not limited to, the following: (a) an ordered list of neighboring cells; (b) functions defined on the absolute neighboring cell power levels (e.g., mean, median, $k^{th}$ moment, cluster-mean, etc.); (c) functions defined on the relative neighboring cell power differences (e.g., mean, median, $k^{th}$ moment, cluster-mean, etc.); (d) serving cell/sector; (e) timing advance parameter (or equivalent); (f) individual pdf (probability density function or probability distribution function) of each neighboring cell power level; (g) joint pdf of neighboring cell power levels; (h) mean and variance of neighboring cell power levels; (i) mobile device orientation (e.g., indoors, outdoors, direction mobile device is facing (e.g., North, South, etc.), tilted upwards, azimuth, elevation, etc.); (j) a compact and/or efficient representation that enables retrieval of the calibration data NMR vectors assigned to this grid point; (k) the network state as indicated in the calibration data; (l) a confidence measure indicative of the reliability of the calibration data feeding this grid point; and (m) any combinations of the above. In this exemplary method, further embodiments may also construct a pdf for the set of NMRs and determine a similarity to the pdf for a grid point by a measure applicable to pdfs such as, but not limited to, the Bhattacharya distance, Kullback-Liebler divergence or other measures for probability distributions. Having generated such measures with respect to the set of candidate grid points the method may generate an estimated location as (a) the location of the grid point with the least distortion measure, (b) the weighted sum of the locations of a set of grid points (any weights applied as a function of the distortion measure), (c) the weighted sum of clustered locations of a set of grid points, (d) a combination of locations derived from NMR subsets (where the measure set M is the distortion measure).

One aspect of the present subject matter may generate a location estimate of a mobile device through methods of intersections using any single NMR or set of NMRs. Utilizing a single NMR, an exemplary intersection method may generate an estimated location based upon an observation that the region of validity for any one of the parameters in a particular NMR may define a region where the estimated location of a mobile device should exist. By way of a non-limiting example, the power level or other parameter of a particular NC (e.g., NC1) in an NMR having a power level of P dBm may be evaluated. With regard to the calibration data such that for every NMR in a respective set of calibration data, the particular NC power level may be within +/−x dBm of P. As discussed above, every calibration data vector provides an associated location, and the location of each such data vector in a respective calibration data subset may form a representative region, R1, defining a region within a location space having a power constraint upon NC1. R1 may or may not be contiguous, and may even be empty. In the event that R1 is empty, then the value of x may be increased by a predetermined value (or iteratively increased) until a nonempty region emerges and comprises valid calibration data points satisfying (e.g., falling into the range of) the obtained NMR power or parameter requirement. This may then define a region formed of discrete points in two dimensional location space. Similar regions may be constructed for each of the NCs and for each of the parameters or functions in the NMR. It follows that a range array may thus be generated containing range that define maximum and minimum values for each parameter of the form of two aggregated vectors.

An intersection of the aforementioned regions may then be determined. If a non-empty intersection occurs, the range array may be modified to approach the actual NMR data vector. Any such modification may be attempted in each NC power level or other NMR parameter level individually. In this method, the intersection region may be reduced until the smallest (and possibly clustered) intersection occurs. An estimated location for a mobile device may then be determined as the centroid of this intersection or may be determined through an evaluation of the pdf or other exemplary statistical measure for the calibration data within the intersection or a selected region. Further, an estimated location may also be determined utilizing any one or combination of the methods described above with reference to the generation of a location estimate utilizing any single NMR or set of NMRs. If, however, the intersection is empty, the range array may be modified to be wider than the actual NMR vector until a feasible solution can be found. If no solution is found with the respective range array at a higher threshold, a subset of the NCs in the NMR may be evaluated (e.g., by dropping the lowest power NC in the NMR, etc.) and the entire process described above may then be employed.

A distortion measure may also be determined along with a respective range array that generates a finite intersection region. The applicable distortion measure may be determined as, but not limited to, the largest width of any NMR NC power level or parameter level in the range array, a weighted combination of the individual widths of the NMR NC power or parameter levels in the range array, the area of the final intersection region, or any combination thereof. This distortion measure can then be an indicator of the quality or expected accuracy of the eventual location estimate.

Additionally, any subsets of the NMR(s) may be examined for intersection regions. If multiple disjoint regions occur with different NMR subsets, these disjointed regions may be regarded as a set of grid points (NUGs or UGs) and evaluated for an estimated location employing any one or combination of the methods described above with reference to the generation of a location estimate utilizing a single NMR or set of NMRs. By way of a non-limiting example, a pdf may be generated for each disjointed region, and then the techniques of location estimation described above utilizing any single NMR or set of NMRs may be employed to determine which of the regions may be the best location estimate.

Utilizing a set of NMRs, an exemplary intersection method may generate an estimated location for each NMR in the set of NMRs by any or all of the methods applicable to a single NMR as discussed in the previous paragraphs and (a) determine the tightest cluster of such single NMR locations (optionally using a metric derived while locating that NMR to weight the clusters such as a distortion measure (e.g., joint probability, Mahalanobis distance, cluster radius, etc.)), (b) if multiple disjoint regions occur for one or more NMRs, use the methods described above with reference to the generation of a location estimate utilizing any single NMR or set of NMRs to determine the most likely estimate for the location estimate, and/or (c) if multiple disjoint regions occur for some NMRs but not for others, utilizing regions having an appropriate weighting and/or utilizing a distortion measure and any additional weighting that may allocate a greater likelihood to those NMRs generating a non-disjoint region.

Utilizing a set of NMRs, an exemplary intersection method may also generate a representative NMR from the set of NMRs and apply the methods described above with regard to a single NMR to the representative NMR. The representative NMR may be generated by determining a representative value for each of the NCs available in the set of NMRs and determining a representative value for each of the other parameters available in the respective NMRs. Exemplary representative values may be obtained as a function of the available set of values (e.g., for NC power, mean or median). In the alternative, this exemplary method may also consider a set of NC power or parameter levels (applicable to each NMR NC level) when viewed over the set of NMRs and select that NC level requiring the narrowest range to provide a valid region. This power or parameter level may be the applicable level in the representative NMR. It should be noted that embodiments of the present subject matter employing this exemplary method may produce results different from the aforementioned grid point approach as calibration data too few in number to effectively emerge in a pdf of the grid point(s) to which the data are applied may, however, emerge in this exemplary method.

Figure 29:
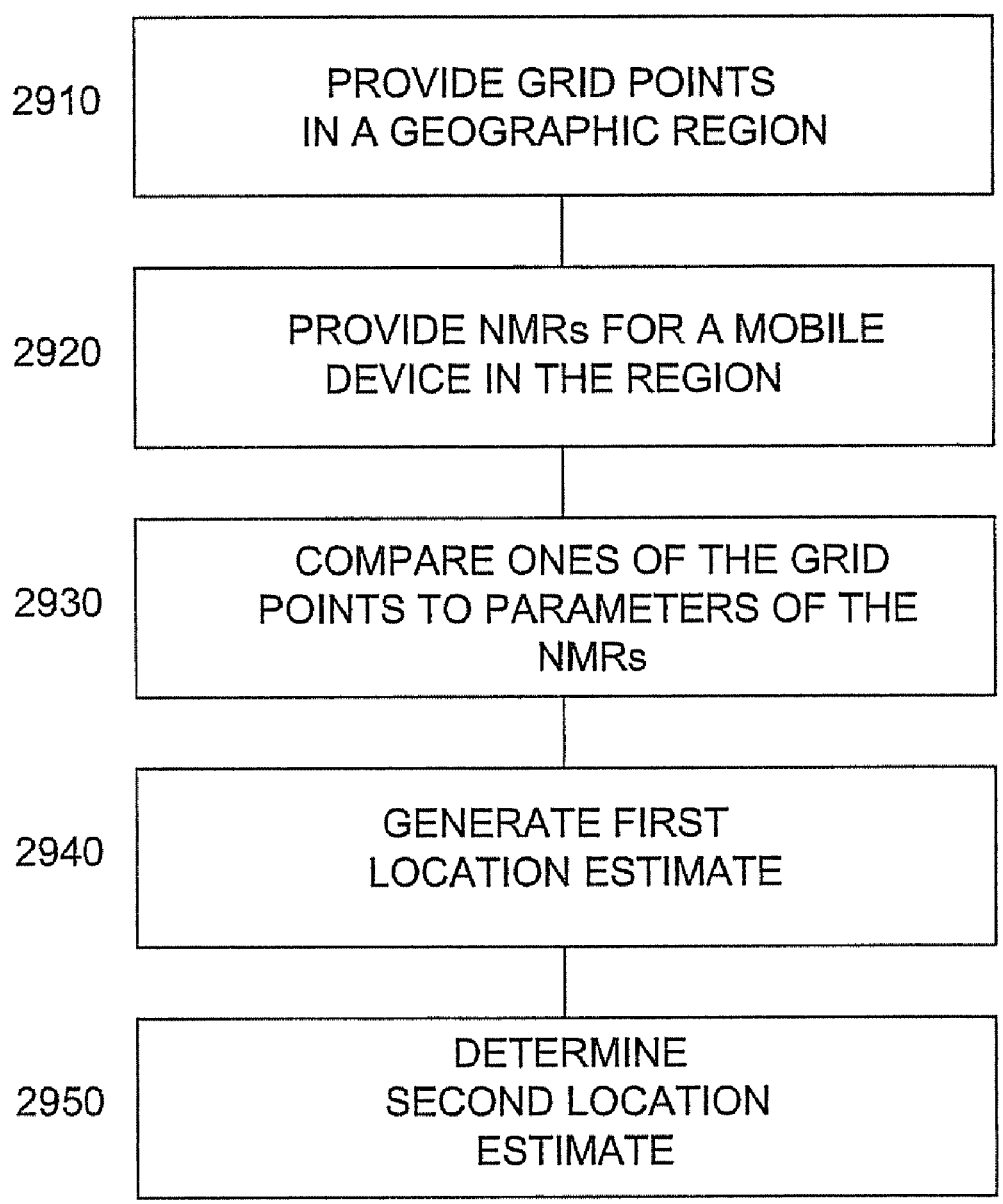
FIG. 29 is a flow chart for a method for locating a mobile device according to one embodiment of the present subject matter.

FIG. 29 is a flow chart for a method for locating a mobile device according to one embodiment of the present subject matter. With reference to FIG. 29, at block 2910, a plurality of calibration or grid points may be provided in a geographic region. At block 2920, a plurality of NMRs may be provided for a mobile device in the geographic region. Ones of the plurality of grid points may be compared to one or more parameters of ones of the plurality of NMRs in block 2930. In another embodiment of the present subject matter, the comparison may further comprise generating a distortion measure that is a function of a combination of parameters of ones of the plurality of network measurement reports and corresponding parameters of ones of the plurality of grid points. An exemplary distortion measure may be, but is not limited to, a Mahalanobis distance, a comparison of received signal strengths of a serving cell and a neighboring cell between ones of the plurality of NMRs and grid points, a comparison of received signal strengths of a neighboring cell between ones of the plurality of NMRs and grid points, a comparison of received signal strengths of a first common neighboring cell and another neighboring cell between ones of the plurality of NMRs and grid points, a comparison of average received signal strengths of reporting neighboring cells and received signal strengths of a neighboring cell between ones of the plurality of NMRs and grid points, a comparison of average received signal strengths of serving and reporting neighbor cells received signal strengths of a selected neighbor or serving cell between ones of the plurality of NMRs and grid points, and any combination thereof. A first location estimate of the mobile device may be generated for each of the ones of the plurality of NMRs in block 2940, and in block 2950, a second location estimate of the mobile device may be determined as a function of at least one of the generated first location estimates.

Figure 30:
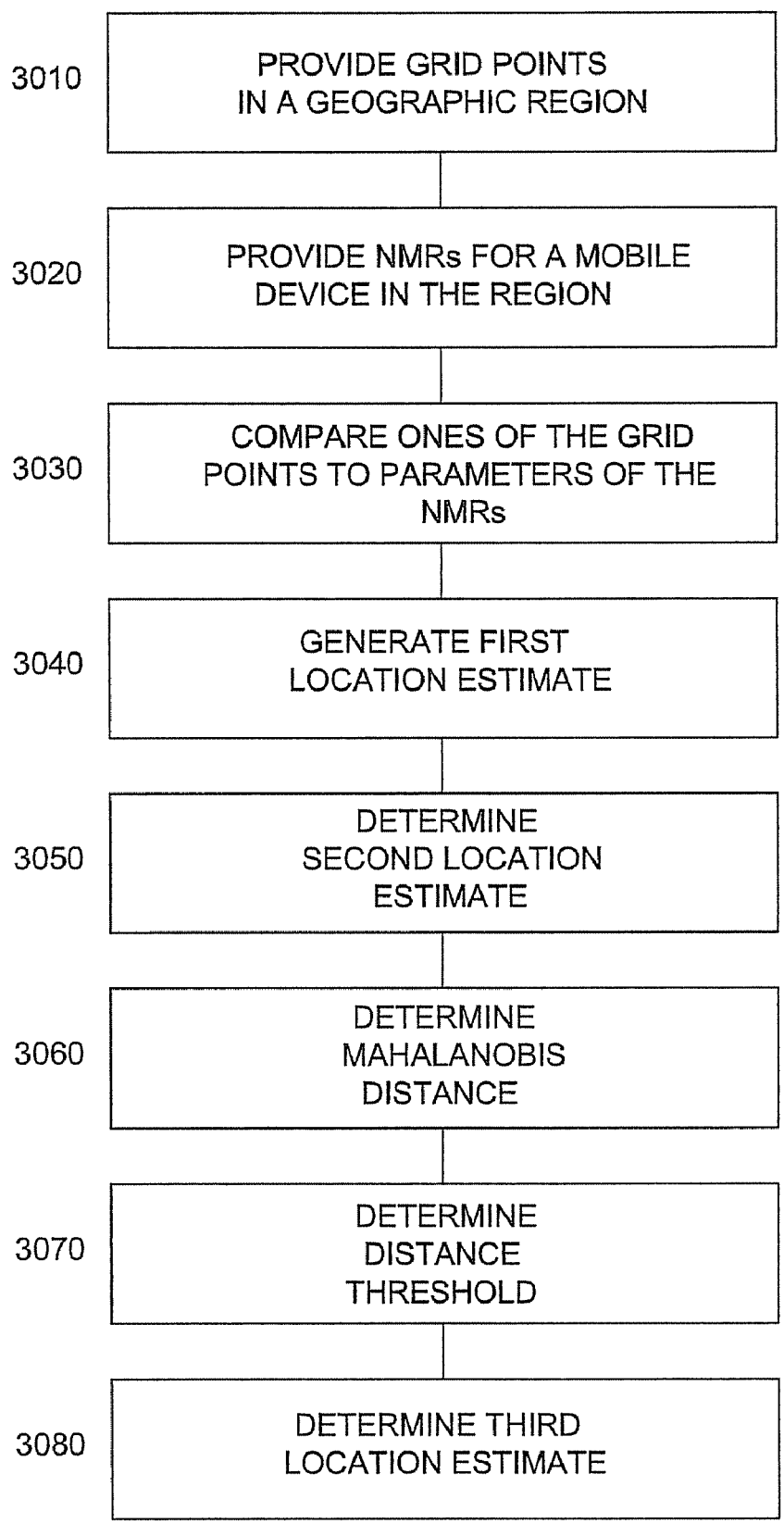
FIG. 30 is a flow chart for a method for locating a mobile device according to one embodiment of the present subject matter including identifying and omitting outlier first location estimates.

FIG. 30 is a flow chart for a method for locating a mobile device according to one embodiment of the present subject matter including identifying and omitting outlier first location estimates. With reference to FIG. 30, blocks 3010, 3020, 3030, 3040 and 3050 are similar to blocks 2910, 2920, 2930, 2940 and 2950, respectively. At block 3060, the method may further determine a Mahalanobis distance from each first location estimate to the second location estimate and at block 3070, determine a distance threshold from a median of the determined Mahalanobis distances multiplied by a predetermined factor. At block 3080, a third location estimate may then be determined by averaging two or more of the first location estimates. In such a determination the first location estimates having a Mahalanobis distance to the second location estimate greater than a predetermined distance threshold may be omitted from the third location estimate determination.

Figure 31:
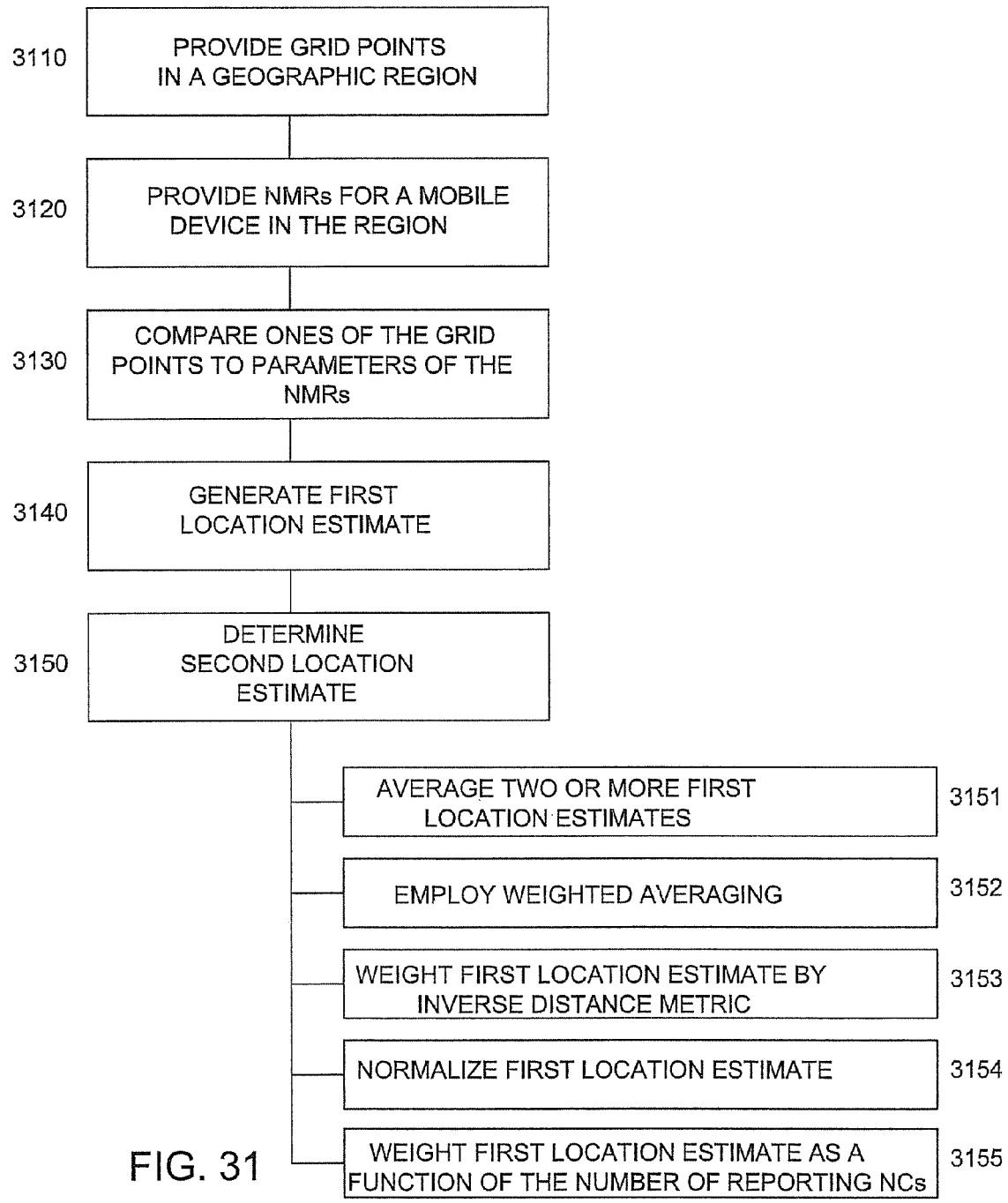
FIG. 31 is a flow chart for a method for locating a mobile device according to another embodiment of the present subject matter.

FIG. 31 is a flow chart for a method for locating a mobile device according to another embodiment of the present subject matter. With reference to FIG. 31, blocks 3110, 3120, 3130, 3140 and 3150 are similar to blocks 2910, 2920, 2930, 2940 and 2950, respectively. At block 3151, the determination of a second location estimate may further comprise averaging two or more first location estimates, or at block 3152, the determination of a second location estimate may further comprise employing a weighted averaging of ones of the first location estimates. At block 3153, the determination of a second location estimate may further comprise weighting a first location estimate by an inverse of a distance metric, or at block 3154, the determination of a second location estimate may further comprise normalizing a first location estimate by a sum of an inverse of a distance metric. Further, at block 3155, the determination of a second location estimate may further comprise weighting a first location estimate as a function of the number of reporting neighboring cells to a serving cell serving the mobile device.

Figure 32:
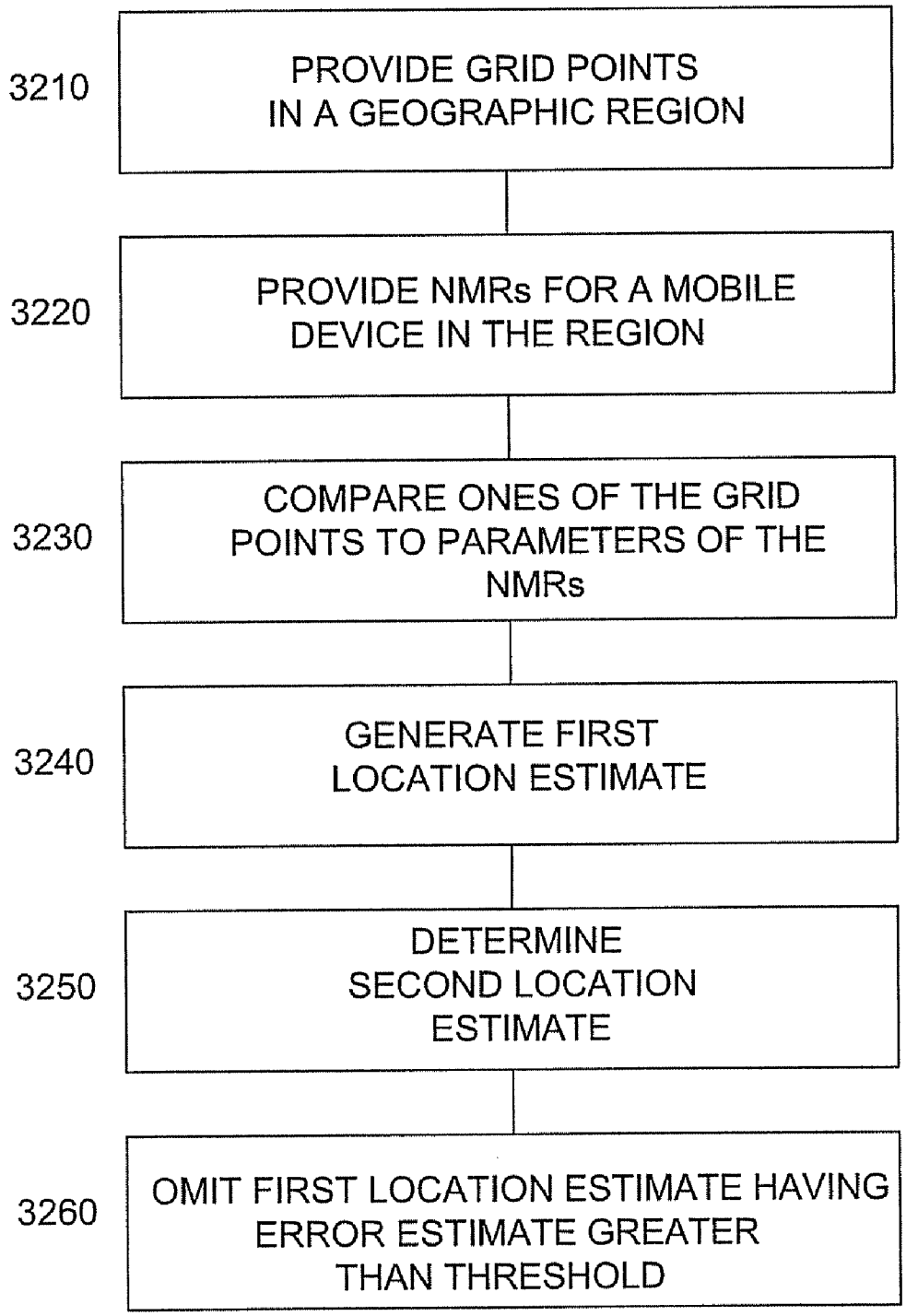
FIG. 32 is a flow chart for a method for locating a mobile device according to one embodiment of the present subject matter including omitting a first location estimate.

FIG. 32 is a flow chart for a method for locating a mobile device according to one embodiment of the present subject matter including omitting a first location estimate. With reference to FIG. 32, blocks 3210, 3220, 3230, 3240 and 3250 are similar to blocks 2910, 2920, 2930, 2940 and 2950, respectively. At block 3260, the method may further omit a first location estimate having an error greater than a predetermined threshold.

Figure 33:
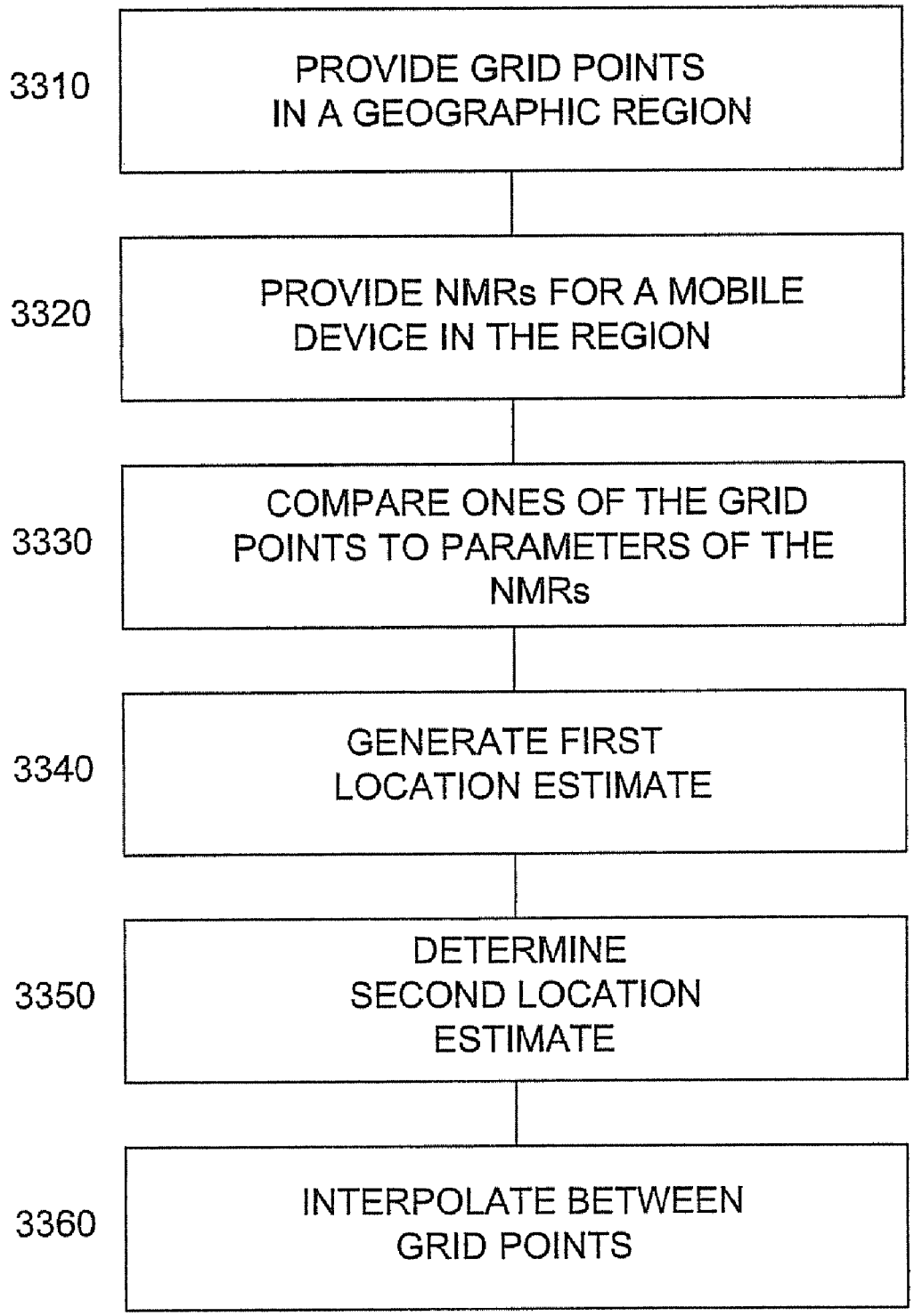
FIG. 33 is a flow chart for a method for locating a mobile device according to one embodiment of the present subject matter including interpolating between grid points.

FIG. 33 is a flow chart for a method for locating a mobile device according to one embodiment of the present subject matter including interpolating between grid points. With reference to FIG. 33, blocks 3310, 3320, 3330, 3340 and 3350 are similar to blocks 2910, 2920, 2930, 2940 and 2950, respectively. At block 3360, the method may further interpolate between ones of the plurality of grid points when more than one grid point corresponds to a parameter of the plurality of NMRs.

Figure 34:
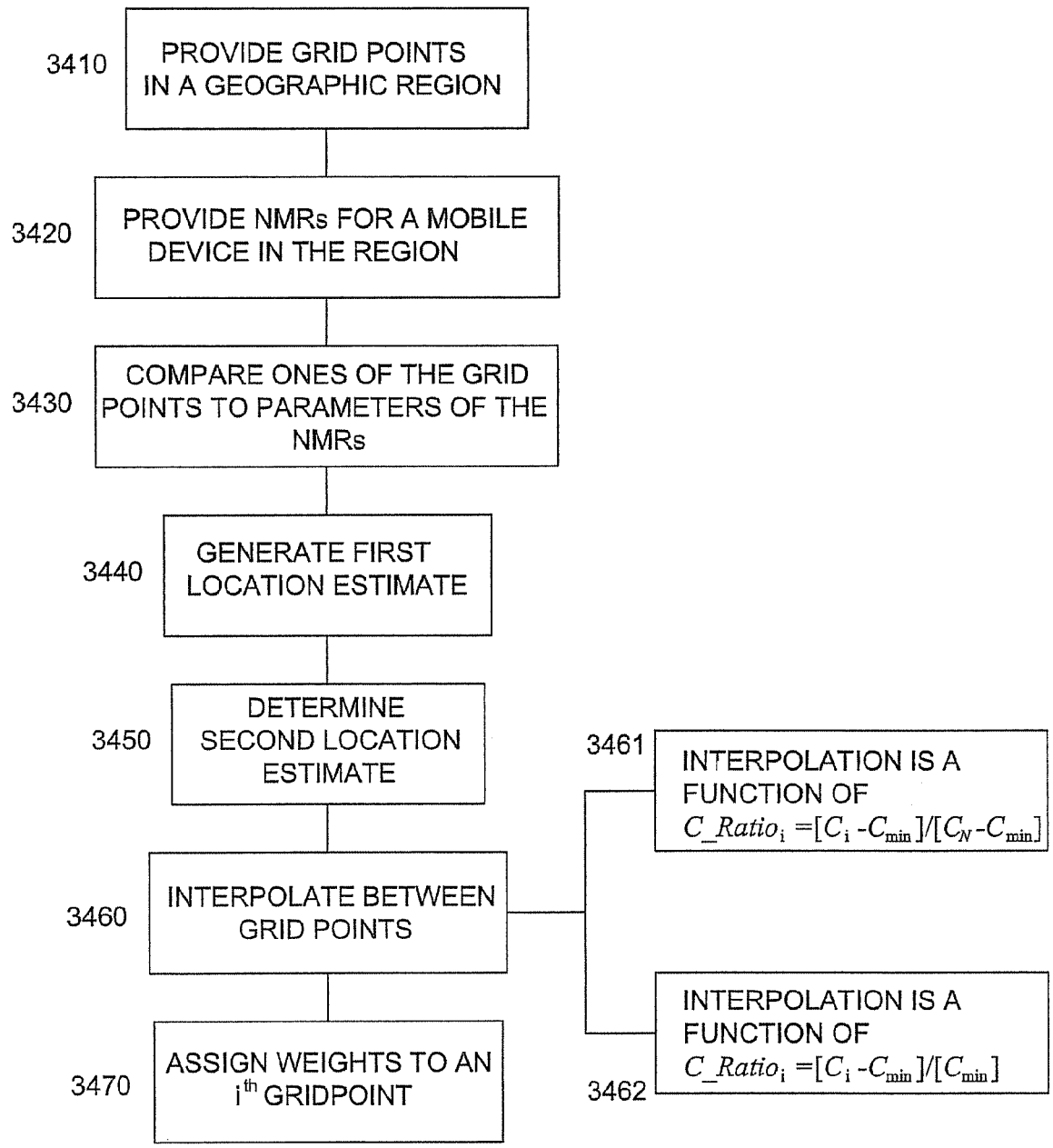
FIG. 34 is a flow chart for a method for locating a mobile device according to another embodiment of the present subject matter including interpolating between grid points and/or assigning weights to selected grid points.

FIG. 34 is a flow chart for a method for locating a mobile device according to another embodiment of the present subject matter including interpolating between grid points and/or assigning weights to selected grid points. With reference to FIG. 34, blocks 3410, 3420, 3430, 3440, 3450 and 3460 are similar to blocks 3310, 3320, 3330, 3340, 3350 and 3360, respectively. At block 3461, the interpolation may be a function of the relationship provided in Equation (3) above. With reference to Equation (3), a grid point having a C_Ratio$_i$ less than a predetermined threshold may be a candidate grid point for the interpolation in one embodiment and/or a grid point having a distance from the best corresponding grid point less than a predetermined threshold may be a candidate grid point for the interpolation. At block 3462, the interpolation may also be a function of the relationship provided in Equation (4) above. At block 3470, the method may further assign weights to an $i^{th}$ grid point as a function of the relationship provided in Equation (5) above.

Figure 35:
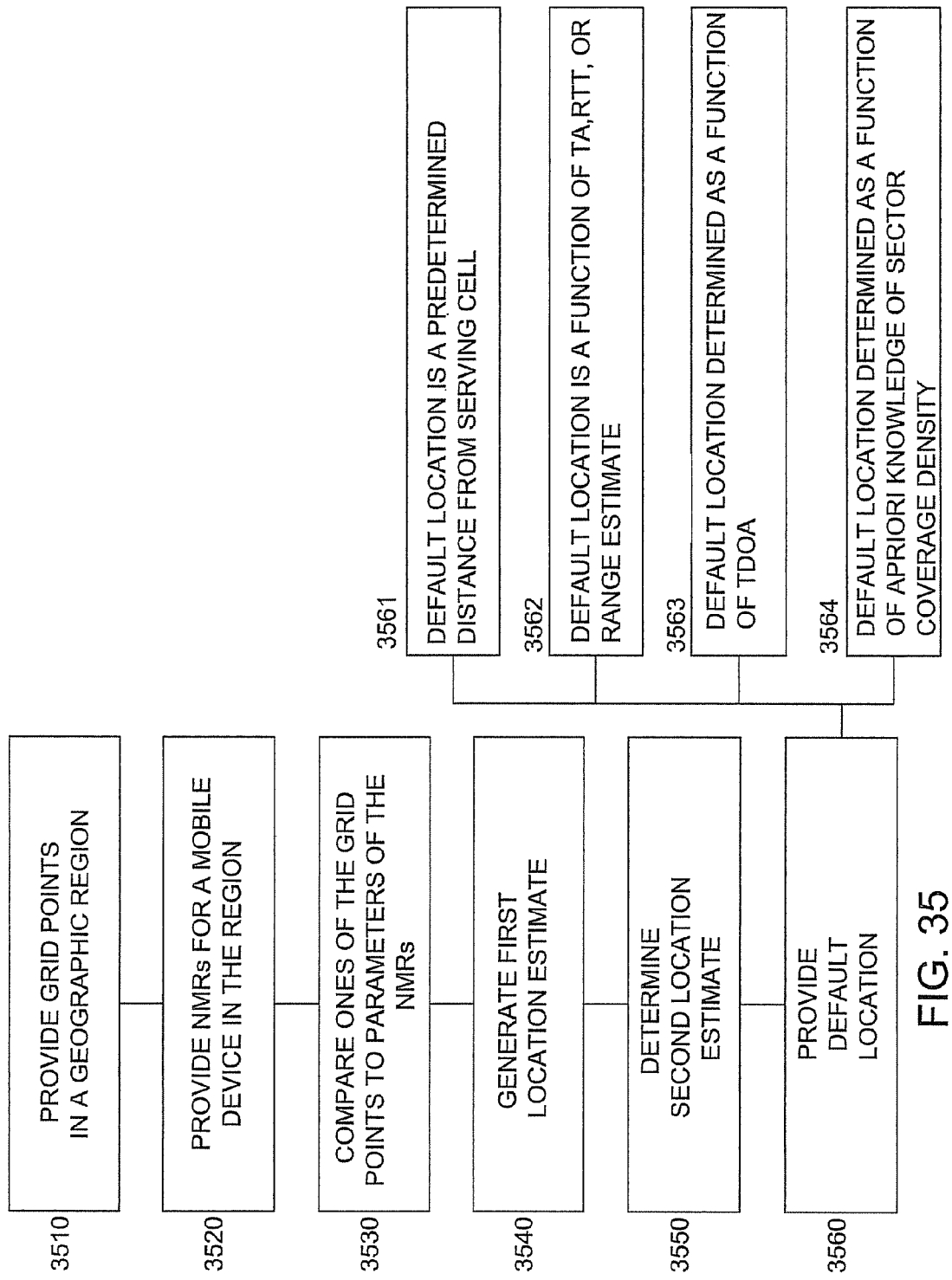
FIG. 35 is a flow chart for a method for locating a mobile device according to another embodiment of the present subject matter including providing a default location.

FIG. 35 is a flow chart for a method for locating a mobile device according to another embodiment of the present subject matter including providing a default location. With reference to FIG. 35, blocks 3510, 3520, 3530, 3540, and 3550 are similar to blocks 2910, 2920, 2930, 2940 and 2950, respectively. At block 3560, the method may further comprise providing a default location for the second location estimate if a second location estimate cannot be determined as a function of at least one of the generated first location estimates. In one embodiment at block 3561, the default location may be a predetermined distance from a serving cell serving the mobile device at a heading along a serving sector azimuth. In another embodiment at block 3562, the default location may be a function of timing advance or round trip time and/or may be an approximate range estimate from a serving cell serving the mobile device. In an additional embodiment in block 3563, the default location may be a region determined as a function of a TDOA measurement and/or where the region is the intersection of a hyperbola defined by said TDOA with a timing advance region applicable to a serving cell serving the mobile device. In yet a further embodiment in block 3564, the default location may be determined as a function of a priori knowledge of sector coverage density.

Figure 36:
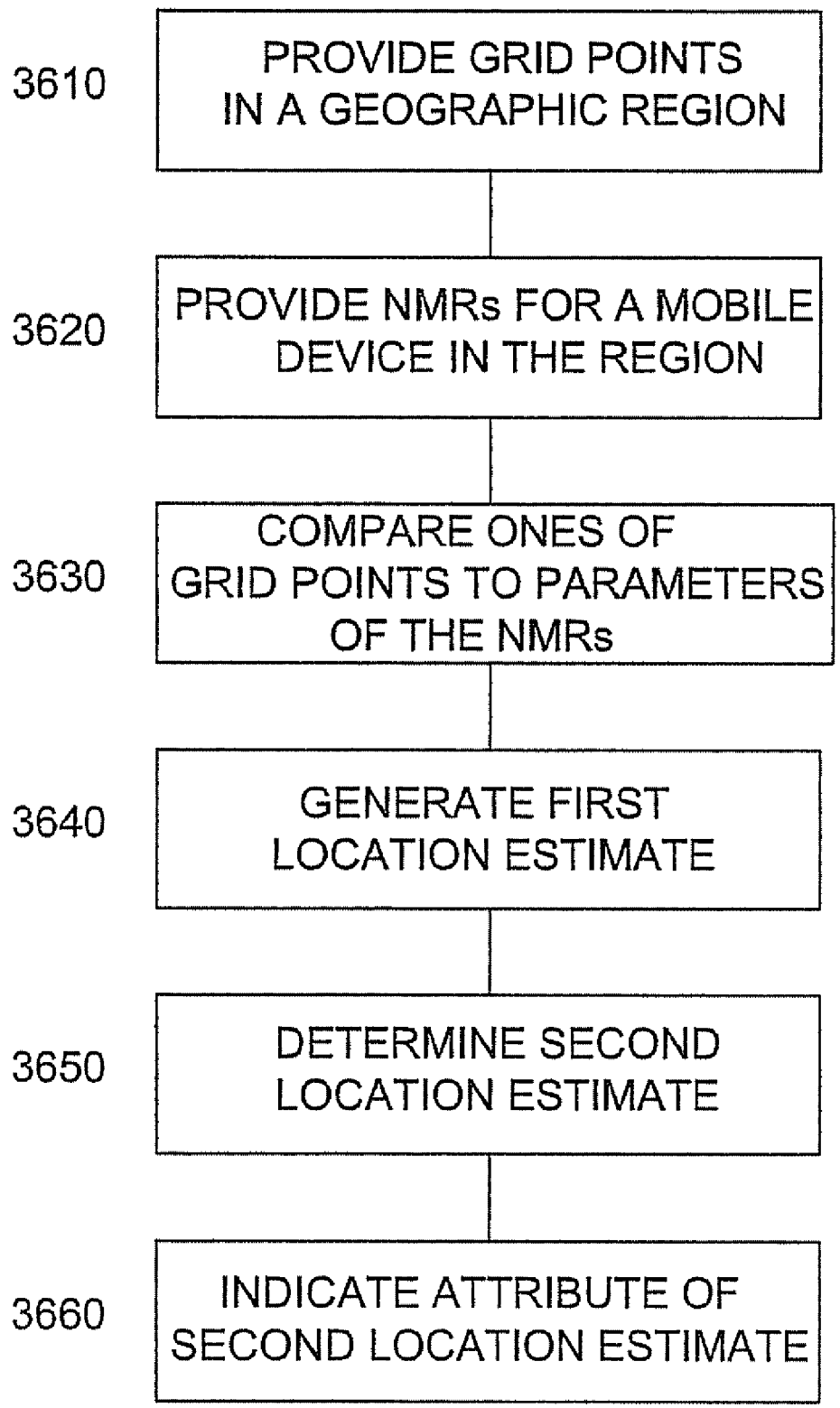
FIG. 36 is a flow chart for a method of improving a location estimate of a mobile device.

FIG. 36 is a flow chart for a method of improving a location estimate of a mobile device. With reference to FIG. 36, at block 3610, a plurality of grid points in a geographic region may be provided and at block 3620, a set of NMRs for a mobile device in the geographic region may be provided. The set of NMRs may or may not include one or more subsets of NMRs. At block 3630, ones of the plurality of grid points may be compared to at least one parameter of a subset of the NMRs, and at block 3640, a first location estimate of the mobile device may be generated for each subset of NMRs. A second location estimate of the mobile device may be determined as a function of at least one of the generated first location estimates at block 3650, and at block 3660, an attribute of the second location estimate may be indicated as a function of a parameter of a subset of the NMRs. In additional embodiments, the attribute may be determined as a function of any one or combination of a fraction of first location estimates corresponding with the second location estimate and a fraction of total first location estimates that lie within a predetermined distance of the second location estimate.

Figure 37:
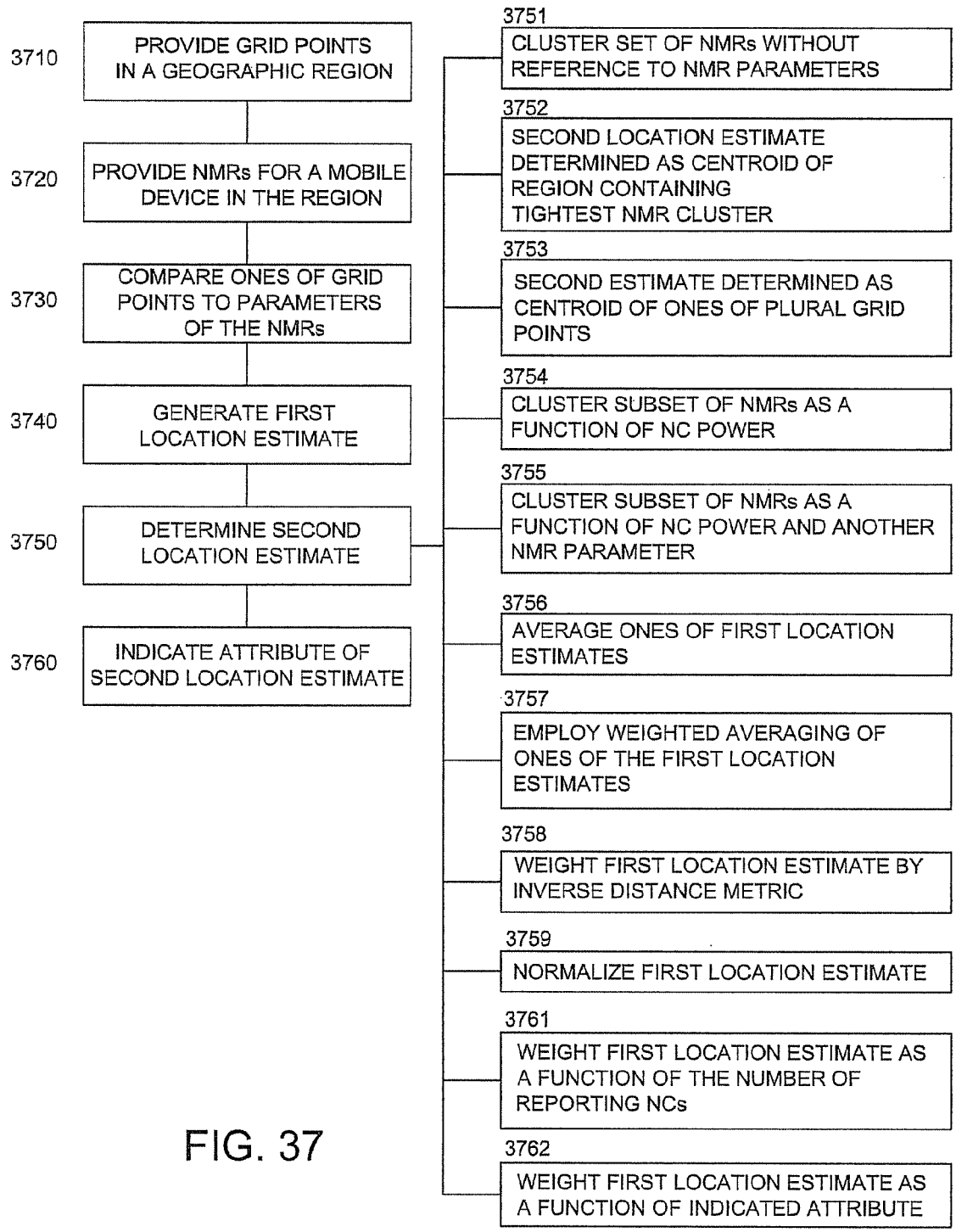
FIG. 37 is a flow chart for a method of improving a location estimate of a mobile device according to another embodiment of the present subject matter.

FIG. 37 is a flow chart for a method of improving a location estimate of a mobile device according to another embodiment of the present subject matter. With reference to FIG. 37, blocks 3710, 3720, 3730, 3740, 3750 and 3760 are similar to blocks 3610, 3620, 3630, 3640, 3650 and 3660, respectively. At block 3751, the determination of a second location estimate may further comprise clustering the set of NMRs without reference to parameters in any of the subsets of NMRs. At block 3752, the second location estimate may be determined as the centroid of a region containing the tightest cluster of NMRs in the set of NMRs. The cluster may or may not possess an aggregate measure higher than a predetermined threshold. At block 3753, the second location estimate may be determined as the centroid of ones of the plurality of grid points occurring most often in the set of NMRs. At block 3754, the determination of a second location estimate may further comprise clustering a subset of NMRs as a function of power of neighboring cells. At block 3755, the determination of a second location estimate may further comprise clustering a subset of NMRs as a function of power of neighboring cells and another parameter in the subset. At block 3756, the determination of a second location estimate may further comprise averaging two or more first location estimates. At block 3757, the determination of a second location estimate may also further comprise employing a weighted averaging of ones of the first location estimates. In another embodiment, at block 3758, the determination of a second location estimate may further comprise weighting a first location estimate by an inverse of a distance metric. At block 3759, the determination of a second location estimate may also comprise normalizing a first location estimate by a sum of an inverse of a distance metric, and at block 3761, the determination of a second location estimate may further comprise weighting a first location estimate as a function of the number of reporting neighboring cells to a serving cell serving the mobile device. In another embodiment at block 3762, the determination of a second location estimate may further comprise weighting a first location estimate as a function of the indicated attribute. Exemplary weighting may be, but is not limited to, a Mahalanobis distance, a probability density function.

Figure 38:
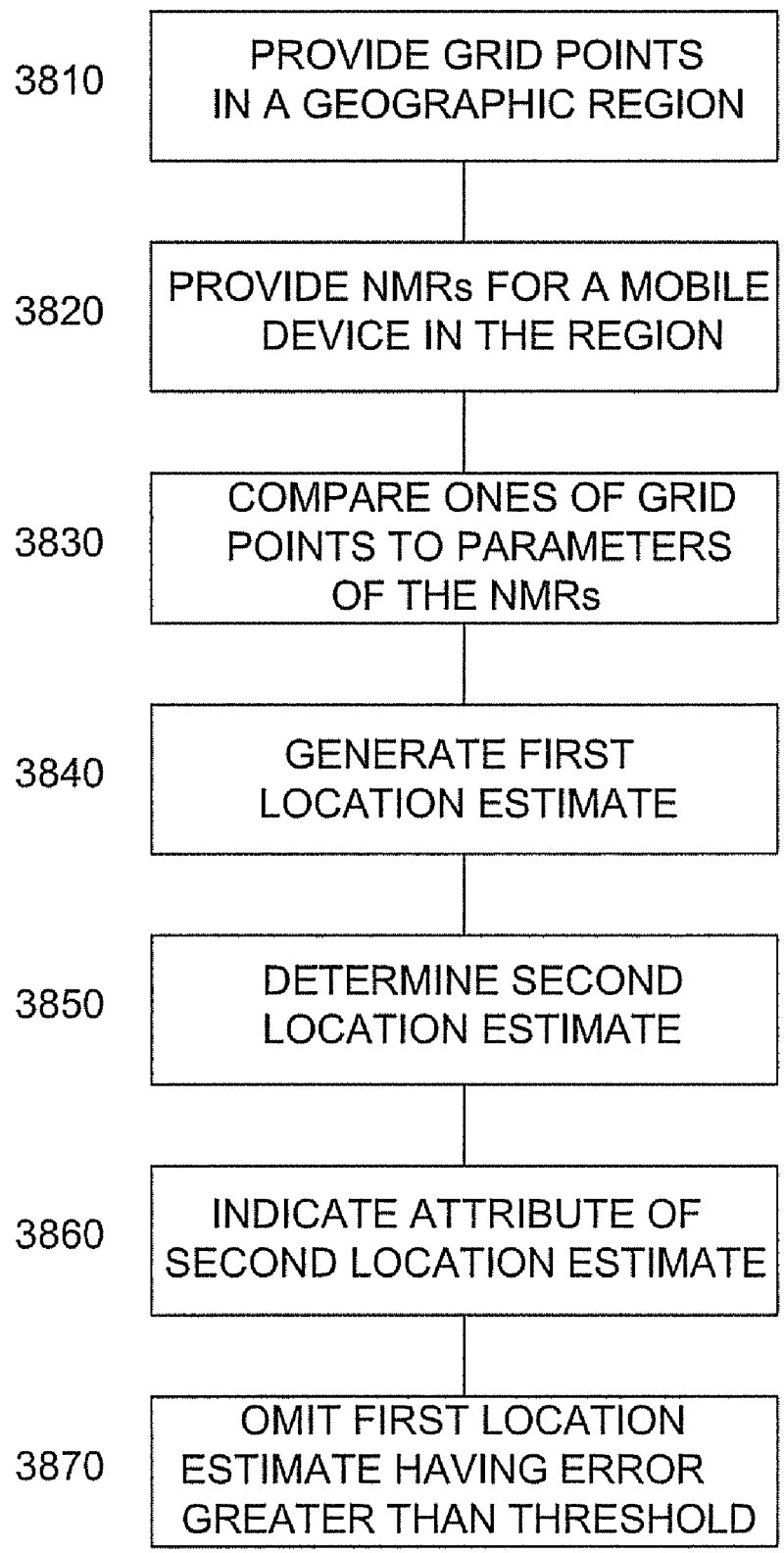
FIG. 38 is a flow chart for a method of improving a location estimate of a mobile device according to another embodiment of the present subject matter including omitting a first location estimate.

FIG. 38 is a flow chart for a method of improving a location estimate of a mobile device according to another embodiment of the present subject matter including omitting a first location estimate. With reference to FIG. 38, blocks 3810, 3820, 3830, 3840, 3850 and 3860 are similar to blocks 3610, 3620, 3630, 3640, 3650 and 3660, respectively. At block 3870, the method may further omit a first location estimate having an error greater than a predetermined threshold.

Figure 39:
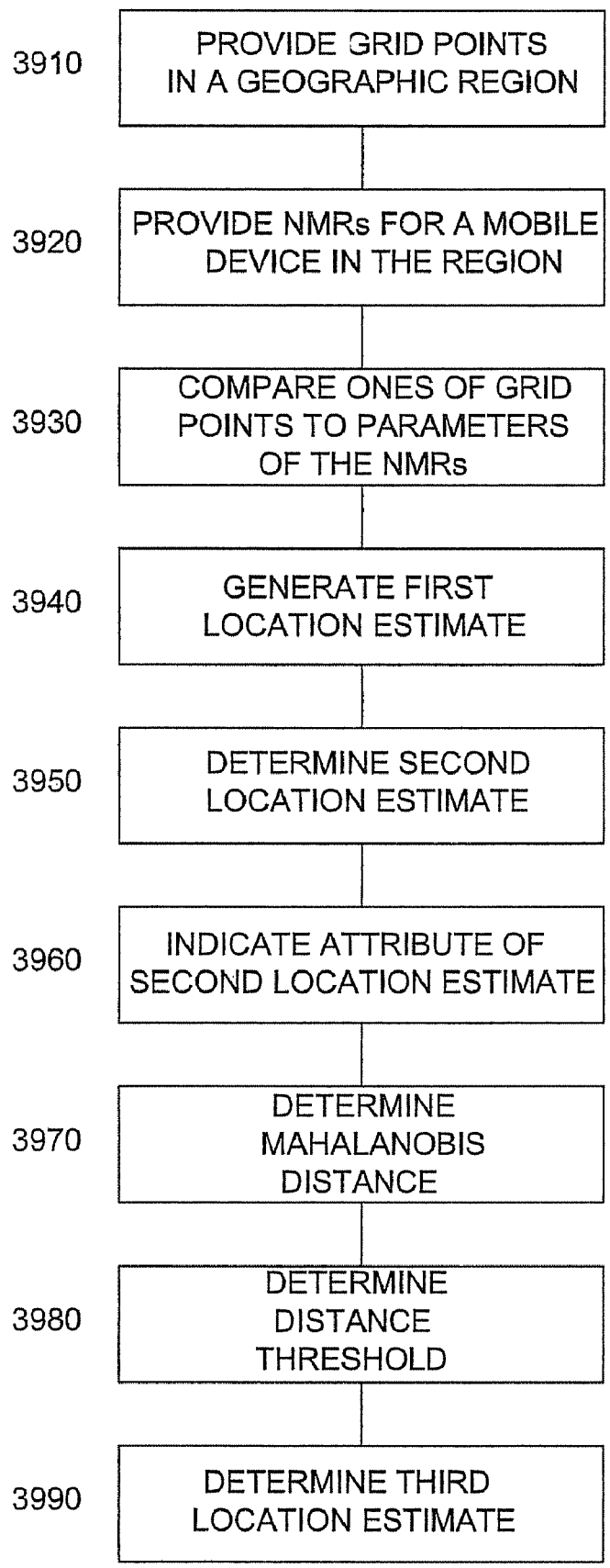
FIG. 39 is a flow chart for a method for locating a mobile device according to one embodiment of the present subject matter including identifying and omitting outlier first location estimates.

FIG. 39 is a flow chart for a method for locating a mobile device according to one embodiment of the present subject matter including identifying and omitting outlier first location estimates. With reference to FIG. 39, blocks 3910, 3920, 3930, 3940, 3950 and 3960 are similar to blocks 3610, 3620, 3630, 3640, 3650 and 3660 respectively. At block 3970, the method may further determine a Mahalanobis distance from each first location estimate to the second location estimate and at block 3980, determine a distance threshold from a median of the determined Mahalanobis distances multiplied by a predetermined factor. At block 3990, a third location estimate may then be determined by averaging two or more of the first location estimates. In such a determination the first location estimates having a Mahalanobis distance to the second location estimate greater than a predetermined distance threshold may be omitted from the third location estimate determination.

Figure 40:
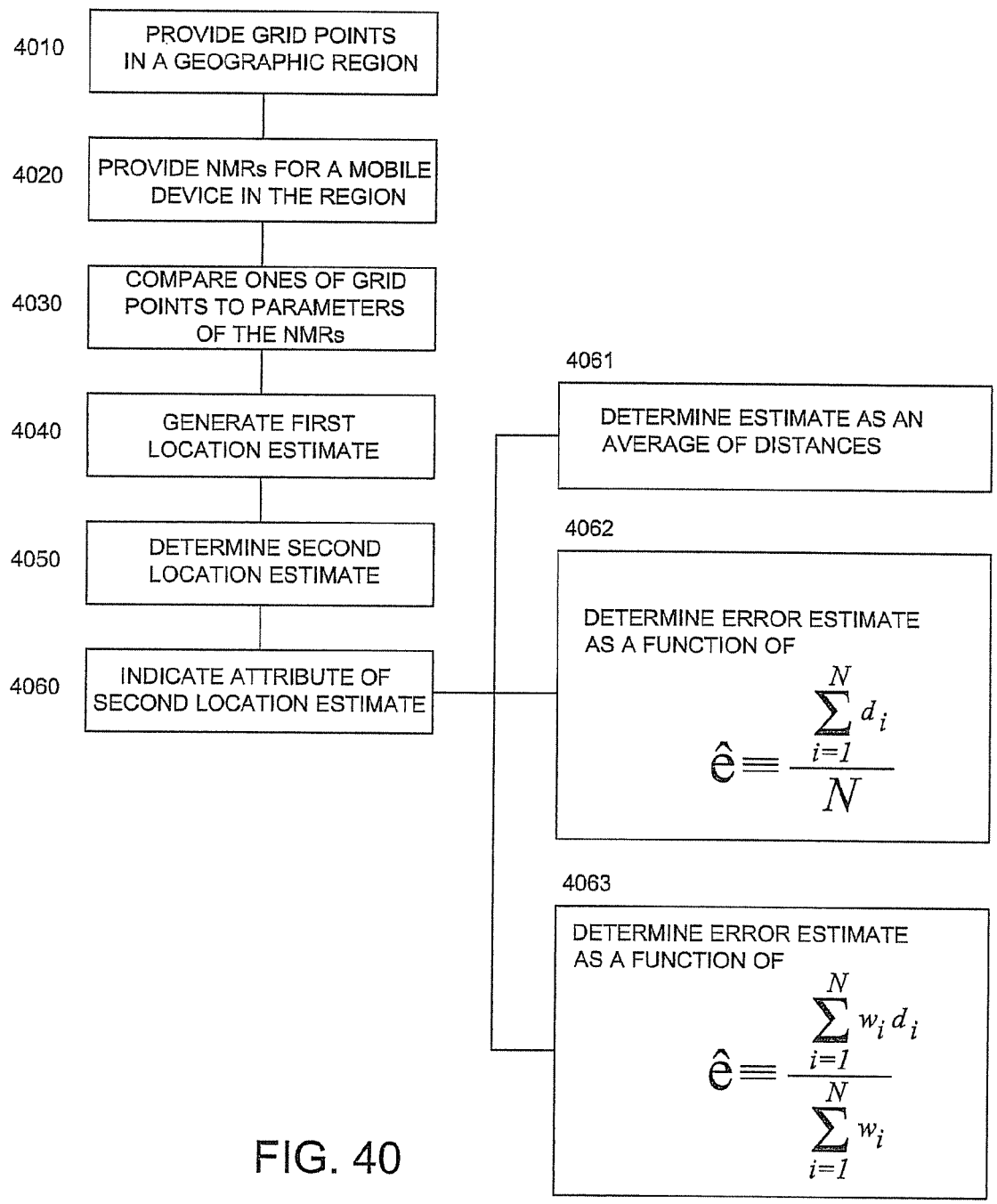
FIG. 40 is a flow chart for a method of improving a location estimate of a mobile device according to a further embodiment of the present subject matter.

FIG. 40 is a flow chart for a method of improving a location estimate of a mobile device according to a further embodiment of the present subject matter. With reference to FIG. 40, blocks 4010, 4020, 4030, 4040, 4050 and 4060 are similar to blocks 3610, 3620, 3630, 3640, 3650 and 3660, respectively. At block 4061, the indication of an attribute of the second location estimate may further comprise determining an error estimate as an average of distances from each first location estimate to the second location estimate. In one embodiment at block 4062, the error estimate may be determined as a function of the relationship provided in Equation (1) above. In a further embodiment at block 4063, the error estimate may be determined as a function of the relationship provided in Equation (2) above. With reference to Equation (2), exemplary weighting factors may be, but are not limited to probabilities determined during the first location estimate generation, probabilities determined during the second location estimate determination, distortion function values determined during the first location estimate generation, distortion function values determined during the second location estimate determination, and combinations thereof. In yet another embodiment in block 4064, the error estimate may be determined as a function of subset NMR cluster separation between a highest aggregate weighted cluster.

Figure 41:
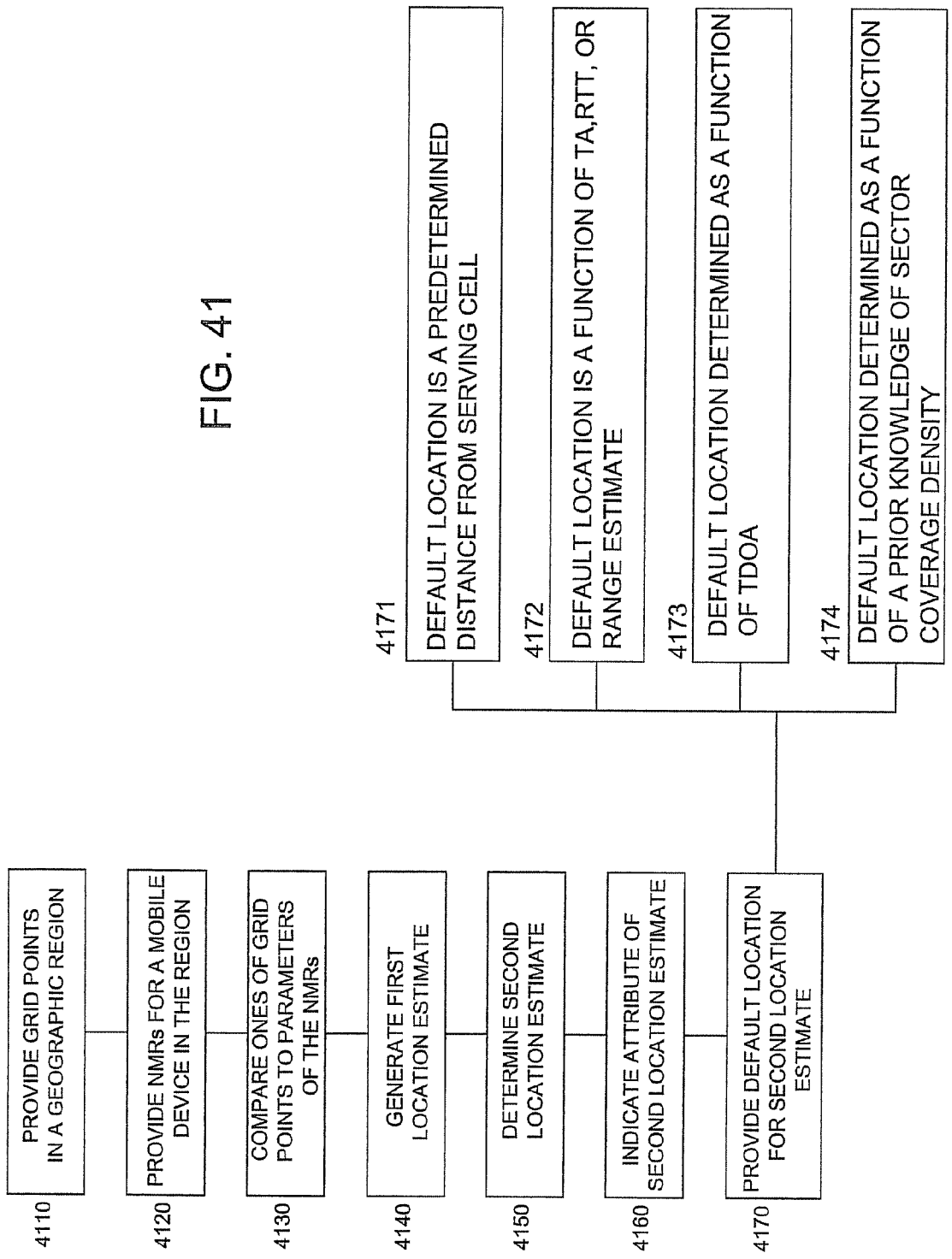
FIG. 41 is a flow chart for a method of improving a location estimate of a mobile device according to a further embodiment of the present subject matter including providing a default location.

FIG. 41 is a flow chart for a method of improving a location estimate of a mobile device according to a further embodiment of the present subject matter including providing a default location. With reference to FIG. 41, blocks 4110, 4120, 4130, 4140, 4150 and 4160 are similar to blocks 3610, 3620, 3630, 3640, 3650 and 3660, respectively. At block 4170, a default location may be provided for the second location estimate if the attribute is less than a predetermined threshold. In one embodiment at block 4171, the default location may be a predetermined distance from a serving cell serving the mobile device at a heading along a serving sector azimuth. In another embodiment at block 4172, the default location may be a function of timing advance or round trip time and/or may be an approximate range estimate from a serving cell serving the mobile device. In an additional embodiment in block 4173, the default location may be a region determined as a function of a TDOA measurement and/or where the region is the intersection of a hyperbola defined by said TDOA with a timing advance region applicable to a serving cell serving the mobile device. In yet a further embodiment in block 4174, the default location may be determined as a function of a priori knowledge of sector coverage density.

Figure 42:
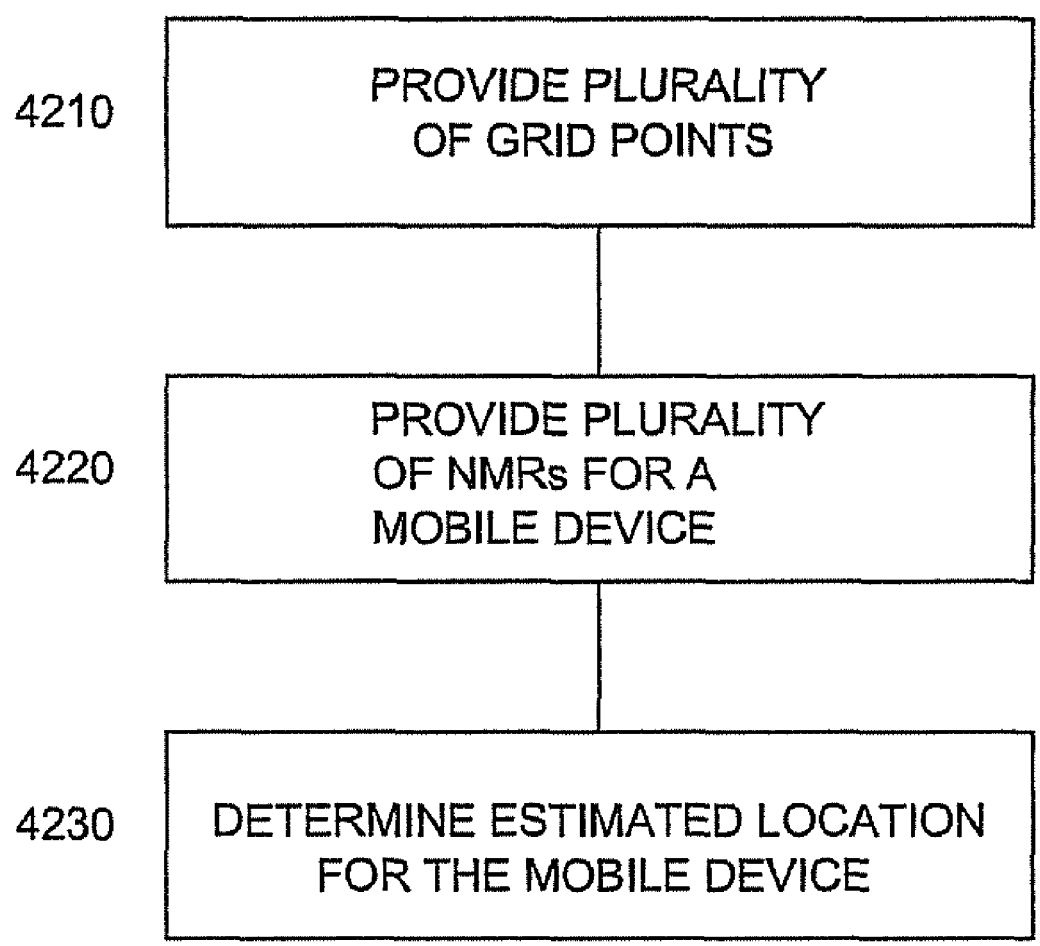
FIGS. 42-55 are flow charts for methods of locating a mobile device in a geographic region according embodiments of the present subject matter.

FIG. 42 is a flow chart for a method of locating a mobile device in a geographic region according to an embodiment of the present subject matter. With reference to FIG. 42, at block 4210, a plurality of grid points may be provided in a geographic region where each of the grid points may include at least one characterizing parameter or characterizing function, and where each of the grid points is located on a grid defined over the geographic region. At block 4220, a plurality of NMRs may be provided for a mobile device in the geographic region, and at block 4230, an estimated location may be determined for the mobile device from one NMR as a function of the at least one parameter. Of course, one or more of the grid points may be randomly located within the geographic region, and one or more of the grid points may be located on a predetermined fixed uniform grid defined over the geographic region.

Figure 43:
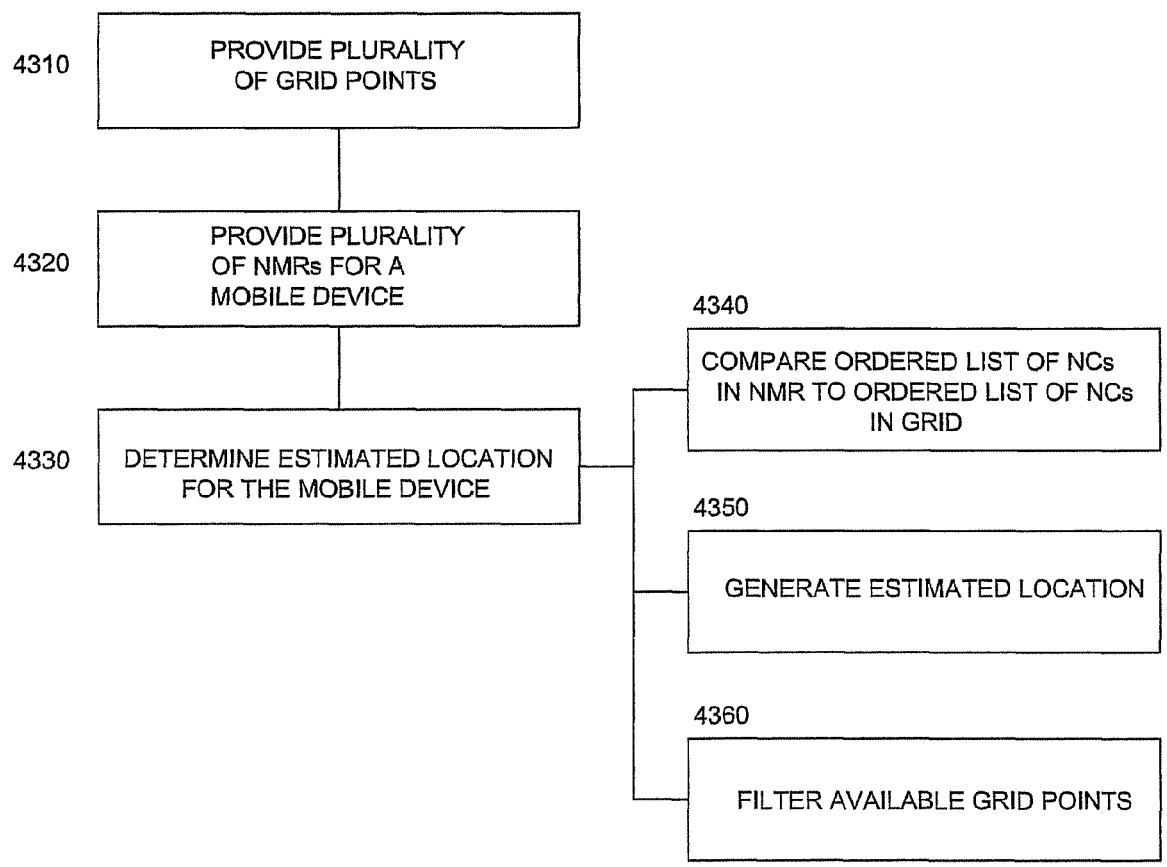

FIG. 43 is a flow chart for a method of locating a mobile device in a geographic region according to another embodiment of the present subject matter. With reference to FIG. 43, blocks 4310, 4320 and 4330 are similar to blocks 4210, 4220 and 4230, respectively. At block 4340, the determination of an estimated location for the mobile device may further include comparing an ordered list of cells neighboring a cell serving the mobile device in the one NMR to an ordered list of neighboring cells in the grid. The ordering may be in terms of any one of a number of parameters characterizing a respective NMR, e.g., NC power level or NC measurement quality. At block 4350, an estimated location may be generated for the mobile device which may comprise a centroid of a cluster of best matching grid points in the grid, a highest joint probability matching grid point in the grid, a weighted sum of the locations of a set of matching grid points in the grid (exemplary weights may be defined by any number of means such as, but not limited to, a joint probability derived from individual pdfs, etc.), a weighted sum of clustered locations of a set of matching grid points in the grid (i.e., cluster the locations of the matching grid points and then apply a cumulative probability for all contained grid points in a cluster as a weight for the respective cluster), as a function of locations determined from subsets of the plurality of NMRs, or any combination thereof. At block 4360, a further embodiment may also filter available grid points as a function of any one or combination of selected characteristics, such as, but not limited to, a matching of serving cell or sector for grid points in the grid to the serving cell (provided such a characterization is available for the respective grid points) or sector of the one NMR, a TA parameter from the one NMR, a RTT parameter from the one NMR, a mobile device orientation parameter, a serving cell identifier, a serving control channel, a magnitude of a serving cell forward link control channel received signal level, a predetermined number of cell received signal levels common to the one NMR, or any combination thereof.

Figure 44:
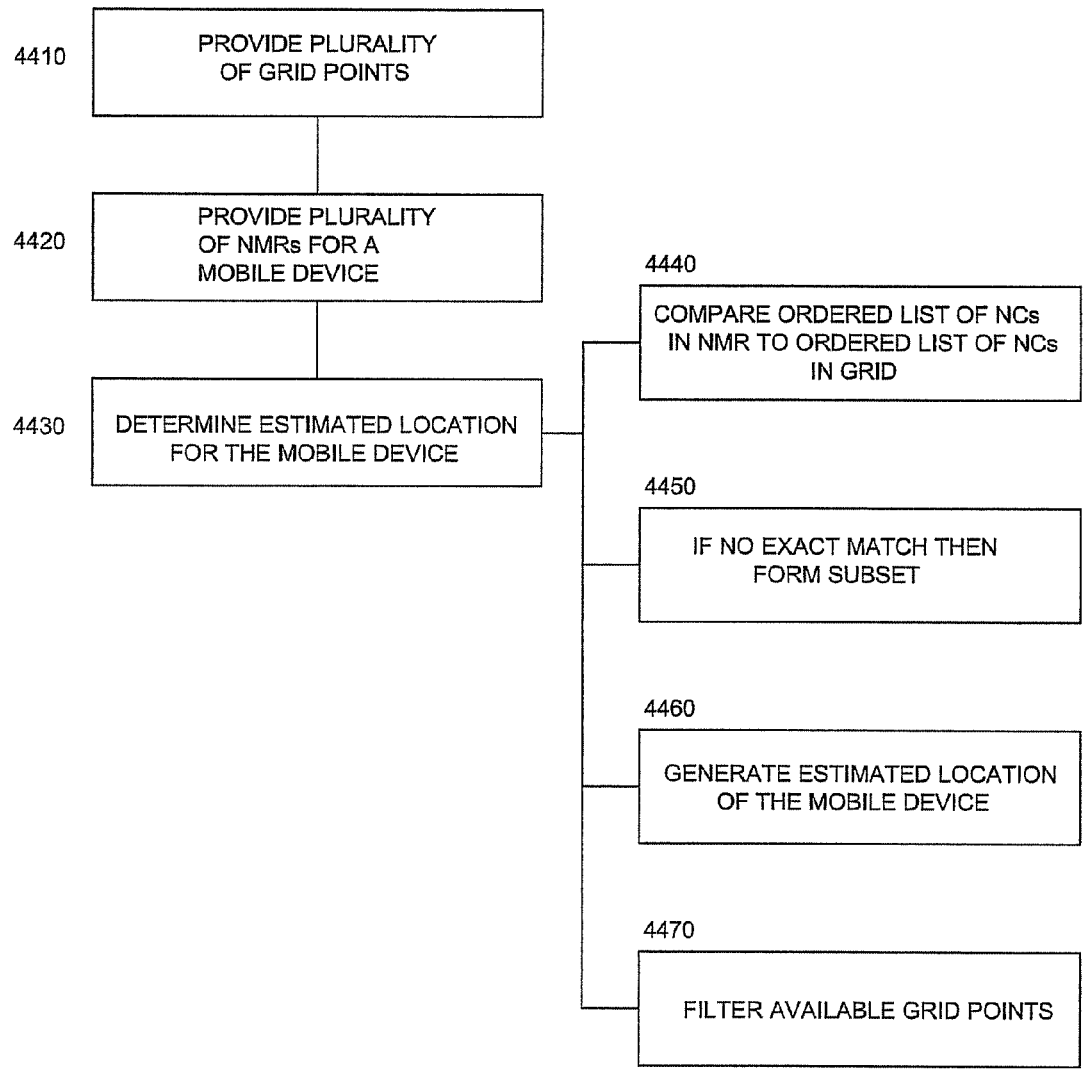

FIG. 44 is a flow chart for a method of locating a mobile device in a geographic region according to an additional embodiment of the present subject matter. With reference to FIG. 44, blocks 4410, 4420 and 4430 are similar to blocks 4210, 4220 and 4230, respectively. At block 4440, the determination of an estimated location for the mobile device may further include comparing an ordered list of cells neighboring a cell serving the mobile device in the one NMR to a similarly ordered list of neighboring cells in the grid. The ordering may be in terms of any one of a number of parameters characterizing a respective NMR, e.g., NC power level. At block 4450, if no exact match exists between the ordered list of neighboring cells of the one NMR and any grid point on the grid, then a largest subset of the ordered list of neighboring cells in the grid points may be formed that matches the NMR. At block 4460, an estimated location may be generated for the mobile device which may comprise a centroid of a cluster of thus matched grid points, clustered by location, in the grid, a highest joint probability matching grid point in the grid, a weighted sum of the locations of a set of matching grid points in the grid (exemplary weights may be defined by any number of means such as, but not limited to, a joint probability derived from individual pdfs, etc.), a weighted sum of clustered locations of a set of matching grid points in the grid (i.e., cluster the locations of the matching grid points and then apply a cumulative probability for all contained grid points in a cluster as a weight for the respective cluster), as a function of locations determined from subsets of the plurality of NMRs, or any combination thereof. At block 4470, a further embodiment may also filter available grid points as a function of any one or combination of selected characteristics, such as, but not limited to, a matching of serving cell or sector for grid points (provided such a characterization is available for those grid points) in the grid to the serving cell or sector of the one NMR, a TA parameter from the one NMR, a RTT parameter from the one NMR, a mobile device orientation parameter, a serving cell identifier, a serving control channel, a magnitude of a serving cell forward link control channel received signal level, a predetermined number of cell received signal levels common to the one NMR, or any combination thereof.

Figure 45:
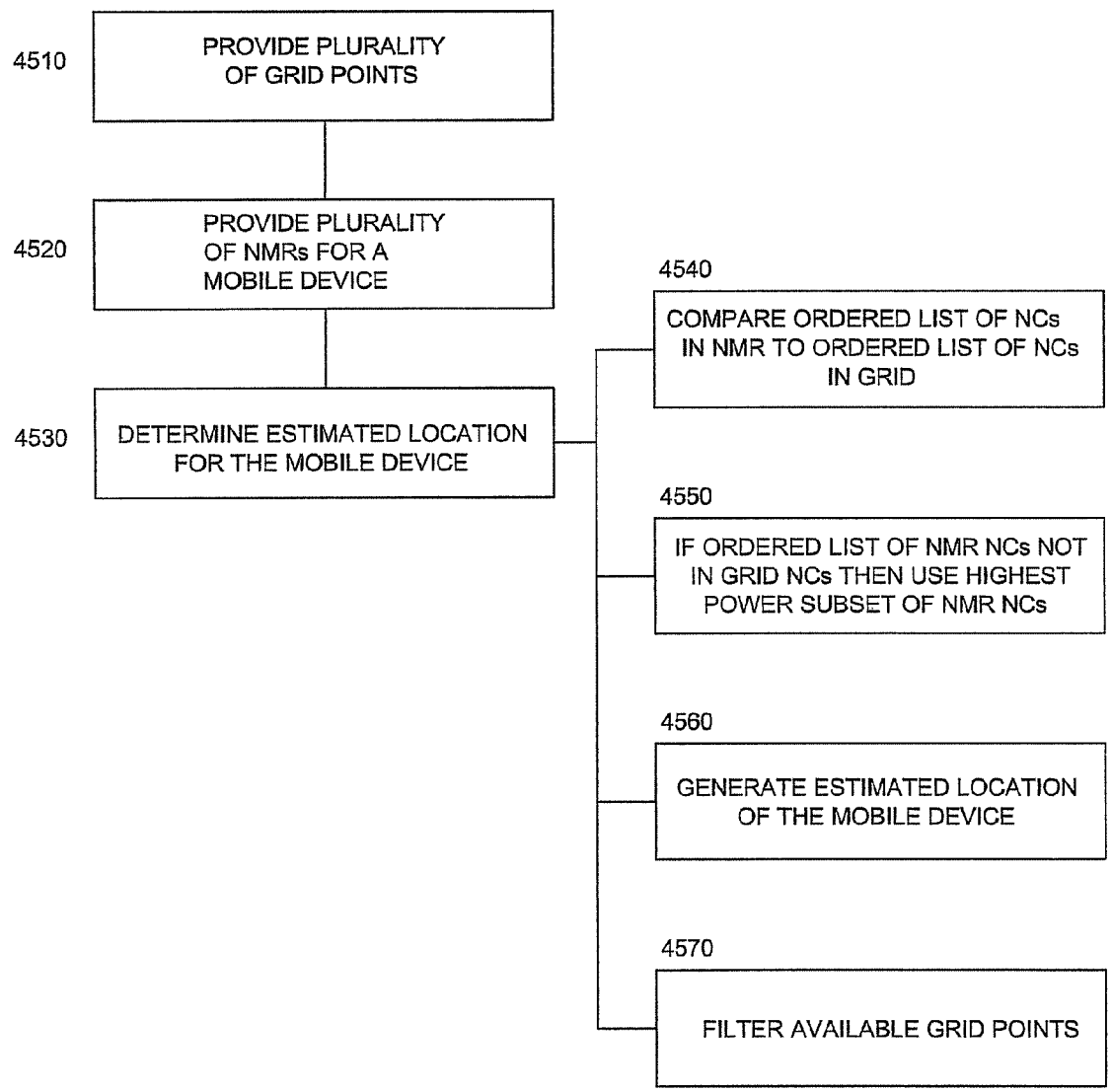

FIG. 45 is a flow chart for a method of locating a mobile device in a geographic region according to a further embodiment of the present subject matter. With reference to FIG. 45, blocks 4510, 4520 and 4530 are similar to blocks 4210, 4220 and 4230, respectively. At block 4540, the determination of an estimated location for the mobile device may further include comparing an ordered list of cells neighboring a cell serving the mobile device in the one NMR to an ordered list of neighboring cells in the grid. The ordering may be in terms of any one of a number of parameters characterizing a respective NMR, e.g., NC power level. At block 4550, if the ordered list of neighboring cells of the one NMR is not contained in the ordered list of neighboring cells for the grid, then a largest ordered subset of neighboring cells in the one NMR may be utilized having either an exact match or is contained in the ordered list of neighboring cells in the grid. At block 4560, an estimated location of the mobile device may be generated that may comprise a centroid of a cluster, clustered by location, of thus matched grid points in the grid, a highest joint probability matching grid point in the grid, a weighted sum of the locations of a set of matching grid points in the grid (exemplary weights may be defined by any number of means such as, but not limited to, a joint probability derived from individual pdfs, etc.), a weighted sum of clustered locations of a set of matching grid points in the grid (i.e., cluster the locations of the matching grid points and then apply a cumulative probability for all contained grid points in a cluster as a weight for the respective cluster), and as a function of locations determined from subsets of the plurality of NMRs. At block 4570, a further embodiment may also filter available grid points as a function of any one or combination of selected characteristics, such as, but not limited to, a matching of serving cell or sector for grid points (provided such a characterization is available for those grid points) in the grid to the serving cell or sector of the one NMR, a TA parameter from the one NMR, a RTT parameter from the one NMR, a mobile device orientation parameter, a serving cell identifier, a serving control channel, a magnitude of a serving cell forward link control channel received signal level, a predetermined number of cell received signal levels common to the one NMR, or any combination thereof.

Figure 46:
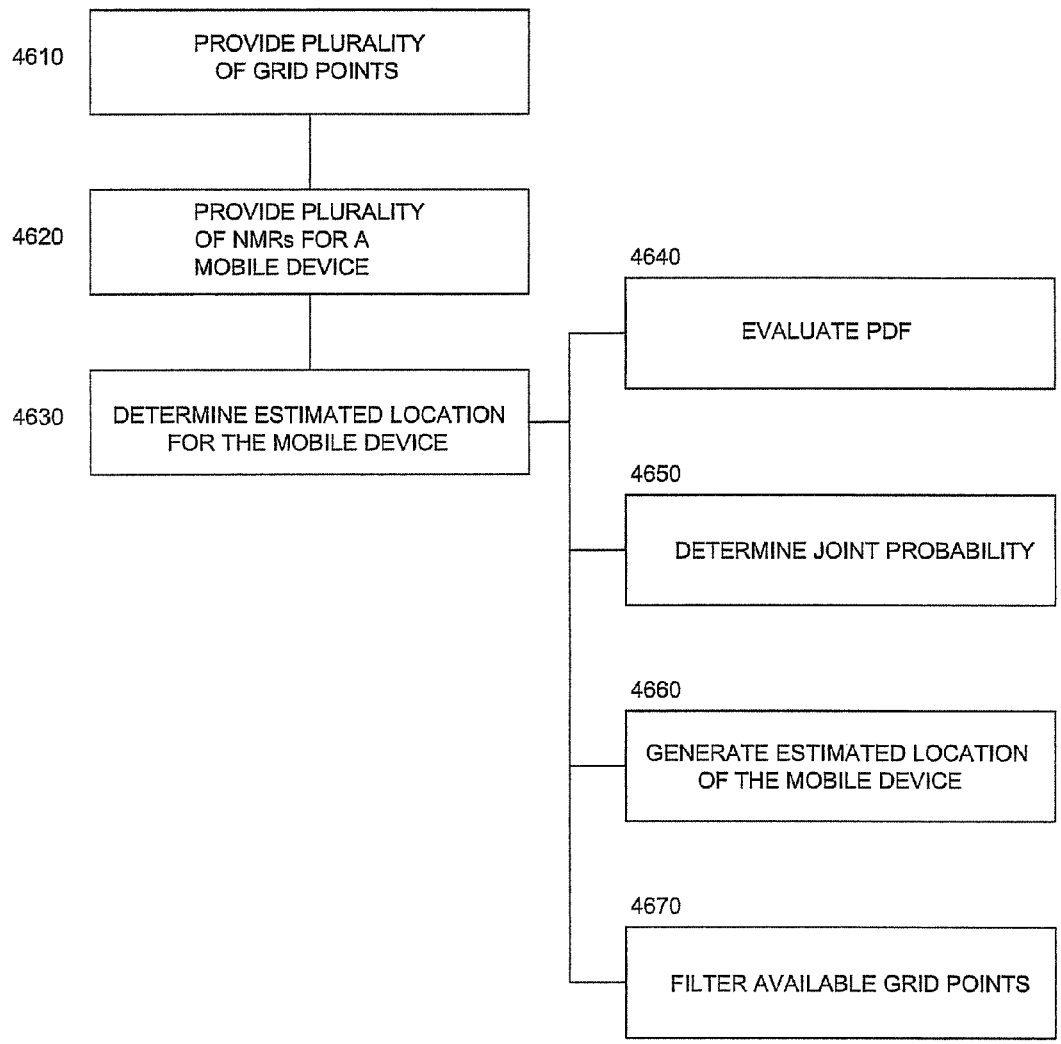

FIG. 46 is a flow chart for a method of locating a mobile device in a geographic region according to yet another embodiment of the present subject matter. With reference to FIG. 46, blocks 4610, 4620 and 4630 are similar to blocks 4210, 4220 and 4230, respectively. At block 4640, the determination of an estimated location for the mobile device may further include evaluating a probability density function for each power level of a cell neighboring a cell serving the mobile device in the one NMR over each grid point of a set of available grid points in the grid. At block 4650, a joint probability may then be determined as a function of the individual probability density functions, and at block 4660, an estimated location of the mobile device may be generated that may comprise a centroid of a cluster of highest probability grid points, clustered by location, in the grid, a highest joint probability matching grid point in the grid, a weighted sum of the locations of a set of matching grid points in the grid (exemplary weights may be defined by any number of means such as, but not limited to, a joint probability derived from individual pdfs, etc.), a weighted sum of clustered locations of a set of matching grid points in the grid (i.e., cluster the locations of the matching grid points and then apply a cumulative probability for all contained grid points in a cluster as a weight for the respective cluster), and as a function of locations determined from subsets of the plurality of NMRs. At block 4670, a further embodiment may also filter available grid points as a function of any one or combination of selected characteristics, such as, but not limited to, a matching of serving cell or sector for grid points (provided such a characterization is available for the respective grid points) in the grid to the serving cell or sector of the one NMR, a TA parameter from the one NMR, a RTT parameter from the one NMR, a mobile device orientation parameter, a serving cell identifier, a serving control channel, a magnitude of a serving cell forward link control channel received signal level, a predetermined number of cell received signal levels common to the one NMR, or any combination thereof.

Figure 47:
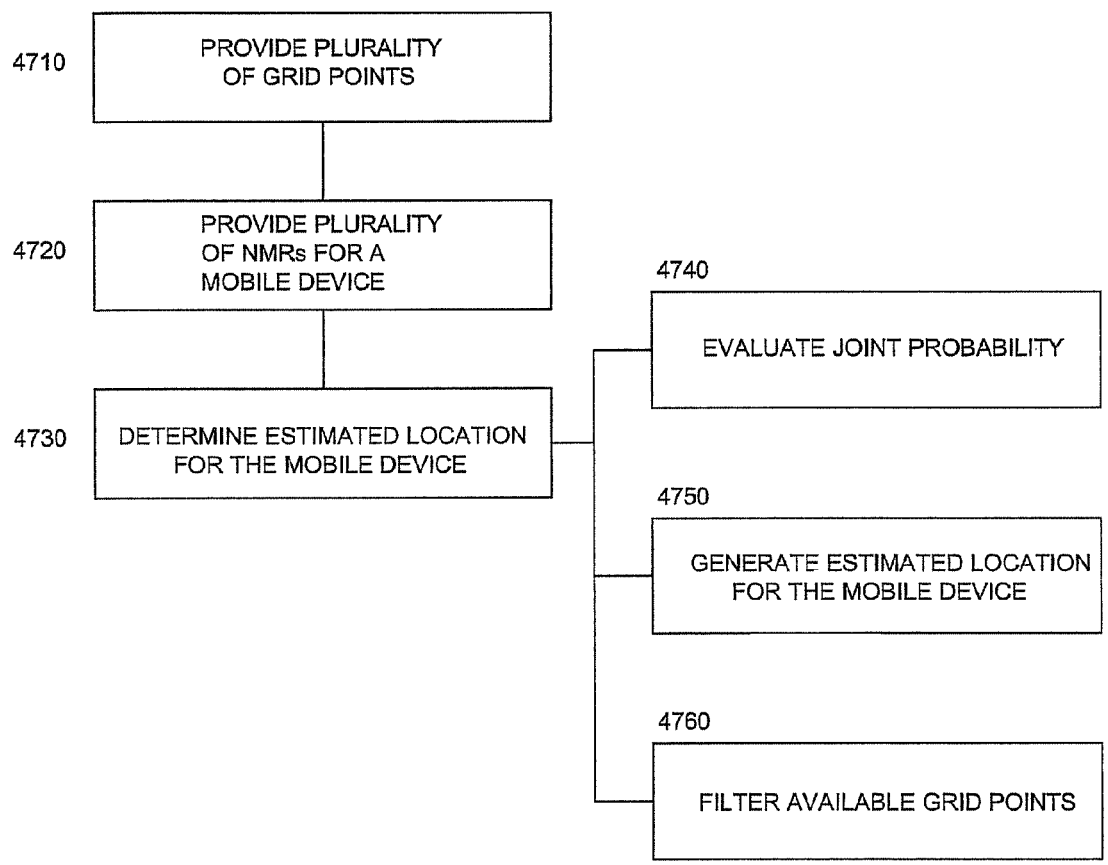

FIG. 47 is a flow chart for a method of locating a mobile device in a geographic region according to yet another embodiment of the present subject matter. With reference to FIG. 47, blocks 4710, 4720 and 4730 are similar to blocks 4210, 4220 and 4230, respectively. At block 4740, the determination of an estimated location for the mobile device may further include directly evaluating a joint probability (i.e., as an aggregate rather than through computation of the product of marginal pdfs) of power levels for at least one cell neighboring a cell serving the mobile device in the one NMR over a set of available grid points in the grid. At block 4750, an estimated location of the mobile device may be generated that may comprise a highest joint probability matching grid point in the grid, a weighted sum of the locations of a set of matching grid points in the grid (exemplary weights may be defined by any number of means such as, but not limited to, a joint probability derived from individual pdfs, etc.), a weighted sum of clustered locations of a set of matching grid points in the grid (i.e., cluster the locations of the matching grid points and then apply a cumulative probability for all contained grid points in a cluster as a weight for the respective cluster), and as a function of locations determined from subsets of the plurality of NMRs. At block 4760, a further embodiment may also filter available grid points as a function of any one or combination of selected characteristics, such as, but not limited to, a matching of serving cell or sector for grid points (provided such a characterization is available for the respective grid points) in the grid to the serving cell or sector of the one NMR, a TA parameter from the one NMR, a RTT parameter from the one NMR, a mobile device orientation parameter, a serving cell identifier, a serving control channel, a magnitude of a serving cell forward link control channel received signal level, a predetermined number of cell received signal levels common to the one NMR, or any combination thereof.

Figure 48:
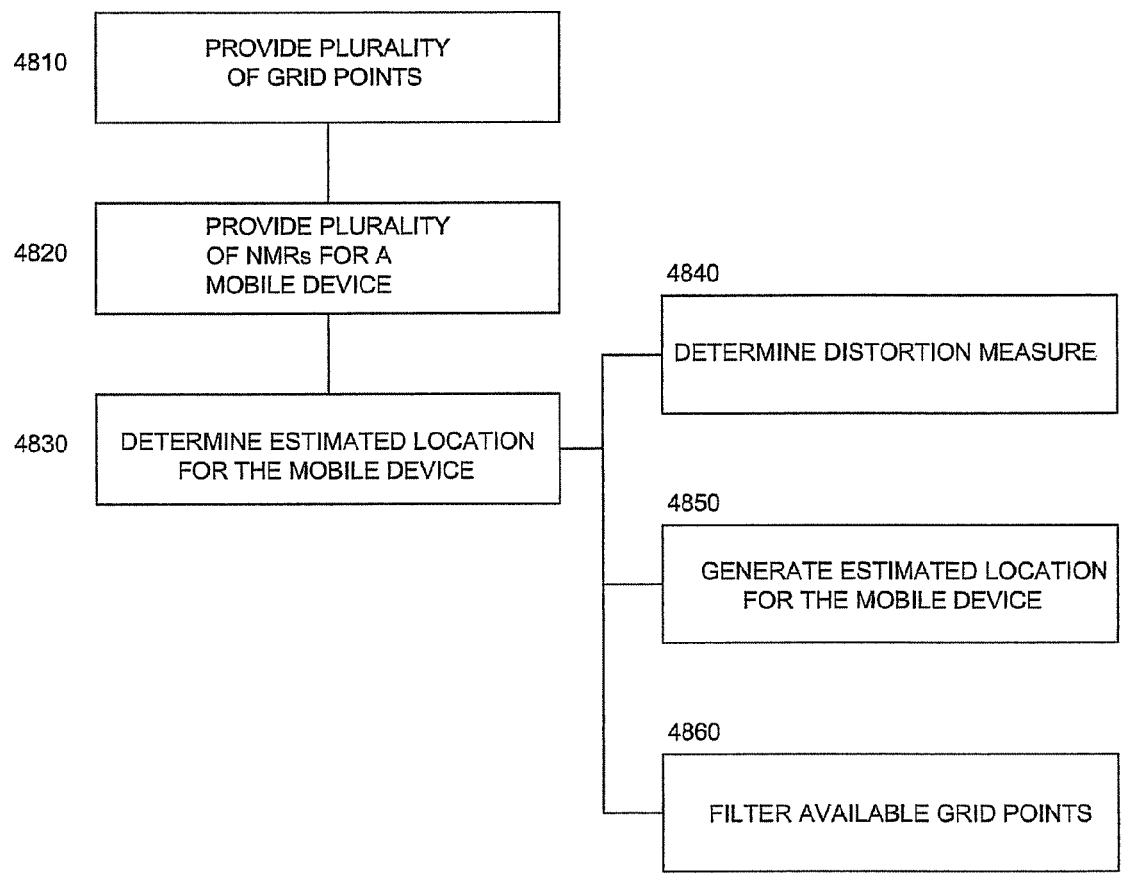

FIG. 48 is a flow chart for a method of locating a mobile device in a geographic region according to yet another embodiment of the present subject matter. With reference to FIG. 48, blocks 4810, 4820 and 4830 are similar to blocks 4210, 4220 and 4230, respectively. At block 4840, the determination of an estimated location for the mobile device may further include determining a distortion measure between a characteristic function or parameter of a grid point and a corresponding function or parameter obtained for the one NMR. At block 4850, an estimated location of the mobile device may be generated that may comprise a location of a grid point having the smallest distortion measure, a weighted sum of the locations of a set of matching grid points in the grid (where the weighting applied to each of the matching grid points may be a function of the distortion measure), a weighted sum of clustered locations of a set of matching grid points in the grid, as a function of locations determined from subsets of the plurality of NMRs, or any combination thereof. At block 4860, a further embodiment may also filter available grid points as a function of any one or combination of selected characteristics, such as, but not limited to, a matching of serving cell or sector for grid points (provided such a characterization is available for the respective grid points) in the grid to the serving cell or sector of the one NMR, a TA parameter from the one NMR, a RTT parameter from the one NMR, a mobile device orientation parameter, a serving cell identifier, a serving control channel, a magnitude of a serving cell forward link control channel received signal level, a predetermined number of cell received signal levels common to the one NMR, or any combination thereof. In an additional embodiment, the distortion measure may be, but is not limited to, a Mahalanobis distance.

Figure 49:
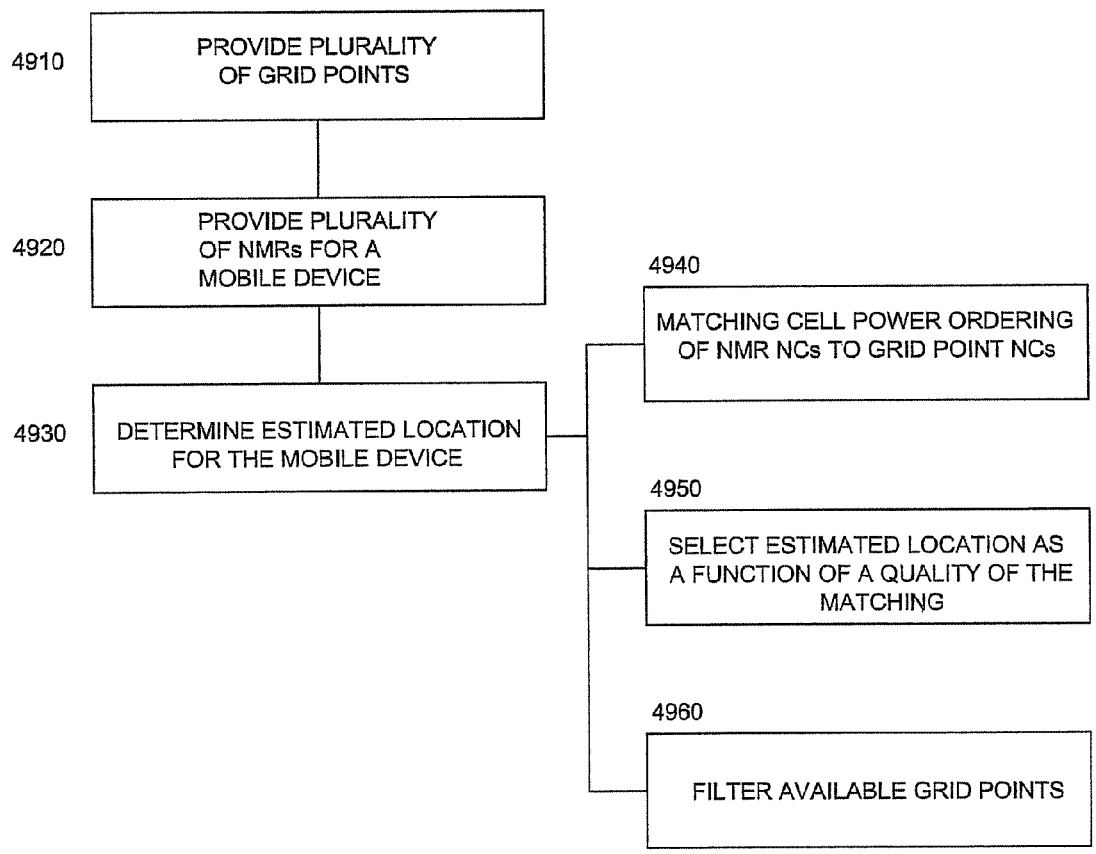

FIG. 49 is a flow chart for a method of locating a mobile device in a geographic region according to yet another embodiment of the present subject matter. With reference to FIG. 49, blocks 4910, 4920 and 4930 are similar to blocks 4210, 4220 and 4230, respectively. At block 4940, the determination of an estimated location for the mobile device may further include matching cell power ordering of cells neighboring a cell serving the mobile device in the one NMR to neighboring cell power ordering in each of the grid points in the grid. At block 4950, an estimated location may then be selected as a function of a quality of the matching. The quality may be a function of a relative shift in the ordering sequence occurring between the one NMR and grid point cell power ordering. It is also envisioned that this same concept may be applied to any other vector parameter characterizing NMRs and/or grid points and such an example should not limit the scope of the claims appended herewith. At block 4960, a further embodiment may also filter available grid points as a function of any one or combination of selected characteristics, such as, but not limited to, a matching of serving cell or sector for grid points (provided such a characterization is available for the respective grid points) in the grid to the serving cell or sector of the one NMR, a TA parameter from the one NMR, a RTT parameter from the one NMR, a mobile device orientation parameter, a serving cell identifier, a serving control channel, a magnitude of a serving cell forward link control channel received signal level, a predetermined number of cell received signal levels common to the one NMR, or any combination thereof.

Figure 50:
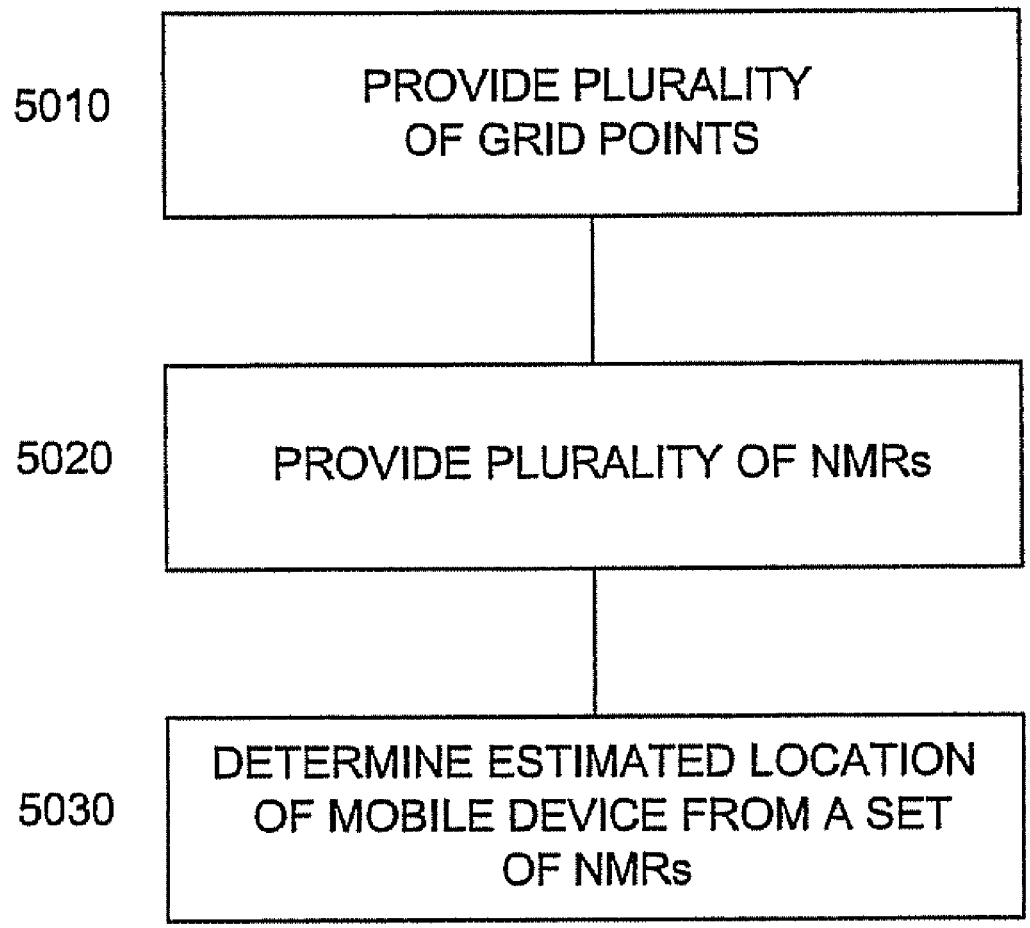

FIG. 50 is a flow chart for another method of locating a mobile device in a geographic region according to an embodiment of the present subject matter. With reference to FIG. 50, at block 5010, a plurality of grid points may be provided in a geographic region where each of the grid points may include at least one characterizing parameter and each of the grid points may be located on a grid defined over the geographic region. At block 5020, a plurality of NMRs may be provided for a mobile device in the geographic region, and at block 5030, an estimated location may be determined for the mobile device from a set of said plurality of network measurement reports as a function of the parameter. Of course, one or more of the grid points may be randomly located within the geographic region, and one or more of the grid points may be located on a predetermined fixed uniform grid defined over the geographic region.

Figure 51:
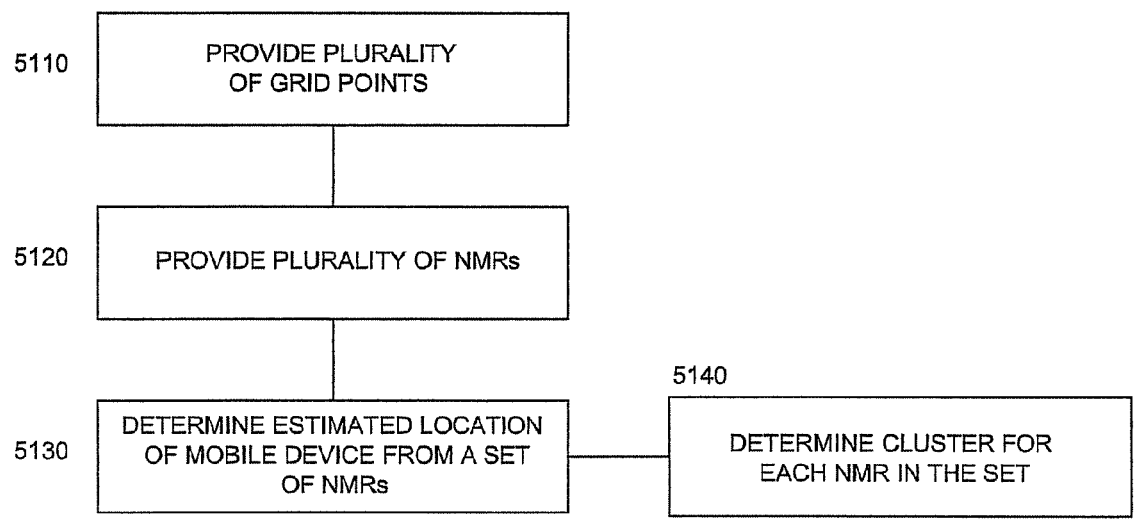

FIG. 51 is a flow chart for another method of locating a mobile device in a geographic region according to an embodiment of the present subject matter. With reference to FIG. 51, blocks 5110, 5120 and 5130 are similar to blocks 5010, 5020 and 5030, respectively. At block 5140, the determination of an estimated location for the mobile device may also include determining a cluster for each NMR characteristic or parameter, clustered by location, in the set of NMRs. The clustering may further be weighted by an exemplary metric that may be, but is not limited to, a Mahalanobis distance, joint probability, probability density function, and any combination thereof.

Figure 52:
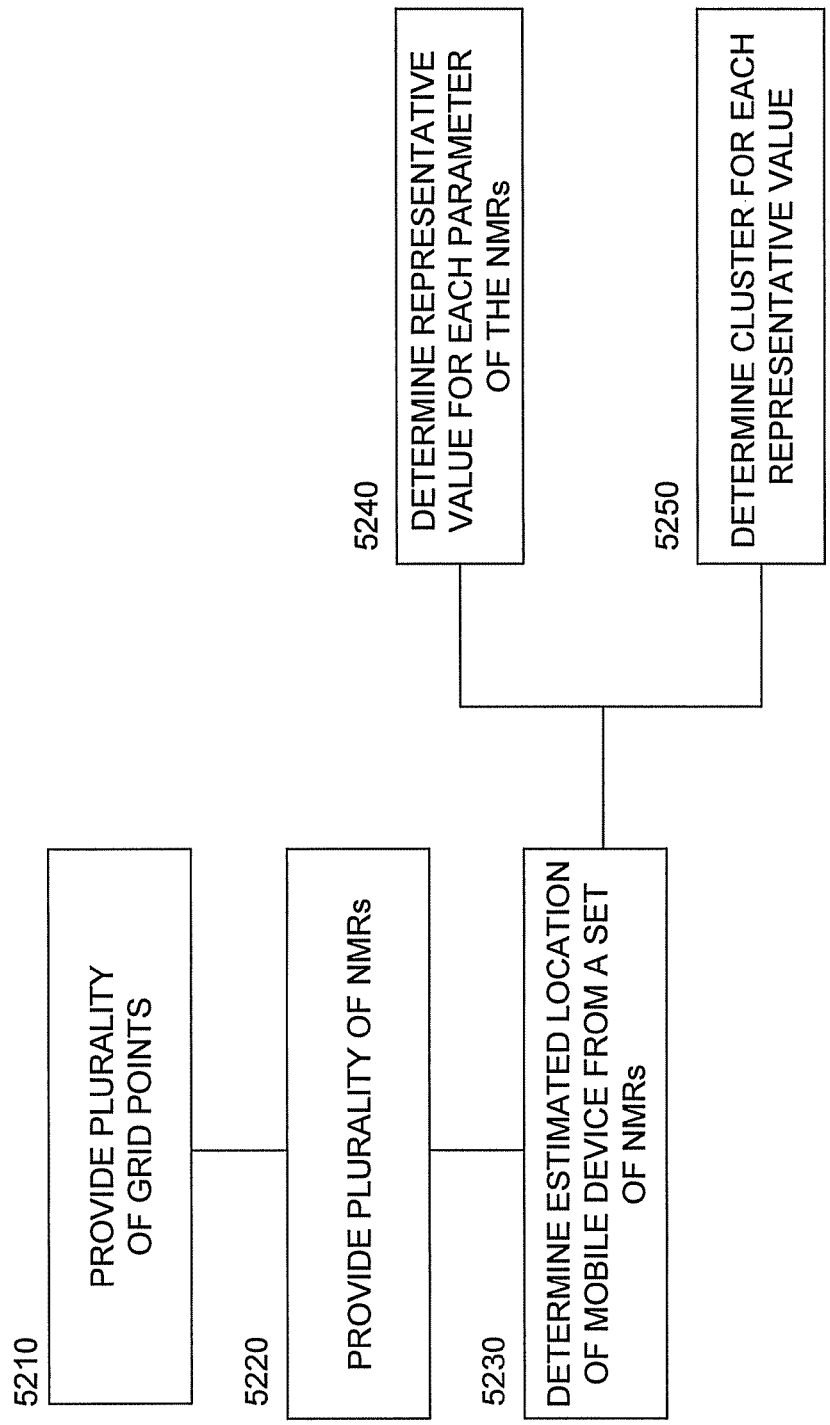

FIG. 52 is a flow chart for another method of locating a mobile device in a geographic region according to an additional embodiment of the present subject matter. With reference to FIG. 52, blocks 5210, 5220 and 5230 are similar to blocks 5010, 5020 and 5030, respectively. At block 5240, the determination of an estimated location for the mobile device may include determining a representative value for each parameter occurring in the set of NMRs. At block 5250, a cluster for each representative value may also be weighted by an exemplary metric (e.g., a Mahalanobis distance, joint probability, probability density function, etc.) to weight the cluster. An exemplary representative value may be, but is not limited to, serving cell power level, neighboring cell power level, timing advance, round trip time, or any combination thereof. Further, the representative value may be determined as a function of a mean or median of a set of parameter values obtained over the set of NMRs.

Figure 53:
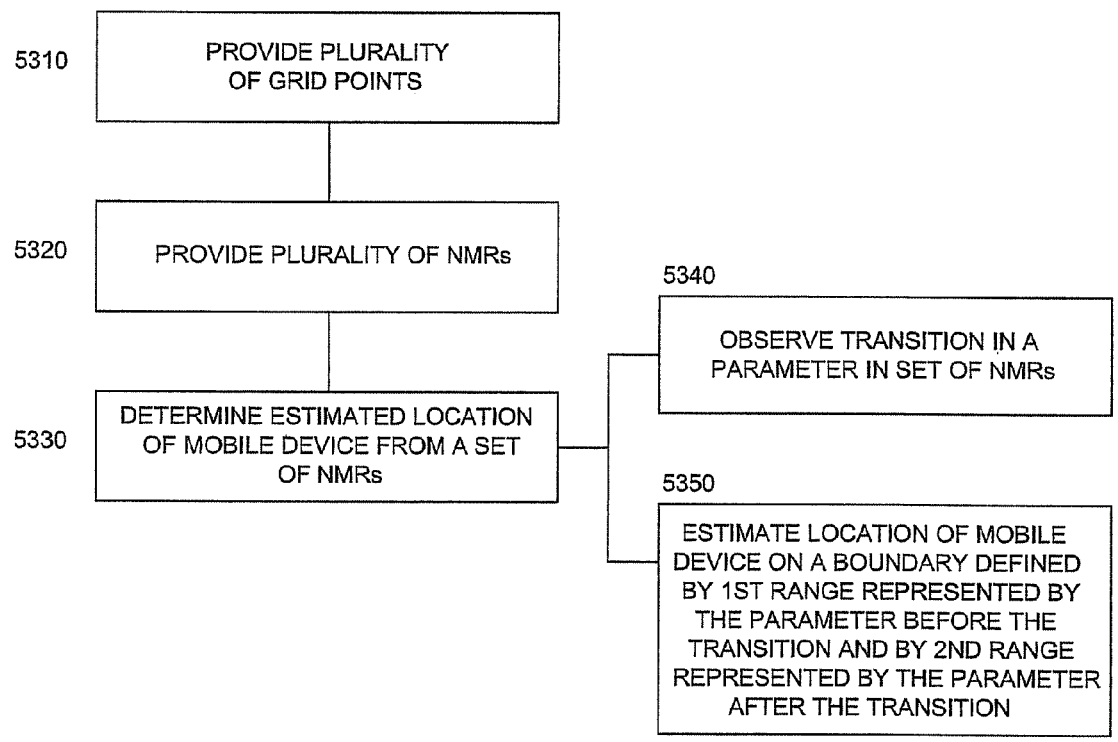

FIG. 53 is a flow chart for another method of locating a mobile device in a geographic region according to a further embodiment of the present subject matter. With reference to FIG. 53, blocks 5310, 5320 and 5330 are similar to blocks 5010, 5020 and 5030, respectively. At block 5340, the determination of an estimated location for the mobile device may also include observing a transition in a parameter occurring in one or more of the NMRs within an applicable set of NMRs. At block 5350, a location of the mobile device may be estimated on a boundary defined by a first range represented by the parameter before the transition and by a second range represented by the parameter after the transition. An exemplary parameter may be, but is not limited to, signal power level, signal quality, rate of dropping in/out of a neighboring cell signal, pattern of dropping in/out of a neighboring cell signal, changes in serving cell, changes in serving sector, RTT, TA, and any combinations thereof.

Figure 54:
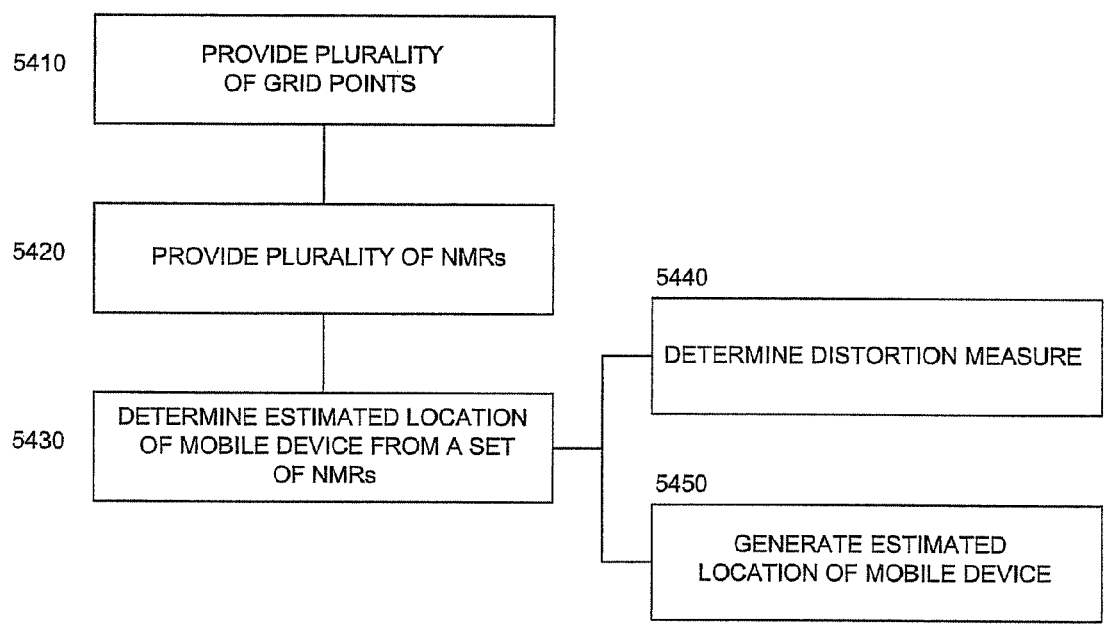

FIG. 54 is a flow chart for another method of locating a mobile device in a geographic region according to an additional embodiment of the present subject matter. With reference to FIG. 54, blocks 5410, 5420 and 5430 are similar to blocks 5010, 5020 and 5030, respectively. At block 5440, the determination of an estimated location for the mobile device may also determine a distortion measure between a parameter or function of ones of the grid points and a corresponding parameter or function in each NMR in the set. At block 5450, an estimated location of the mobile device may be generated where the estimated location may be, but is not limited to, a location of the grid point having the smallest distortion measure, a weighted sum of the locations of a set of matching grid points in the grid (where the weighting applied to each grid point may be a function of the distortion measure), a weighted sum of clustered locations of a set of matching grid points in the grid (i.e., cluster the locations of the matching grid points and then apply a cumulative probability for all contained grid points in a cluster as a weight for the respective cluster), as a function of estimated locations determined from subsets of the set of NMRs by the preceding methods, and any combination thereof. An exemplary distortion measure may be, but is not limited to, a Mahalanobis distance.

Figure 55:
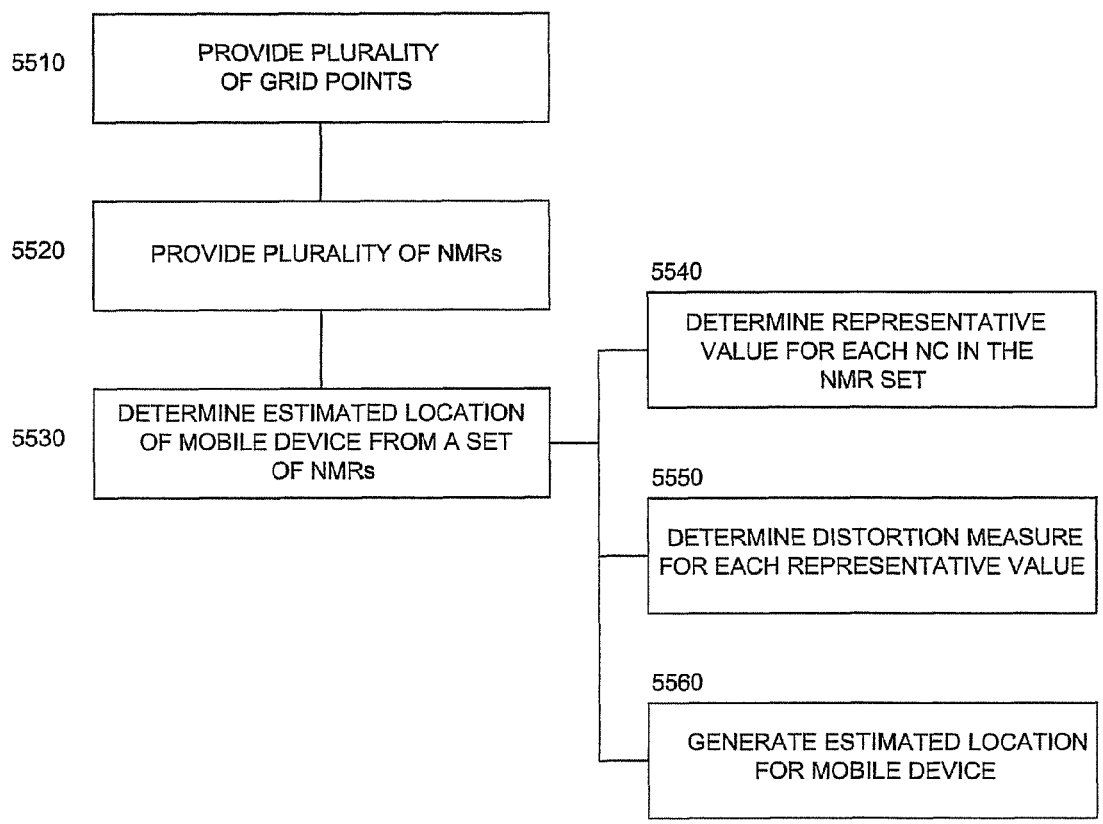

FIG. 55 is a flow chart for another method of locating a mobile device in a geographic region according to yet another embodiment of the present subject matter. With reference to FIG. 55, blocks 5510, 5520 and 5530 are similar to blocks 5010, 5020 and 5030, respectively. At block 5540, the determination of an estimated location for the mobile device may determine a representative value for each cell neighboring a serving cell serving the mobile device in the set of NMRs. More generally, for each parameter type held in common by an non-empty subset of the NMRs, a representative value may be generated. At block 5550, a distortion measure for each representative value may be determined as a function of a comparison between a parameter of ones of the grid points and a corresponding parameter for each representative value. At block 5560, an estimated location of the mobile device may be generated where the estimated location may comprise a location of the grid point having the smallest overall distortion measure (computed over all parameters of the set of NMRs), a weighted sum of the locations of a set of matching grid points in the grid (where the weighting may be a function of the distortion measure), a weighted sum of clustered locations of a set of matching grid points in the grid, as a function of estimated locations determined from subsets of the set of NMRs by the preceding methods, or any combination thereof.

Figure 56:
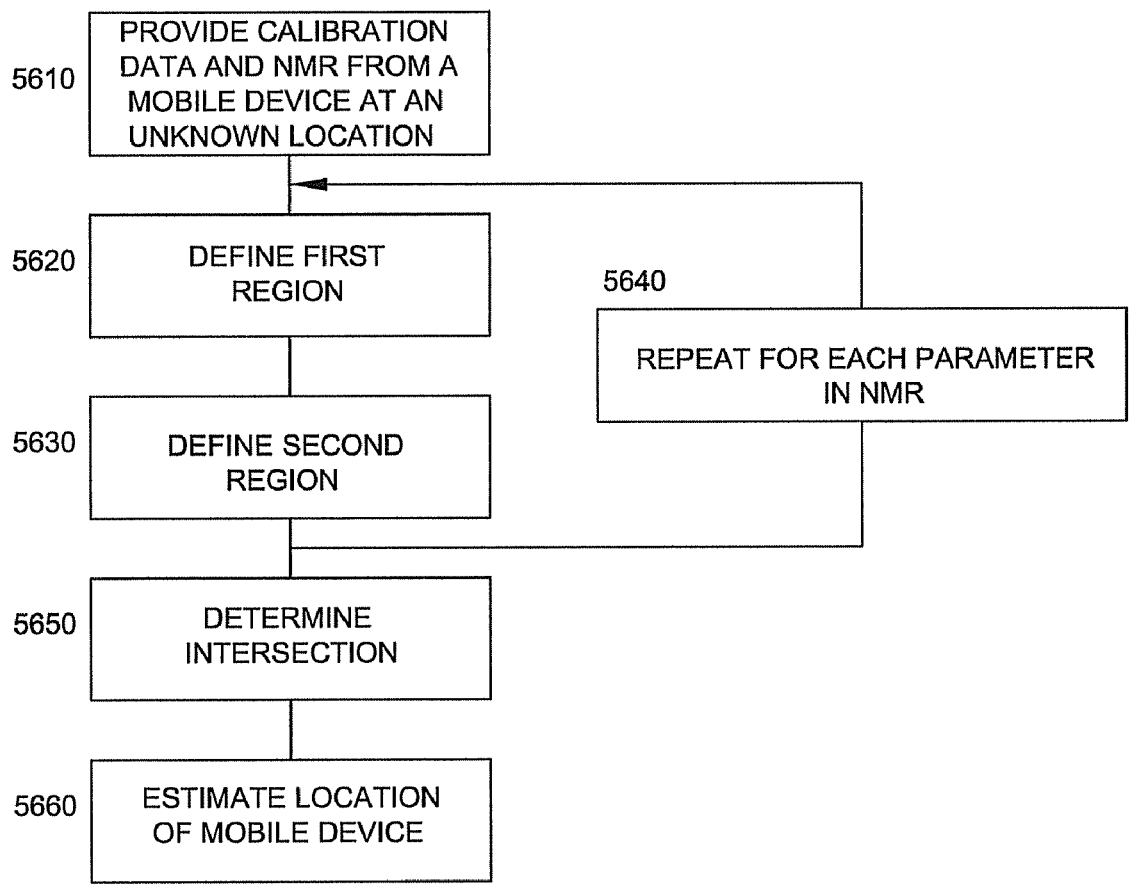

FIG. 56 is a flow chart for a method of estimating the location of a mobile device in a geographic region according to an embodiment of the present subject matter. With reference to FIG. 56, at block 5610, calibration data may be provided for each of one or more calibration points in a geographic region where the calibration data may include a collection of NMRs having associated known locations. Of course, each of the NMRs provide at least one characterizing parameter. The calibration data may take the form of a collection of NMRs having associated locations as discussed above. Exemplary NMRs in the calibration data may be defined as an (n×1) vector with n parameters. Exemplary parameters may be, but are not limited to, observed power levels for adjacent neighbor cell control channels, TAs, RTTs, etc., each of which are a set of observed or collected information obtained at a particular location. A particular value of n, i.e., the size of each NMR vector, may be variable (e.g., n may range from at least one to fifteen or higher within a respective calibration data set). At block 5610, a candidate NMR may also be received from a mobile device at an unknown location. Thus, the geographical location from which the candidate NMR was generated should be estimated. At block 5620, a first region may be defined within the calibration data as a function of a first characterizing parameter of the candidate NMR and a predetermined range of the first parameter. At block 5630, a second region may be defined within the calibration data as a function of a second characterizing parameter of the candidate NMR and a predetermined range of the second parameter.

By way of a non-limiting example, if the candidate NMR is a (4×1) vector including components that represent the power levels observed for some cells A, B and H and a fourth component that represents a TA value with respect to cell D, the candidate NMR vector may be provided by the following relationship:

$$\text{NMR\_c} = \begin{bmatrix} Pa \\ Pb \\ Ph \\ TAd \end{bmatrix} \quad (12)$$

With reference to Equation 12, if the first characterizing parameter of the candidate NMR considered is the power level observed for cell A, then the calibration data may be examined for each NMR (or data vector) having a power level observed for cell A that may be within a predetermined range about the value Pa. A set of such exemplary NMRs (or data vectors) within the calibration data satisfying this condition defines a region R1 in a two dimensional location space where a location is desired. As each such piece of calibration data (e.g., each NMR in the calibration data) that fits (i.e., fits the range constraint upon the first parameter) has an associated location, it follows that a collection of such pieces or data vectors of calibration data may define a region. Further, assuming the second characterizing parameter considered is the power level observed for cell H, the same technique may also be applied to generate a second region R2. These regions may then represent areas in a location space that are potential or candidate solution regions for the location of the unknown (e.g., candidate) NMR. The intersection of these two (or more) regions defines a region satisfying the two characterizing parameters considered within a respective range for each. Of course, a multitude of parameters may be considered and a multitude of regions defined, thus, the simplistic example provided above should not limit the scope of the claims appended herewith.

The steps represented by blocks 5620 and 5630 may be repeated for each characterizing parameter in the candidate NMR and calibration data at block 5640. An intersection of the defined regions may be determined at block 5650 and at block 5660, the location of a mobile device in the geographic region may be estimated as a function of the intersection. It may be noted that any such intersection region may be equivalent to the geographic locations of the set of corresponding calibration points whose parameters, when suitably expanded in range define this intersection region. Alternatively, the intersection region can be equivalently treated as a subset of the original calibration points obtained by expanding the parameter ranges of the candidate NMR. Any one or plural calibration points may be located on a predetermined fixed uniform grid defined over the geographic region or randomly located within said geographic region. The calibration data may also comprise information from at least one NMR, may be obtained from one or more mobile devices located in close proximity to the one calibration point, and/or may be obtained from a signal transmitted from a mobile device in close proximity to the one calibration point and received at a receiver in or in proximity to the geographic region. In one embodiment of the present subject matter for each of select ones of the calibration points, the calibration data may include plural data vectors and the evaluating of the calibration data may comprise a determination of clustering of the plural data vectors.

Figure 57:
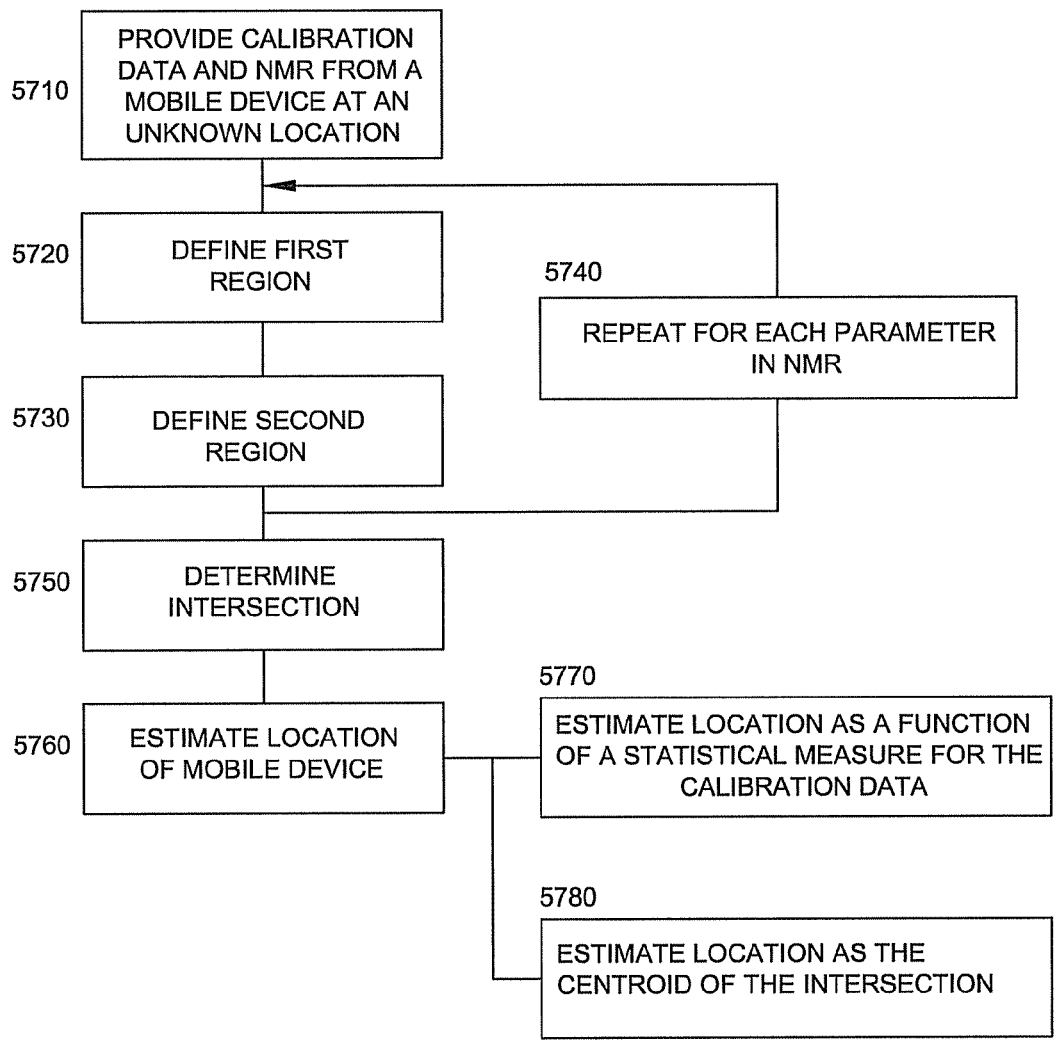

FIG. 57 is a flow chart for another method of estimating the location of a mobile device in a geographic region according to an embodiment of the present subject matter. With reference to FIG. 57, blocks 5710, 5720, 5730, 5740, 5750 and 5760 are similar to blocks 5610, 5620, 5630, 5640, 5650 and 5660, respectively. At block 5770, the estimation of the location of a mobile device may further comprise estimating the location of a mobile device as a function of a statistical measure for calibration data of select ones of the calibration points (these calibration points may correspond to the final intersection). An exemplary statistical measure may be, but is not limited to, a probability density function. At block 5780, in one embodiment of the present subject matter the estimated location of a mobile device may be the centroid of the intersection.

Figure 58:
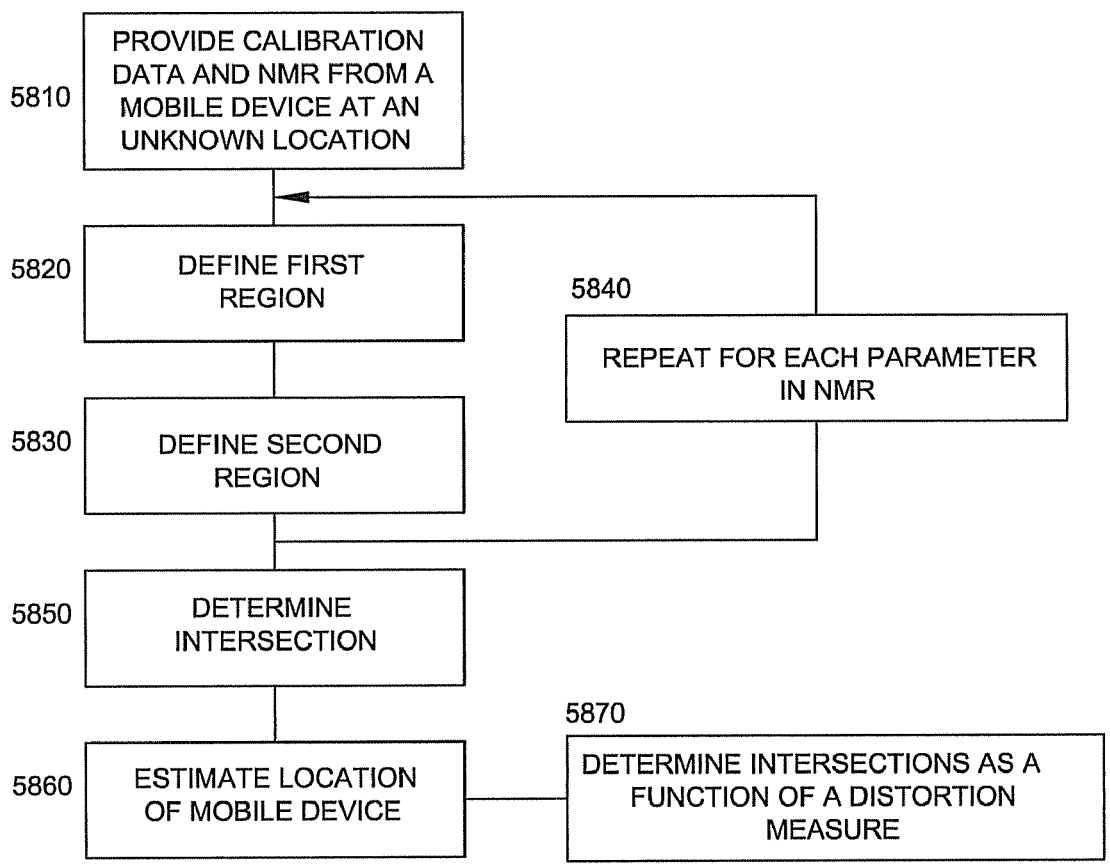

FIG. 58 is a flow chart for a method of estimating the location of a mobile device in a geographic region according to one embodiment of the present subject matter. With reference to FIG. 58, blocks 5810, 5820, 5830, 5840, 5850 and 5860 are similar to blocks 5610, 5620, 5630, 5640, 5650 and 5660, respectively. At block 5870, in one embodiment, the intersection may be determined as a function of a distortion measure.

Figure 59:
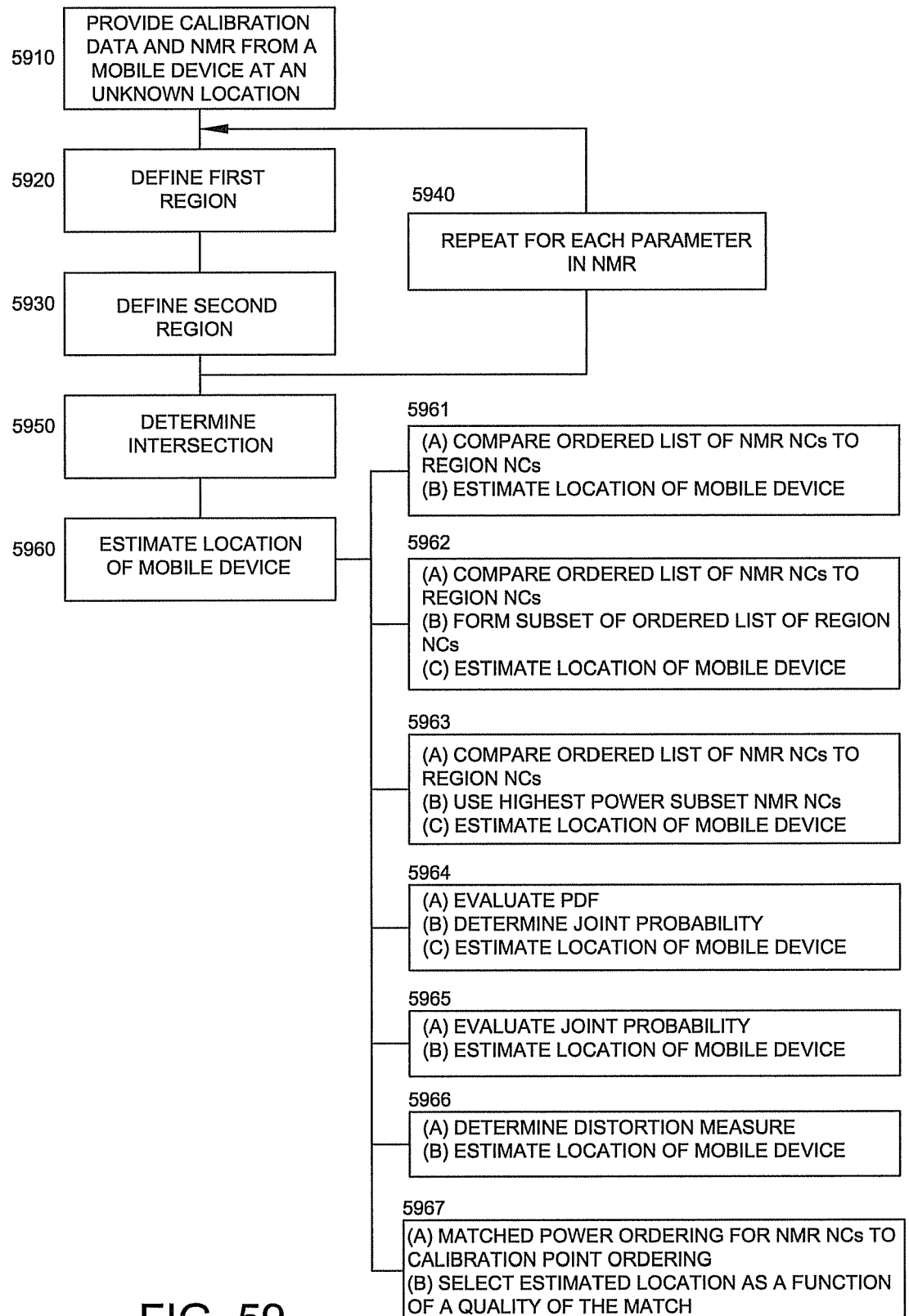

FIG. 59 is a flow chart for a method of estimating the location of a mobile device in a geographic region according to a further embodiment of the present subject matter. With reference to FIG. 59, blocks 5910, 5920, 5930, 5940, 5950 and 5960 are similar to blocks 5610, 5620, 5630, 5640, 5650 and 5660, respectively. At block 5961, in one embodiment of the present subject matter the estimation of the location of a mobile device may comprise (a) comparing an ordered list of cells neighboring a cell serving the mobile device in the at least one NMR to an ordered list of neighboring cells in the intersection region or intersection (the ordering may be in terms of any one of a number of parameters characterizing a respective NMR, e.g., NC power level or NC measurement quality), and (b) generating an estimated location of the mobile device. The estimated location may be, but is not limited to, a centroid of a cluster of best matching calibration points in the intersection region, a highest joint probability matching calibration point in the intersection region, a weighted sum of the locations of a set of matching calibration points in the intersection region (exemplary weights may be defined by any number of means such as, but not limited to, a joint probability derived from individual pdfs, etc.), a weighted sum of clustered locations of a set of matching calibration points in the intersection region (i.e., cluster the locations of the matching grid points and then apply a cumulative probability for all contained grid points in a cluster as a weight for the respective cluster), as a function of estimated locations determined from a subset of the at least one NMR, or any combination thereof.

In another embodiment of the present subject matter, at block 5962, the estimation of the location of a mobile device may comprise (a) comparing an ordered list of cells neighboring a cell serving the mobile device in the at least one NMR to a similarly ordered list of neighboring cells in the intersection region (the ordering may be in terms of any one of a number of parameters characterizing a respective NMR, e.g., NC power level), (b) if no exact match exists between the ordered list of neighboring cells of the at least one NMR and any calibration point in the intersection region then a subset of the largest ordered list of neighboring cells may be formed in the intersection region, and (c) generating an estimated location of the mobile device. The estimated location may be, but is not limited to, a centroid of a cluster of matched calibration points in the intersection region, a highest joint probability matching calibration point in the intersection region, a weighted sum of the locations of a set of matching calibration points in the intersection region (exemplary weights may be defined by any number of means such as, but not limited to, a joint probability derived from individual pdfs, etc.), a weighted sum of clustered locations of a set of matching calibration points in the intersection region (i.e., cluster the locations of the matching grid points and then apply a cumulative probability for all contained grid points in a cluster as a weight for the respective cluster), as a function of estimated locations determined from a subset of the at least one NMR, or any combination thereof.

At block 5963, the estimation of the location of a mobile device may comprise in a further embodiment of the present subject matter (a) comparing an ordered list of cells neighboring a cell serving the mobile device in the at least one NMR to an ordered list of neighboring cells in the intersection region (the ordering may be in terms of any one of a number of parameters characterizing a respective NMR, e.g., NC power level), (b) if the ordered list of neighboring cells of the at least one NMR is not contained in the ordered list of neighboring cells for the intersection region, then a largest ordered subset of neighboring cells in the at least one NMR may be utilized having either an exact match or is contained in the ordered list of neighboring cells in the intersection region, and (c) generating an estimated location of the mobile device. The estimated location may be, but is not limited to, a centroid of a cluster of matched calibration points in the intersection region, a highest joint probability matching calibration point in the intersection region, a weighted sum of the locations of a set of matching calibration points in the intersection region (exemplary weights may be defined by any number of means such as, but not limited to, a joint probability derived from individual pdfs, etc.), a weighted sum of clustered locations of a set of matching calibration points in the intersection region (i.e., cluster the locations of the matching grid points and then apply a cumulative probability for all contained grid points in a cluster as a weight for the respective cluster), as a function of estimated locations determined from a subset of the at least one NMR, or any combination thereof.

At block 5964, in another embodiment of the present subject matter the estimation of the location of a mobile device may comprise (a) evaluating a pdf for each parameter of a cell neighboring a cell serving the mobile device in the at least one NMR over each calibration point in a set of available calibration points in the intersection region, (b) determining a joint probability as a function of the pdfs, and (c) generating an estimated location of the mobile device. The estimated location may be, but is not limited to, a centroid of a cluster of highest probability calibration points, clustered by location, in the intersection region, a highest joint probability matching calibration point in the intersection region, a weighted sum of the locations of a set of matching calibration points in the intersection region (exemplary weights may be defined by any number of means such as, but not limited to, a joint probability derived from individual pdfs, etc.), a weighted sum of clustered locations of a set of matching calibration points in the intersection region (i.e., cluster the locations of the matching grid points and then apply a cumulative probability for all contained grid points in a cluster as a weight for the respective cluster), as a function of estimated locations determined from a subset of the at least one NMR, or any combination thereof.

At block 5965, the estimation of the location of a mobile device may comprise in one embodiment of the present subject matter (a) directly evaluating a joint probability (i.e., as an aggregate rather than through computation of the product of marginal pdfs) of power levels for at least one cell neighboring a cell serving the mobile device in the at least one NMR over a set of available calibration points in the intersection region, and (b) generating an estimated location of the mobile device. The estimated location may be, but is not limited to, a highest joint probability matching calibration point in the intersection region, a weighted sum of the locations of a set of matching calibration points in the intersection region (exemplary weights may be defined by any number of means such as, but not limited to, a joint probability derived from individual pdfs, etc.), a weighted sum of clustered locations of a set of matching calibration points in the intersection region (i.e., cluster the locations of the matching grid points and then apply a cumulative probability for all contained grid points in a cluster as a weight for the respective cluster), as a function of estimated locations determined from a subset of the at least one NMR, or any combination thereof.

At block 5966, the estimation of the location of a mobile device may comprise in an additional embodiment of the present subject matter (a) determining a distortion measure between a characteristic function or parameter of a calibration point and a corresponding function or parameter in the at least one NMR and (b) generating an estimated location of the mobile device. The estimated location may be, but is not limited to, a location of a calibration point having the smallest distortion measure, a weighted sum of the locations of a set of matching calibration points in the intersection region (where the weighting applied to each of the matching calibration points may be a function of the distortion measure), a weighted sum of clustered locations of a set of matching calibration points in the intersection region, as a function of locations determined from a subset of the at least one NMR, or any combination thereof. Exemplary distortion measures are described above and may be, but are not limited to, a Mahalanobis distance, etc.

In one embodiment of the present subject matter, at block 5967 the estimation of the location of a mobile device may comprise (a) matching cell power ordering of cells neighboring a cell serving the mobile device in the at least one NMR to neighboring cell power ordering of calibration points in each of the calibration points in the intersection region and (b) selecting an estimated location as a function of a quality of the matching. The quality may be a function of a relative shift in the ordering sequence occurring between the at least one NMR and calibration point cell power ordering. It is also envisioned that this same concept may be applied to any other vector parameter characterizing NMRs and/or grid points and such an example should not limit the scope of the claims appended herewith.

Figure 60:
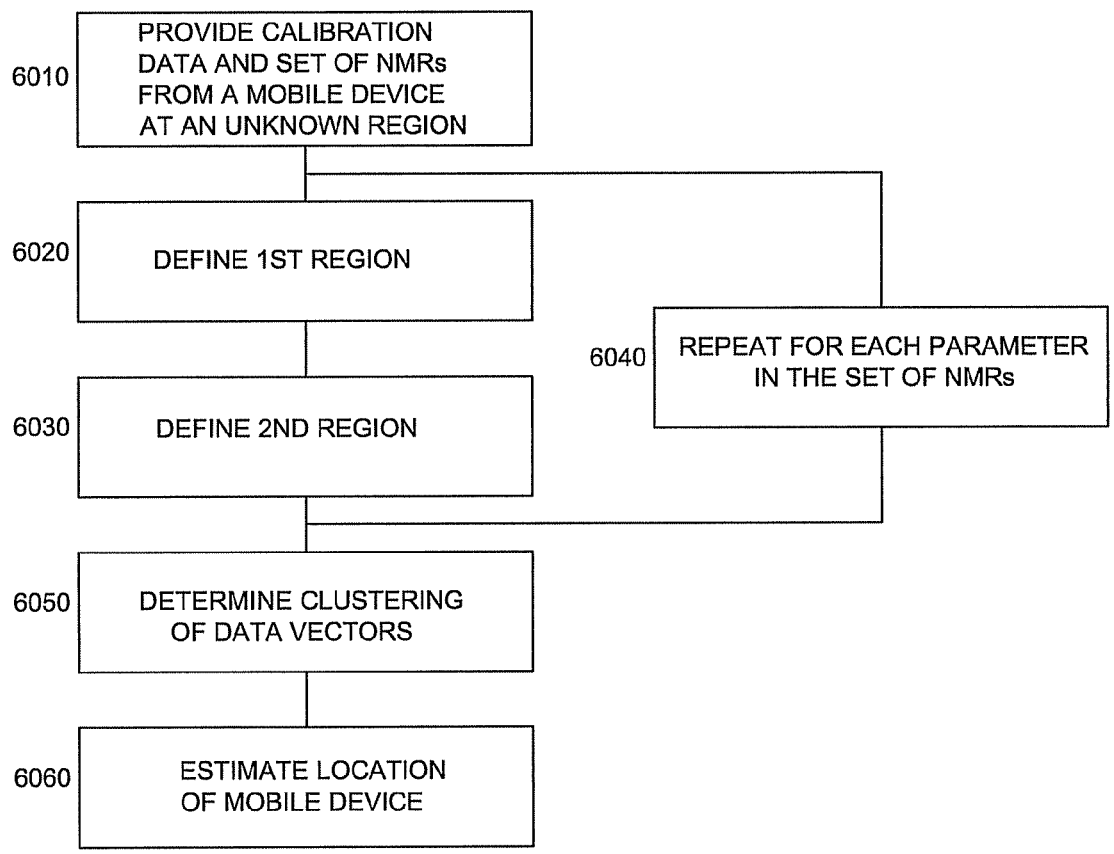

FIG. 60 is a flow chart for a method of estimating the location of a mobile device in a geographic region. At block 6010, calibration data may be provided for a plurality of calibration points in the geographic region. The calibration data may include at least one characterizing parameter and for each of select ones of the calibration points the calibration data may also include plural data vectors. Of course, the calibration data may include a collection of NMRs having associated known locations, each of the NMRs providing at least one characterizing parameter. The calibration data may take the form of a collection of NMRs having associated locations as discussed above. Exemplary NMRs in the calibration data may be defined as an (n×1) vector with n parameters. Exemplary parameters may be, but are not limited to, observed power levels for adjacent neighbor cell control channels, TAs, RTTs, etc., each of which are a set of observed or collected information obtained at a particular location. A particular value of n, i.e., the size of each NMR vector, may also be variable (e.g., n may range from at least one to fifteen or higher within a respective calibration data set). A candidate set of NMRs may also be received from a mobile device at an unknown location. Thus, the geographical location from which the candidate set was generated should be estimated.

At block 6020, a first region within the calibration data may be defined as a function of a first characterizing parameter of the set of NMRs and a predetermined range of the first parameter. At block 6030, a second region within the calibration data may be defined as a function of another characterizing parameter of the set of NMRs and a predetermined range of another parameter. By way of a non-limiting example, if the first characterizing parameter of the candidate set considered is the power level observed for a first cell, A, then the calibration data may be examined for each NMR in the set (or data vector) having a power level observed for cell A that may be within a predetermined range about the value Pa. Exemplary NMRs (or data vectors) within the calibration data satisfying this condition may defines a region in a two dimensional location space where a location is desired. As each such piece of calibration data that fits the range constraint upon the first parameter has an associated location, it follows that a collection of such pieces or data vectors of calibration data may define a region. Further, assuming the second characterizing parameter considered is the power level observed for cell B, the same technique may also be applied to generate a second region. These regions may then represent areas in a location space that are potential or candidate solution regions for the location of the unknown set of NMRs. The intersection of these two (or more) regions defines a region satisfying the two characterizing parameters considered within a respective range for each. Of course, a multitude of parameters may be considered and a multitude of regions defined, and an intersection of this multitude of regions may also be obtained. Thus, the simplistic example provided above should not limit the scope of the claims appended herewith.

The steps represented by blocks 6020 and 6030 may be repeated for each characterizing parameter in the set of calibration data at block 6040. At block 6050, a clustering of the plural data vectors, whether directly in the regions obtained or for those data vectors than are contained in the intersection, may be determined. In another embodiment of the present subject matter, the clustering may be determined as a function of a metric, such as, but not limited to, joint probability, Mahalanobis distance, cluster radius, etc. It may be noted that clustering may also be generally viewed as a process generating an intersection region. At block 6060, a location of a mobile device in the intersection region may be estimated as a function of the clustering. In one embodiment, any number or combination of the calibration points may be located on a predetermined fixed uniform grid defined over the geographic region or may be randomly located within the geographic region. Further, any of the calibration data may comprise information from a network measurement report. The calibration data for one of the calibration points may be obtained from one or more mobile devices located in close proximity to the one calibration point in another embodiment, and/or the calibration data for one of the calibration points may be obtained from a signal transmitted from a mobile device in close proximity to the one calibration point and received at a receiver in or in proximity to the geographic region.

FIG. 61 is a flow chart for a method of estimating the location of a mobile device in a geographic region according to another embodiment of the present subject matter. With reference to FIG. 61, at block 6110, calibration data for each of one or more calibration points in a geographic region may be provided where the calibration data includes at least one characterizing parameter. Further, a set of network measurement reports may be received from a mobile device at an unknown location where at least one of the network measurement reports in the set also includes at least one characterizing parameter. At block 6120, a representative value may be determined for each available characterizing parameter in the set as a function of a variation of the available characterizing parameter in each network measurement report in the set. In one embodiment of the present subject matter, the representative value may be obtained as a function of an available set of representative values, may be determined as a function of a mean or median of an available set of representative values, or may be selected as a function of a predetermined range. At block 6130, one or more representative network measurement reports may be determined as a function of the representative value, and at block 6140 the location of a mobile device may be estimated in the geographic region as a function of the one or more representative network measurement reports. Any one or plural calibration points may be located on a predetermined fixed uniform grid defined over the geographic region or randomly located within the geographic region. The calibration data may also comprise information from at least one NMR, may be obtained from one or more mobile devices located in close proximity to the one calibration point, and/or may be obtained from a signal transmitted from a mobile device in close proximity to the one calibration point and received at a receiver in or in proximity to the geographic region. In one embodiment of the present subject matter, for each of select ones of the calibration points, the calibration data may include plural data vectors and the evaluating of the calibration data may comprise a determination of clustering of the plural data vectors.

Figure 62:
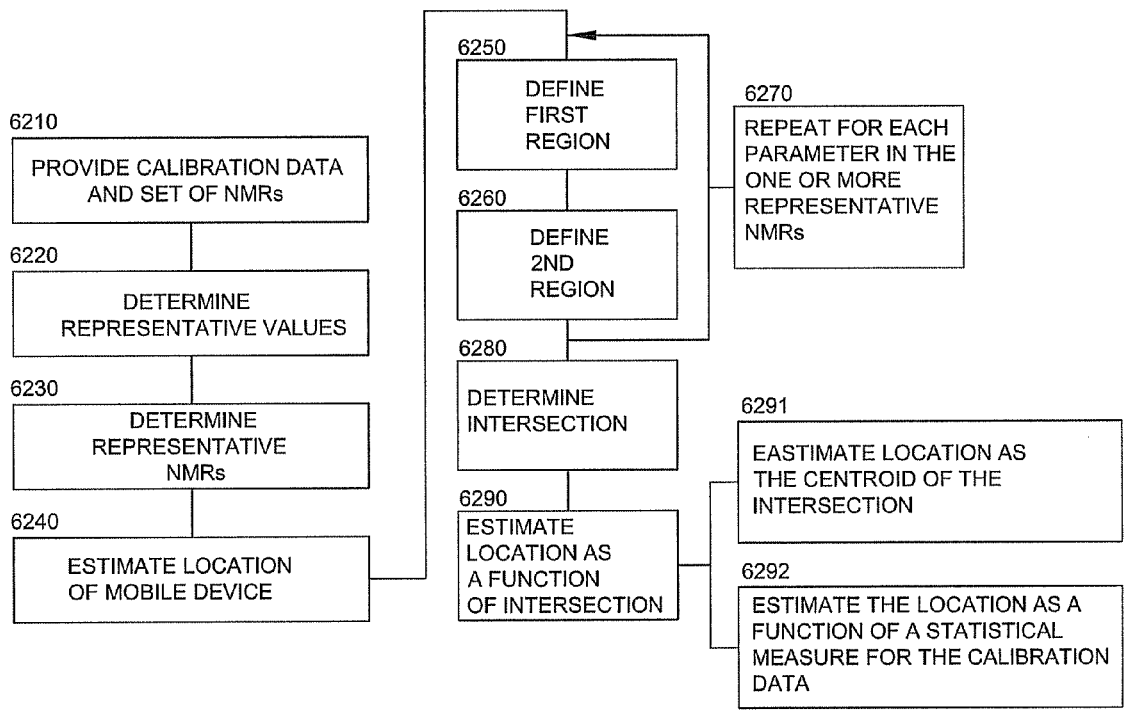

FIG. 62 is a flow chart for a method of estimating the location of a mobile device in a geographic region according to a further embodiment of the present subject matter. With reference to FIG. 62, blocks 6210, 6220, 6230 and 6240 are similar to blocks 6110, 6120, 6130 and 6140, respectively. In one embodiment the method may further define a first region as a function of a first representative value for a first characterizing parameter and a predetermined range of the first value at block 6250 and at block 6260 define a second region as a function of a second representative value for a second characterizing parameter and a predetermined range of the second value. The steps represented by blocks 6250 and 6260 may be repeated for each characterizing parameter in the one or more representative NMRs at block 6270. At block 6280, an intersection of each defined region may be determined and at block 6290, the location of a mobile device in the geographic region may be estimated as a function of the intersection. At block 6291, in one embodiment of the present subject matter the location of a mobile device may be estimated as the centroid of the intersection, or at block 6292, the location of the mobile device may be estimated as a function of a statistical measure for calibration data of select ones of the calibration points. An exemplary statistical measure may be, but is not limited to, a probability density function.

Figure 63:
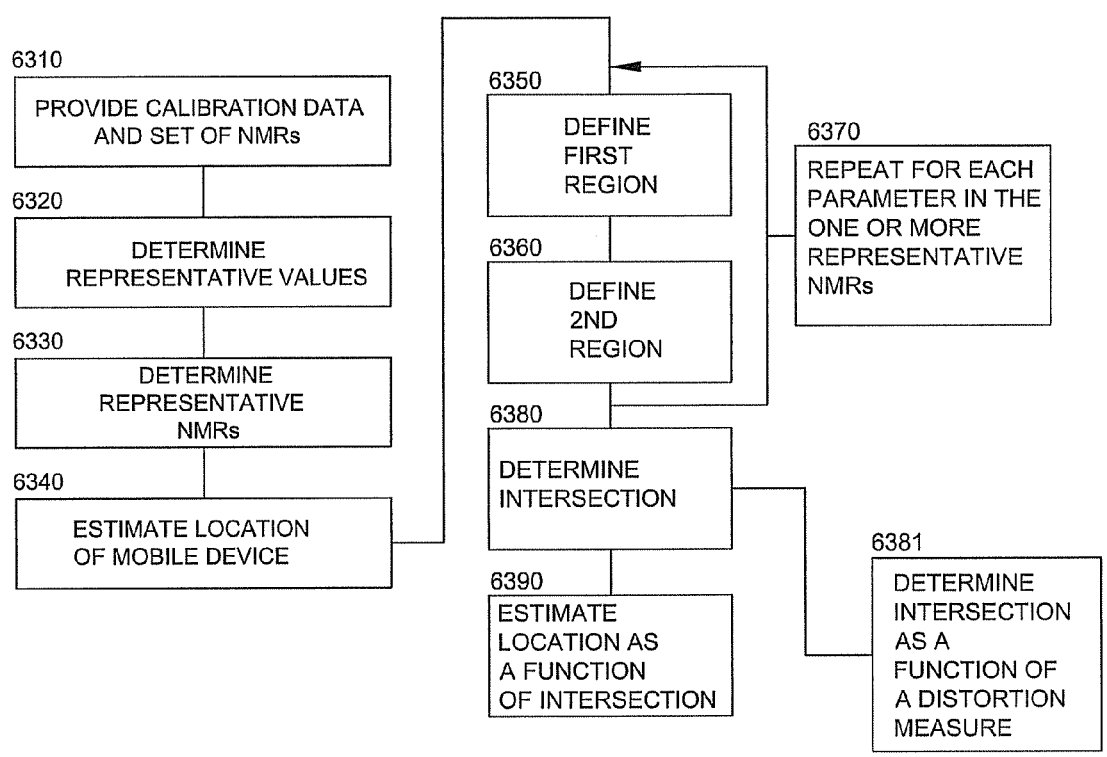

FIG. 63 is a flow chart for a method of estimating the location of a mobile device in a geographic region according to an additional embodiment of the present subject matter. With reference to FIG. 63, blocks 6310, 6320, 6330, 6340, 6350, 6360, 6370, 6380 and 6390 are similar to blocks 6210, 6220, 6230, 6240, 6250, 6260, 6270, 6280 and 6290, respectively. At block 6381, in one embodiment of the present subject matter an intersection of each defined region may be determined as a function of a distortion measure.

Figure 64:
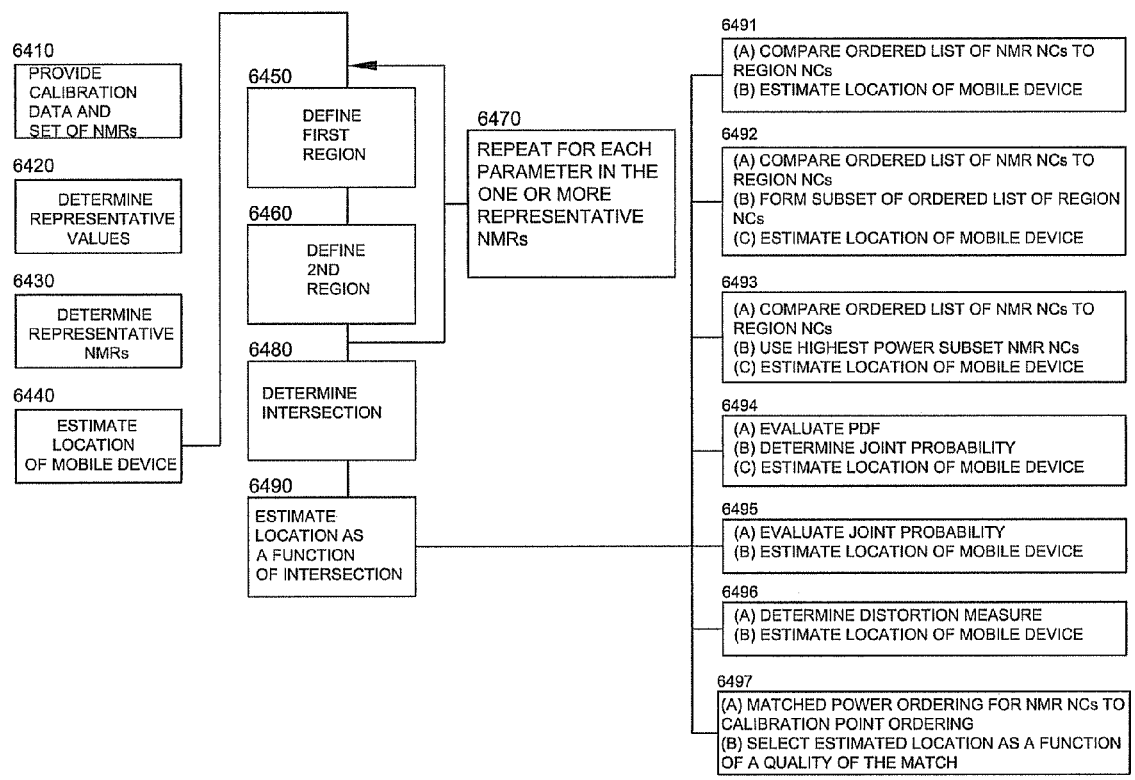

FIG. 64 is a flow chart for a method of estimating the location of a mobile device in a geographic region according to a further embodiment of the present subject matter. With reference to FIG. 64, blocks 6410, 6420, 6430, 6440, 6450, 6460, 6470, 6480 and 6490 are similar to blocks 6210, 6220, 6230, 6240, 6250, 6260, 6270, 6280 and 6290 respectively. At block 6491, in one embodiment of the present subject matter the estimation of the location of a mobile device may comprise (a) comparing an ordered list of cells neighboring a cell serving the mobile device in the one or more representative network measurement reports to an ordered list of neighboring cells in each calibration point of the intersection where the ordering may be a function of any parameter of the one or more representative network measurement reports (the ordering may be in terms of any one of a number of parameters characterizing a respective NMR, e.g., NC power level or NC measurement quality); and (b) generating an estimated location of the mobile device. The estimated location may be, but is not limited to, a centroid of a cluster of matching calibration points in the intersection; a highest joint probability matching calibration point in the intersection; a weighted sum of the locations of a set of matching calibration points in the intersection (exemplary weights may be defined by any number of means such as, but not limited to, a joint probability derived from individual pdfs, etc.); a weighted sum of clustered locations of a set of matching calibration points in the intersection (i.e., cluster the locations of the matching grid points and then apply a cumulative probability for all contained grid points in a cluster as a weight for the respective cluster), and as a function of estimated locations determined from a subset of the one or more representative network measurement reports, or any combination thereof.

In another embodiment of the present subject matter, at block 6492, the estimation of the location of a mobile device may comprise (a) comparing an ordered list of cells neighboring a cell serving the mobile device in the one or more representative network measurement reports to an ordered list of neighboring cells in each calibration point of the intersection where the ordering may be a function of any parameter in the one or more representative network measurement reports (the ordering may be in terms of any one of a number of parameters characterizing a respective NMR, e.g., NC power level or NC measurement quality), (b) if no exact match is made between the ordered list of neighboring cells of the one or more representative network measurement reports and any calibration point in the intersection then forming a largest subset of the ordered list of neighboring cells in the calibration points that provide a match, and (c) generating an estimated location of the mobile device. The estimated location may be, but is not limited to, a centroid of a cluster of matching calibration points in the intersection, a highest joint probability matching calibration point in the intersection, a weighted sum of the locations of a set of matching calibration points in the intersection (exemplary weights may be defined by any number of means such as, but not limited to, a joint probability derived from individual pdfs, etc.), a weighted sum of clustered locations of a set of matching calibration points in the intersection (i.e., cluster the locations of the matching grid points and then apply a cumulative probability for all contained grid points in a cluster as a weight for the respective cluster), and as a function of estimated locations determined from a subset of the one or more representative network measurement reports, or any combination thereof.

At block 6493, the estimation of the location of a mobile device may comprise in a further embodiment of the present subject matter (a) comparing an ordered list of cells neighboring a cell serving the mobile device in the one or more representative network measurement reports to an ordered list of neighboring cells in each calibration point of the intersection where the ordering may be a function of any parameter in the one or more representative network measurement reports (the ordering may be in terms of any one of a number of parameters characterizing a respective NMR, e.g., NC power level), (b) if the ordered list of neighboring cells of the one or more representative network measurement reports is not contained in the ordered list of neighboring cells for the intersection then using a largest subset of ordered neighboring cells in the one or more representative network measurement reports having either an exact match or contained in the ordered list of neighboring cells in the intersection, and (c) generating an estimated location of the mobile device. The estimated location may be, but is not limited to, a centroid of a cluster of matching calibration points in the intersection, a highest joint probability matching calibration point in the intersection, a weighted sum of the locations of a set of matching calibration points in the intersection (exemplary weights may be defined by any number of means such as, but not limited to, a joint probability derived from individual pdfs, etc.), a weighted sum of clustered locations of a set of matching calibration points in the intersection (i.e., cluster the locations of the matching grid points and then apply a cumulative probability for all contained grid points in a cluster as a weight for the respective cluster), and as a function of estimated locations determined from a subset of the one or more representative network measurement reports, or any combination thereof.

At block 6494, in another embodiment of the present subject matter the estimation of the location of a mobile device may comprise (a) evaluating a probability density function for each power level of a cell neighboring a cell serving the mobile device in the one or more representative network measurement reports over each calibration point in a set of available calibration points in the intersection, (b) determining a joint probability as a function of the individual probability density functions, and (c) generating an estimated location of the mobile device. The estimated location may be, but is not limited to, a highest joint probability matching calibration point in the intersection, a weighted sum of the locations of a set of matching calibration points in the intersection (exemplary weights may be defined by any number of means such as, but not limited to, a joint probability derived from individual pdfs, etc.), a weighted sum of clustered locations of a set of matching calibration points in the intersection (i.e., cluster the locations of the matching grid points and then apply a cumulative probability for all contained grid points in a cluster as a weight for the respective cluster), and as a function of estimated locations determined from a subset of the one or more representative network measurement reports, or any combination thereof.

At block 6495, the estimation of the location of a mobile device may comprise in one embodiment of the present subject matter (a) directly evaluating a joint probability (i.e., as an aggregate rather than through computation of the product of marginal pdfs) of power levels for at least one cell neighboring a cell serving the mobile device in the one or more representative network measurement reports over a set of available calibration points in the intersection, and (b) generating an estimated location of the mobile device. The estimated location may be, but is not limited to, a highest joint probability matching calibration point in the intersection, a weighted sum of the locations of a set of matching calibration points in the intersection (exemplary weights may be defined by any number of means such as, but not limited to, a joint probability derived from individual pdfs, etc.), a weighted sum of clustered locations of a set of matching calibration points in the intersection (i.e., cluster the locations of the matching grid points and then apply a cumulative probability for all contained grid points in a cluster as a weight for the respective cluster), and as a function of estimated locations determined from a subset of the one or more representative network measurement reports, or any combination thereof.

At block 6496, the estimation of the location of a mobile device may comprise in an additional embodiment of the present subject matter (a) determining a distortion measure between a parameter or function of a calibration point contained in the intersection and a corresponding parameter or function in the one or more network measurement reports, and (b) generating an estimated location of the mobile device. The estimated location may be, but is not limited to, a location of a calibration point having the smallest distortion measure, a weighting of the locations of a set of matching calibration points in the intersection (where the weighting applied to each of the matching calibration points may be a function of the distortion measure), a weighted sum of clustered locations of a set of matching calibration points in the intersection, and as a function of estimated locations determined from a subset of the one or more representative network measurement reports. Exemplary distortion measures are described above and may be but, but are not limited to, a Mahalanobis distance, etc.

In one embodiment of the present subject matter, at block 6497 the estimation of the location of a mobile device may comprise (a) matching cell power ordering of cells neighboring a cell serving the mobile device in the one or more representative network measurement reports to neighboring cell power ordering of calibration points in each of the calibration points in the intersection region, and (b) selecting an estimated location as a function of a quality of the matching. The quality may be a function of a relative shift in the ordering sequence occurring between the one or more representative network measurement reports and calibration point cell power ordering. It is also envisioned that this same concept may be applied to any other vector parameter characterizing NMRs and/or grid points and such an example should not limit the scope of the claims appended herewith.

Figure 65:
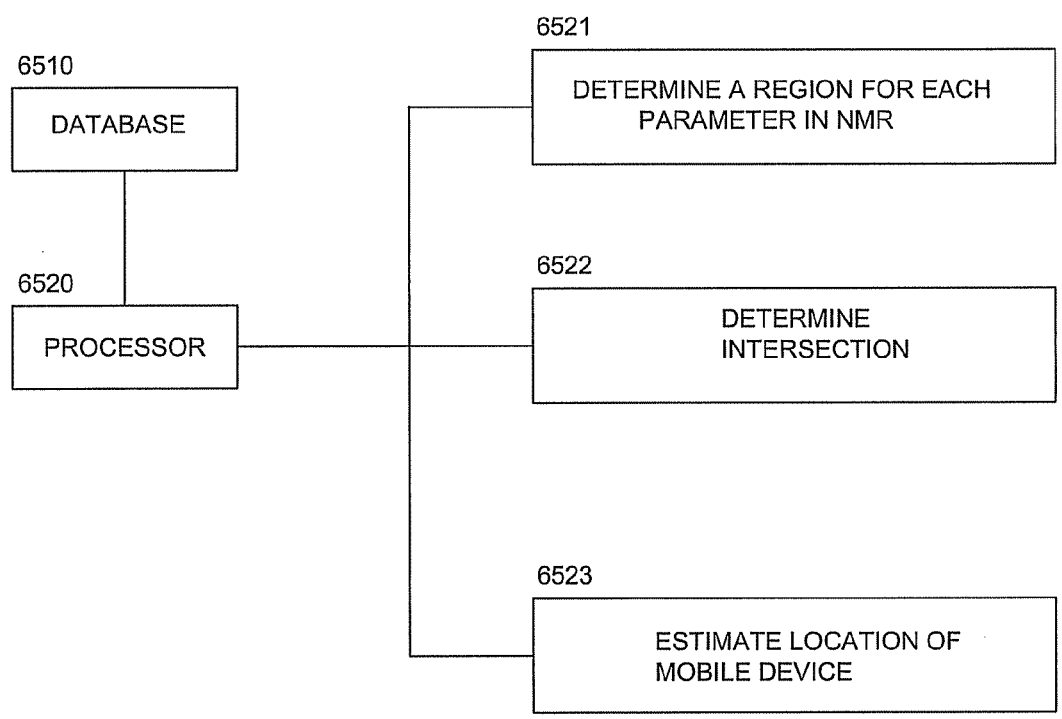
FIGS. 65-66 are diagrams for systems for estimating the location of a mobile device in a geographic region according to embodiments of the present subject matter.

FIG. 65 is a diagram for a system for estimating the location of a mobile device in a geographic region according to an embodiment of the present subject matter. With reference to FIG. 65, at block 6510, the system may comprise a database and, at block 6520, a processor operably connected thereto for receiving calibration data for each of one or more calibration points in a geographic region where the calibration data may include at least one characterizing parameter. The processor may also be programmed to receive an NMR from a mobile device at an unknown location. The processor may be programmed to determine a first region within the calibration data as a function of a first characterizing parameter of the received NMR and a predetermined range of the first parameter and repeat the determination for each characterizing parameter in the NMR at block 6521, and determine an intersection for each defined region at block 6522. The processor may be further programmed to estimate the location of a mobile device in the geographic region as a function of the intersection at block 6523. Any one or plural calibration points may be located on a predetermined fixed uniform grid defined over the geographic region or randomly located within said geographic region. The calibration data may also comprise information from at least one NMR, may be obtained from one or more mobile devices located in close proximity to the one calibration point, and/or may be obtained from a signal transmitted from a mobile device in close proximity to the one calibration point and received at a receiver in or in proximity to the geographic region. In one embodiment of the present subject matter for each of select ones of the calibration points, the calibration data may include plural data vectors and the evaluating of the calibration data may comprise a determination of clustering of the plural data vectors.

Figure 66:
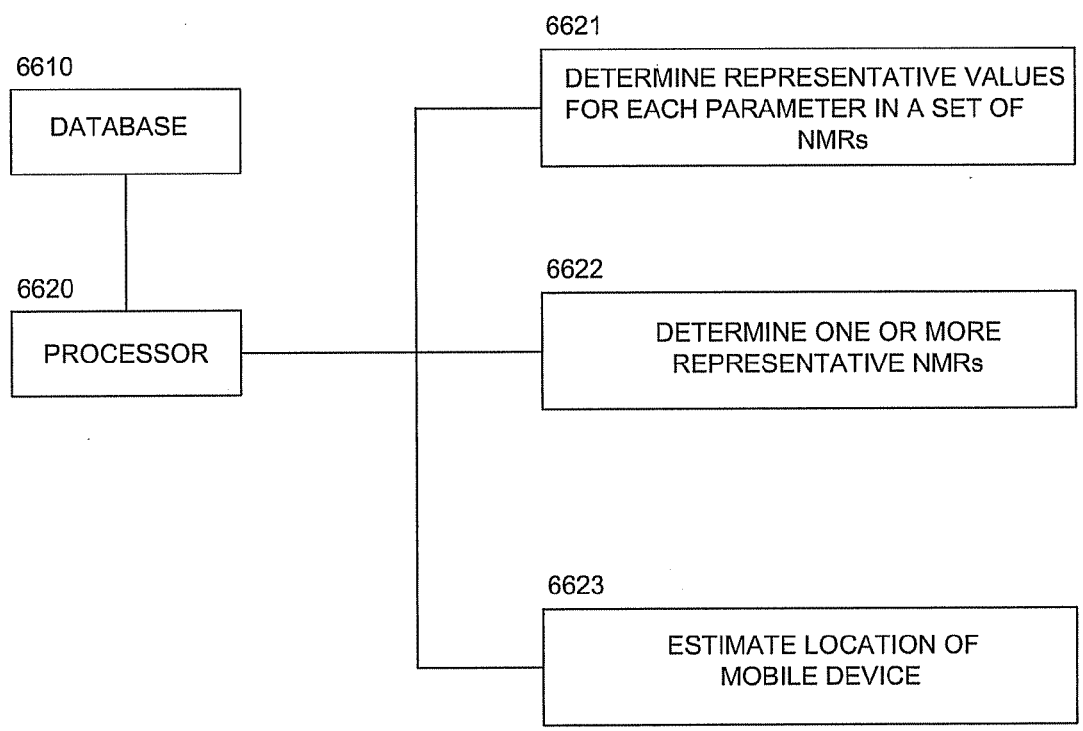

FIG. 66 is a diagram for a system for estimating the location of a mobile device in a geographic region according to an additional embodiment of the present subject matter. With reference to FIG. 66, at block 6610, the system may comprise a database and, at block 6620, a processor operably connected thereto for receiving calibration data for each of one or more calibration points in a geographic region where the calibration data may include at least one characterizing parameter. The processor may also receive a set of network measurement reports from a mobile device at an unknown location, at least one of the network measurement reports in the set may also include at least one characterizing parameter. The processor may be programmed to determine a representative value for each available characterizing parameter in the set as a function of a variation of the available characterizing parameter in each network measurement report in the set at block 6621 and determine one or more representative network measurement reports as a function of the representative value at block 6622. At block 6623, the processor may also be programmed to estimate the location of a mobile device in the geographic region as a function of the one or more representative network measurement reports.

In a further embodiment, the processor may be programmed to determine a first region as a function of a first representative value for a first characterizing parameter and a predetermined range of the first value and repeat said determination for each characterizing parameter in the one or more representative network measurement reports, determine an intersection of each determined region. The processor may also be programmed to estimate the location of a mobile device in the geographic region as a function of the intersection. Of course, any one or plural calibration points may be located on a predetermined fixed uniform grid defined over the geographic region or randomly located within said geographic region. The calibration data may also comprise information from at least one NMR, may be obtained from one or more mobile devices located in close proximity to the one calibration point, and/or may be obtained from a signal transmitted from a mobile device in close proximity to the one calibration point and received at a receiver in or in proximity to the geographic region. In one embodiment of the present subject matter for each of select ones of the calibration points, the calibration data may include plural data vectors and the evaluating of the calibration data may comprise a determination of clustering of the plural data vectors.

As shown by the various configurations and embodiments illustrated in FIGS. 1-66, a method and system for generating a location estimate using a method of intersections have been described.

While preferred embodiments of the present subject matter have been described, it is to be understood that the embodiments described are illustrative only and that the scope of the invention is to be defined solely by the appended claims when accorded a full range of equivalence, many variations and modifications naturally occurring to those of skill in the art from a perusal hereof.

We claim:

1. A method of estimating the location of a mobile device in a geographic region comprising the steps of:
    (a) providing calibration data for each of one or more calibration points in a geographic region, said calibration data including at least one characterizing parameter;
    (b) receiving a network measurement report from a mobile device at an unknown location, said network measurement report also including at least one characterizing parameter;
    (c) defining a first region within said calibration data as a function of a first characterizing parameter of said network measurement report and a predetermined range of said first parameter;
    (d) defining a second region within said calibration data as a function of another characterizing parameter of said network measurement report and a predetermined range of said another parameter;
    (e) repeating steps (c)-(d) for each characterizing parameter in said network measurement report;
    (f) determining an intersection of each defined region; and
    (g) estimating the location of a mobile device in said geographic region as a function of said intersection,
    wherein the step of determining an intersection further comprises determining an intersection of each defined region as a function of a distortion measure selected from the group consisting of: the largest width of an network measurement report parameter level, a weighted combination of individual widths of any network measurement report parameter level, the area of the intersection, or any combination thereof.

2. The method of claim 1 wherein one of said calibration points is located on a predetermined fixed uniform grid defined over said geographic region.

3. The method of claim 1 wherein one of said calibration points is randomly located within said geographic region.

4. The method of claim 1 wherein said calibration data comprises information from at least one network measurement report having a known location.

5. The method of claim 1 wherein said calibration data for one of said calibration points is obtained from one or more mobile devices located in close proximity to said one calibration point.

6. The method of claim 1 wherein said calibration data for one of said calibration points is obtained from a signal transmitted from a mobile device in close proximity to said one calibration point and received at a receiver in or in proximity to said geographic region.

7. The method of claim 1 wherein for each of select ones of said calibration points the calibration data includes plural data vectors and the evaluating of said calibration data comprises a determination of clustering of said plural data vectors.

8. The method of claim 1 wherein the step of estimating the location of a mobile device further comprises estimating the location of a mobile device as the centroid of said intersection.

9. The method of claim 1 wherein the step of estimating the location of a mobile device further comprises estimating the location of a mobile device as a function of a statistical measure for calibration data of select ones of said calibration points.

10. The method of claim 9 wherein said statistical measure is a probability density function.

11. The method of claim 1 wherein the step of estimating the location of a mobile device comprises:
    (i) comparing an ordered list of cells neighboring a cell serving said mobile device in said network measurement report to an ordered list of neighboring cells in each calibration point of said intersection, said ordering being a function of any parameter of said network measurement report; and
    (ii) generating an estimated location of said mobile device wherein said estimated location is selected from the group consisting of: a centroid of a cluster of matching calibration points in said intersection; a highest joint probability matching calibration point in said intersection; a weighted sum of the locations of a set of matching calibration points in said intersection; a weighted sum of clustered locations of a set of matching calibration points in said intersection; and as a function of estimated locations determined from a subset of said network measurement report.

12. The method of claim 1 wherein the step of estimating the location of a mobile device comprises:
   (i) comparing an ordered list of cells neighboring a cell serving said mobile device in said network measurement report to an ordered list of neighboring cells in each calibration point of said intersection, said ordering being a function of any parameter of said network measurement report;
   (ii) if no exact match is made between the ordered list of neighboring cells of said network measurement report and any calibration point in said intersection then forming a largest subset of the ordered list of neighboring cells in said calibration points that provide a match; and
   (iii) generating an estimated location of said mobile device wherein said estimated location is selected from the group consisting of: a centroid of a cluster of matching calibration points in said intersection; a highest joint probability matching calibration point in said intersection; a weighted sum of the locations of a set of matching calibration points in said intersection; a weighted sum of clustered locations of a set of matching calibration points in said intersection; and as a function of estimated locations determined from a subset of said network measurement report.

13. The method of claim 1 wherein the step of estimating the location of a mobile device comprises:
   (i) comparing an ordered list of cells neighboring a cell serving said mobile device in said network measurement report to an ordered list of neighboring cells in each calibration point of said intersection, said ordering being a function of any parameter of said network measurement report;
   (ii) if the ordered list of neighboring cells of said network measurement report is not contained in the ordered list of neighboring cells for said intersection then using a largest subset of ordered neighboring cells in said network measurement report having either an exact match or contained in the ordered list of neighboring cells in said intersection; and
   (iii) generating an estimated location of said mobile device wherein said estimated location is selected from the group consisting of: a centroid of a cluster of matching calibration points in said intersection; a highest joint probability matching calibration point in said intersection; a weighted sum of the locations of a set of matching calibration points in said intersection; a weighted sum of clustered locations of a set of matching calibration points in said intersection; and as a function of estimated locations determined from a subset of said network measurement report.

14. The method of claim 1 wherein the step of estimating the location of a mobile device comprises:
   (i) evaluating a probability density function for each power level of a cell neighboring a cell serving said mobile device in said network measurement report over each calibration point in a set of available calibration points in said intersection;
   (ii) determining a joint probability as a function of said individual probability density functions; and
   (iii) generating an estimated location of said mobile device wherein said estimated location is selected from the group consisting of: a highest joint probability matching calibration point in said intersection; a weighted sum of the locations of a set of matching calibration points in said intersection; a weighted sum of clustered locations of a set of matching calibration points in said intersection; and as a function of estimated locations determined from a subset of said network measurement report.

15. The method of claim 1 wherein the step of estimating the location of a mobile device comprises:
   (i) evaluating a joint probability of power levels for at least one cell neighboring a cell serving said mobile device in said network measurement report over a set of available calibration points in said intersection; and
   (ii) generating an estimated location of said mobile device wherein said estimated location is selected from the group consisting of: a highest joint probability matching calibration point in said intersection; a weighted sum of the locations of a set of matching calibration points in said intersection; a weighted sum of clustered locations of a set of matching calibration points in said intersection; and as a function of estimated locations determined from a subset of said network measurement report.

16. The method of claim 1 wherein the step of estimating the location of a mobile device comprises:
   (i) determining a distortion measure between a parameter or function of a calibration point and a corresponding parameter or function in said network measurement report; and
   (ii) generating an estimated location of said mobile device wherein said estimated location is selected from the group consisting of: a location of a calibration point having the smallest distortion measure; a weighting of the locations of a set of matching calibration points in said intersection, said weighting being a function of said distortion measure; a weighted sum of clustered locations of a set of matching calibration points in said intersection; and as a function of estimated locations determined from a subset of said network measurement report.

17. The method of claim 16 wherein said distortion measure is a Mahalanobis distance.

18. The method of claim 1 wherein the step of estimating the location of a mobile device comprises:
   (i) matching cell power ordering of cells neighboring a cell serving said mobile device in said network measurement report to neighboring cell power ordering of calibration points in each of the calibration points in said intersection; and
   (ii) selecting an estimated location as a function of a quality of said matching,
   wherein said quality is a function of a relative shift in an ordering sequence occurring between said network measurement report and calibration point cell power ordering.

19. The method of claim 1 further comprising the step of:
   (h) examining subsets of available network measurement reports for an intersection.

20. A method of estimating the location of a mobile device in a geographic region comprising the steps of:
   (a) providing calibration data for each of one or more calibration points in a geographic region, said calibration data including at least one characterizing parameter;
   (b) receiving a set of network measurement reports from a mobile device at an unknown location, at least one of said network measurement reports in said set also including at least one characterizing parameter;
   (c) determining a representative value for each available characterizing parameter in said set as a function of a variation of said available characterizing parameter in each network measurement report in said set;

(d) determining one or more representative network measurement reports as a function of said representative value; and
(e) estimating the location of a mobile device in said geographic region as a function of said one or more representative network measurement reports,
(f) defining a first region as a function of a first representative value for a first characterizing parameter and a predetermined range of said first value;
(g) defining a second region as a function of a second representative value for a second characterizing parameter and a predetermined range of said second value;
(h) repeating steps (f)-(g) for each characterizing parameter in said one or more representative network measurement reports;
(i) determining an intersection of each defined region; and
(j) estimating the location of a mobile device in said geographic region as a function of said intersection.

21. The method of claim 20 wherein the step of determining a representative value further comprises obtaining a representative value as a function of an available set of representative values.

22. The method of claim 21 wherein said representative value is determined as a function of a mean or median of said available set of representative values.

23. The method of claim 20 wherein the step of determining a representative value further comprises selecting a representative value as a function of a predetermined range.

24. The method of claim 20 wherein one of said calibration points is located on a predetermined fixed uniform grid defined over said geographic region.

25. The method of claim 20 wherein one of said calibration points is randomly located within said geographic region.

26. The method of claim 20 wherein said calibration data comprises information from at least one network measurement report.

27. The method of claim 20 wherein said calibration data for one of said calibration points is obtained from one or more mobile devices located in close proximity to said one calibration point.

28. The method of claim 20 wherein said calibration data for one of said calibration points is obtained from a signal transmitted from a mobile device in close proximity to said one calibration point and received at a receiver in or in proximity to said geographic region.

29. The method of claim 20 wherein for each of select ones of said calibration points the calibration data includes plural data vectors and the evaluating of said calibration data comprises a determination of clustering of said plural data vectors.

30. The method of claim 20 wherein the step of estimating the location of a mobile device further comprises estimating the location of a mobile device as the centroid of said intersection.

31. The method of claim 20 wherein the step of estimating the location of a mobile device further comprises estimating the location of a mobile device as a function of a statistical measure for calibration data of select ones of said calibration points.

32. The method of claim 31 wherein said statistical measure is a probability density function.

33. The method of claim 20 wherein the step of determining an intersection further comprises determining an intersection of each defined region as a function of a distortion measure.

34. The method of claim 20 wherein the step of estimating the location of a mobile device comprises:

(i) comparing an ordered list of cells neighboring a cell serving said mobile device in said one or more representative network measurement reports to an ordered list of neighboring cells in each calibration point of said intersection, said ordering being a function of any parameter of the one or more representative network measurement reports; and
(ii) generating an estimated location of said mobile device wherein said estimated location is selected from the group consisting of: a centroid of a cluster of matching calibration points in said intersection; a highest joint probability matching calibration point in said intersection; a weighted sum of the locations of a set of matching calibration points in said intersection; a weighted sum of clustered locations of a set of matching calibration points in said intersection; and as a function of estimated locations determined from a subset of said one or more representative network measurement reports.

35. The method of claim 20 wherein the step of estimating the location of a mobile device comprises:

(i) comparing an ordered list of cells neighboring a cell serving said mobile device in said one or more representative network measurement reports to an ordered list of neighboring cells in each calibration point of said intersection, said ordering being a function of any parameter in said one or more representative network measurement reports;
(ii) if no exact match is made between the ordered list of neighboring cells of said one or more representative network measurement reports and any calibration point in said intersection then forming a largest subset of the ordered list of neighboring cells in said calibration points that provide a match; and
(iii) generating an estimated location of said mobile device wherein said estimated location is selected from the group consisting of: a centroid of a cluster of matching calibration points in said intersection; a highest joint probability matching calibration point in said intersection; a weighted sum of the locations of a set of matching calibration points in said intersection; a weighted sum of clustered locations of a set of matching calibration points in said intersection; and as a function of estimated locations determined from a subset of said one or more representative network measurement reports.

36. The method of claim 20 wherein the step of estimating the location of a mobile device comprises:

(i) comparing an ordered list of cells neighboring a cell serving said mobile device in said one or more representative network measurement reports to an ordered list of neighboring cells in each calibration point of said intersection, said ordering being a function of any parameter in said one or more representative network measurement reports;
(ii) if the ordered list of neighboring cells of said one or more representative network measurement reports is not contained in the ordered list of neighboring cells for said intersection then using a largest subset of ordered neighboring cells in said one or more representative network measurement reports having either an exact match or contained in the ordered list of neighboring cells in said intersection; and
(iii) generating an estimated location of said mobile device wherein said estimated location is selected from the group consisting of: a centroid of a cluster of matching calibration points in said intersection; a highest joint probability matching calibration point in said intersection; a weighted sum of the locations of a set of matching calibration points in said intersection; a weighted sum of clustered locations of a set of matching calibration points in said intersection; and as a function of estimated locations determined from a subset of said one or more representative network measurement reports.

37. The method of claim 20 wherein the step of estimating the location of a mobile device comprises:
  (i) evaluating a probability density function for each power level of a cell neighboring a cell serving said mobile device in said one or more representative network measurement reports over each calibration point in a set of available calibration points in said intersection;
  (ii) determining a joint probability as a function of said individual probability density functions; and
  (iii) generating an estimated location of said mobile device wherein said estimated location is selected from the group consisting of: a highest joint probability matching calibration point in said intersection; a weighted sum of the locations of a set of matching calibration points in said intersection; a weighted sum of clustered locations of a set of matching calibration points in said intersection; and as a function of estimated locations determined from a subset of said one or more representative network measurement reports.

38. The method of claim 20 wherein the step of estimating the location of a mobile device comprises:
  (i) evaluating a joint probability of power levels for at least one cell neighboring a cell serving said mobile device in said one or more representative network measurement reports over a set of available calibration points in said intersection; and
  (ii) generating an estimated location of said mobile device wherein said estimated location is selected from the group consisting of: a highest joint probability matching calibration point in said intersection; a weighted sum of the locations of a set of matching calibration points in said intersection; a weighted sum of clustered locations of a set of matching calibration points in said intersection; and as a function of estimated locations determined from a subset of said one or more representative network measurement reports.

39. The method of claim 20 wherein the step of estimating the location of a mobile device comprises:
  (i) determining a distortion measure between a parameter or function of a calibration point and a corresponding parameter or function in said one or more network measurement reports; and
  (ii) generating an estimated location of said mobile device wherein said estimated location is selected from the group consisting of: a location of a calibration point having the smallest distortion measure; a weighting of the locations of a set of matching calibration points in said intersection, said weighting being a function of said distortion measure; a weighted sum of clustered locations of a set of matching calibration points in said intersection; and as a function of estimated locations determined from a subset of said one or more representative network measurement reports.

40. The method of claim 39 wherein said distortion measure is a Mahalanobis distance.

41. The method of claim 20 wherein the step of estimating the location of a mobile device comprises:
  (i) matching cell power ordering of cells neighboring a cell serving said mobile device in said one or more representative network measurement reports to neighboring cell power ordering of calibration points in each of the calibration points in said intersection; and
  (ii) selecting an estimated location as a function of a quality of said matching,
  wherein said quality is a function of a relative shift in an ordering sequence occurring between said one or more representative network measurement reports and calibration point cell power ordering.

* * * * *